United States Patent [19]

Hipp et al.

[11] Patent Number: 4,686,587
[45] Date of Patent: Aug. 11, 1987

[54] RECORD AND/OR PLAYBACK DEVICE WITH CUE SIGNAL INDICATION AND ACCESS

[75] Inventors: Betsy Hipp, Orange; Jeremy Saltzman, Norwalk; John J. Dwyer, Stratford, all of Conn.

[73] Assignee: Dictaphone Corporation, Rye, N.Y.

[21] Appl. No.: 564,191

[22] Filed: Dec. 21, 1983

[51] Int. Cl.⁴ .................. G11B 15/54; G11B 15/52
[52] U.S. Cl. ............................ 360/74.2; 360/13; 360/69; 360/72.1; 360/74.4; 369/27; 369/28
[58] Field of Search ............... 360/66, 72.1–72.3, 360/69, 73, 74.1, 74.2, 74.4, 13, 71, 137, 14.1; 369/25, 27–29; 364/200 MS File, 900 MS File

[56] References Cited

U.S. PATENT DOCUMENTS

| | | | |
|---|---|---|---|
| 3,660,616 | 5/1972 | Davidge et al. | 369/27 |
| 3,749,849 | 7/1973 | Kolpek et al. | 369/27 |
| 3,988,778 | 10/1976 | Swenson | 360/72.1 |
| 4,115,819 | 9/1978 | Shigeta | 360/14.1 |
| 4,200,898 | 4/1980 | Matison | 360/72.1 |
| 4,210,940 | 7/1980 | Prysby et al. | 360/72.3 |
| 4,224,644 | 9/1980 | Lewis et al. | 360/74.4 |
| 4,309,571 | 1/1982 | Chamberlin | 369/25 |
| 4,352,173 | 9/1982 | Titus, IV et al. | 369/27 |
| 4,370,684 | 1/1983 | Kanayama et al. | 360/72.3 X |
| 4,378,577 | 3/1983 | Chamberlin | 360/72.2 |
| 4,398,279 | 8/1983 | Titus, IV et al. | 369/27 |
| 4,410,923 | 10/1983 | Patel | 360/72.1 X |
| 4,468,751 | 8/1984 | Plunkett, Jr. | 364/900 |

FOREIGN PATENT DOCUMENTS 2106696 4/1983 United Kingdom .
2107506 4/1983 United Kingdom .

Primary Examiner—Aristotelis M. Psitos
Assistant Examiner—Steven R. Garland
Attorney, Agent, or Firm—Curtis, Morris & Safford

[57] ABSTRACT

A record and/or playback device whose operating mode is controlled by processor apparatus which is responsive to the selected operation of various operating control switches. The processor apparatus includes a sensor for sensing when the device is in an inactive mode, such as a "stop" mode, a timer for determining when the device has remained in this inactive mode for a predetermined time, and means responsive to the timer for disposing the device in a dormant condition in which it does not respond to the operation of the operating control switches. Furthermore, the processor apparatus comprises a microprocessor which includes a counter that is incremented when the record medium of the device is moved, and a memory for storing respective counts corresponding to locations of the record medium at which "cue" signals are recorded. When the record medium is moved, as during fast-forward and rewind operations, the changing count of the counter is compared to the counts stored in the memory and, when this comparison is positive, the movement of the record medium is interrupted. Stored counts are deleted when information is recorded over a cue signal; and additional counts are inserted into the memory when additional cue signals are inserted onto the medium.

18 Claims, 11 Drawing Figures

RECORD AND/OR PLAYBACK DEVICE WITH CUE SIGNAL INDICATION AND ACCESS

BACKGROUND OF THE INVENTION

This invention relates to a record and/or playback device and, more particularly, to such a device having processor apparatus, such is a programmed microprocessor, which functions to control the operating modes and conditions of the device. The invention also relates to such a device that is porthole and is energized by mean of an electrical storage battery.

Recording/playbadk devices, such as dictating machines, recently have been introduced with microprocessor devices to control various machine functions in place of the "hardware" implementations that had been used previously. One example of such a recording/playback device is described in U.S. Pat. No. 4,328,397, assigned to the assignee of the present invention. As described therein, the microprocessor is provided with a programmed set of instructions through which it cycles repeatedly, and during such cycles the operation of various ones of the usual manual controls is sensed. Moreover, the microprocessor functions to implement corresponding machine operations, as commanded by the operation of such controls. Thus, the microprocessor serves to control the usual "record", "play back", "rewind" and "fast-forward" operations.

When the recording/playback device is used as a dictation machine, as described in the aforementioned patent, certain other controls which generally are helpful to dictation operations also are implemented by the microprocessor. For example, when dictating a letter, the location on the record medium of the end of that letter generally is represented by recording a so-called "letter" cue signal. When the dictated information subsequently is transcribed, the record medium is scanned prior to the transcription operation; and during such scanning, the relative locations of the "letter" cue signals are detected and a suitable display is energized so as to provide the transcriptionist with information regarding the relative locations and lengths of dictated letters. Similarly, when the dictator wishes to dictate special instructions, he may operate a suitable control so as to record so-called "instruction" cue signals on the record medium. These too are sensed during the scanning of the record medium prior to transcription thereof, and the aforementioned display is energized to provide the transcriptionist with additional information as to the relative locations of such "instructions".

Typically, portable battery-operated recording devices are provided with various mechanically linked elements which, generally, are manually operated to effect various operations. For example, in a so-called cassette-recorder wherein the record medium is magnetic tape extending between supply and take-up reels housed within a cassette, a single motor generally is used in combination with a transmission for driving the magnetic tape in the forward direction at a normal speed for recording or playing back information, and also for driving that tape at high speed in the reverse direction to effect a rewind operation or at high speed in the forward direction to effect a fast-forward operation. In capstan-driven cassettes, this same motor generally is used to drive a capstan, and a pinch roller is mounted on a movable device for selectively engaging the capstan with the tape therebetween, thus driving the tape for recording or playing back information. A record/-

[col 2]

playback head also is mounted on this movable device for contacting the magnetic tape so as to record or play back information thereon. Usually, the movable device is coupled to a mechanical linkage which, under user control, drives the pinch roller and head into or out of contact with the tape. By interlinking this linkage with the usual "record", "rewind", "play", "fast-forward" and "stop" controls, the magnetic tape is suitably transported in the desired direction at the desired speed, and the head is appropriately positioned when necessary to record or play back information on the tape.

It has been traditional to provide the aforementioned mechanical linkages and controls (usually push-button controls) in such portable record/playback devices. These devices, although relatively small and portable, have been of sufficient size to accommodate such mechanical linkages and controls. Recently, however, an extremely small thumb-sized magnetic tape cassette has been proposed. Such a cassette is described in copending applications Ser. Nos. 388,539 and 388,540, both filed June 15, 1982, now U.S. Pat. Nos. 4,476,510 and 4,443,827, respectively. It is believed that this tape cassette is far smaller than cassettes which have been used heretofore. Consistent with the small size of the cassette, record/playback devices may be miniaturized such that they themselves are far smaller than recorders which now are commercially available. With such miniaturization, however, there is a substantial reduction in the amount of available space for providing the traditional mechanically-linked manual controls. Moreover, even if mechanical implementation of such controls is desired, the manufacturing and assemblying of suitable miniature mechanical elements would be quite expensive and time consuming.

Because of the aforementioned difficulty in manufacturing suitable mechanically-implemented miniature record/playback devices, it is advantageous to substitute electronic implementation for traditional mechanical elements. For example, the mechanically movable device upon which the pinch roller and head have been mounted may be replaced by a miniature motor-driven actuator that is electronically controlled. One example of such an electronically controlled actuator is described in copending application Ser. No. 434,249, filed Oct. 14, 1982 now U.S. Pat. No. 4,547,821. This actuator is of extremely small size, is relatively simple and, thus, is inexpensive to manufacture and assemble. Moreover, the electronic controls therefor enable accurate control of the actuator in the absence of complex, bulky mechanical elements.

OBJECTS OF THE INVENTION

Therefore, it is an object of the present invention to provide electronic controls for a record/playback device, whereby such controls replace mechanical implementations which heretofore have been used.

Another object of this invention is to provide electronic controls for a superminiature record/playback device, such controls being in the form of a suitably programmed microprocessor.

A still further object of this invention is to provide a record/playback device having operating control switches to command various active and inactive operating modes, and processor apparatus which is responsive to such switches for controlling the overall operation of the device.

An additional object of this invention is to provide a device of the aforementioned type wherein the processor apparatus is a programmed microprocessor; and wherein the device is energized by an electrical storage battery.

Yet another object of this invention is to provide a device of the aforementioned type wherein the microprocessor senses the presence of the inactive mode for a predetermined time and then disposes the device in a dormant condition that is nonresponsive to the operation of the operating control switches.

An additional object of this invention is to provide a device of the aforementioned type having a cue control, and wherein the microprocessor includes a counter for providing a count representing the relative location of the record medium used with the device and a memory for storing respective counts which are present at the times that the cue control is operated.

Another object of this invention is to provide a device of the aforementioned type wherein, during certain operations, such as rewind and fast-forward operations, the microprocessor compares the count of the counter to the counts stored in the memory to interrupt movement of the record medium when a positive comparison is reached.

Various other objects, advantages and features of the present invetnion will become readily apparent from the ensuing detailed description, and the novel features will be particularly pointed out in the appended claims.

SUMMARY OF THE INVENTION

In accordance with this invention, a record/playback device having manual controls for disposing the device in selected active modes, such as "record", "play", "fast forward" and "rewind" modes, and for disposing the device in an inactive mode includes processor apparatus which is responsive to the selected operation of the manual controls for controlling the device operating mode. In one aspect of the invention, the processor apparatus includes a sensor for sensing when the device is in its inactive mode and a timer for determining when the device has remained in the inactive mode for a predetermined time. The processor apparatus also includes means responsive to the timer for disposing the device in a dormant condition in which it does not respond to the operation of the manual controls.

In accordance with one advantageous feature of the present invention, the device, as well as the processor apparatus, is energized by an electrical storage battery. The processor apparatus is operable in accordance with a programmed set of instructions which includes a routine for sensing when the energy level of the storage battery falls below a threshold level; and if the device is disposed in an active mode, it is changed over therefrom to the dormant condition. This prevents depletion of the battery while the device is in its active mode which, otherwise, might result in failure to complete a desired operation.

In accordance with another aspect of this invention, the record/playback device is provided with a cue switch that is selectively operable by the user to generate a cue indication. As the record medium is advanced, such as during a recording operation, a counter included in the microprocessor is incremented in synchronism with such movement so as to provide a count corresponding to the changing position of the record medium. When the user operates the cue switch, the count then present in the counter is stored in a memory. Such stored counts thus represent the locations of "letter" or "instruction" cues identifying the locations of letters (or other segments of recorded information) or special instructions. The user may access such letters or instructions rapidly by operating a "rewind" or "fast forward" control on the device so as to drive the record medium rapidly in the reverse or forward directions. As the record medium is driven, the counter is incremented (or decremented) accordingly; and when the count therein corresponds to a count stored in the memory, as when the record medium reaches the location of the "letter" or "instruction", movement of the record medium is interrupted.

It is a feature of this aspect of the invention to provide microprocessor control over the generation of "letter" and "instruction" cue indications and to provide the user with suitable warning tones representing the recording thereof. Such microprocessor control includes the additional feature of responding to the operation of an "erase" control, such as when the device is disposed in its rewind operation, to clear a count stored in the memory when the counter is incremented (or decremented) to that count.

Another feature of this aspect of the invention is to insert into an appropriate location of the memory a count representing a "letter" or "instruction" cue indication that is inserted at a location of the record medium intermediate two previously located letter or instruction cue indications, without loss of those previous indications. An additional feature of this aspect of the invention is to delete from the memory a count representing a previous letter or instruction cue indication when new information is recorded on the record medium over that previous indication.

Yet another aspect of this invention is to provide a magnetic tape device having "rewind", "fast forward" and "stop" controls, and additionally having a "record" control if the device is a voice recorder or a "play" control if the device merely is a playback device; the device further including a microprocessor which is programmed to control substantially all of the functions carried out by the device. The microprocessor is programmed to sense which control is operated and then to dispose the device in the mode of the operation which is commanded by that control. The program takes into account various "latched" functions, wherein continuous operation of the control is not needed to maintain the operating mode of the device, as well as "momentary" functions, wherein the operating mode is terminated upon release of the control.

In accordance with one feature of this aspect, the microprocessor is programmed to impart a suitable delay in changing over the operating mode of the device in the event that this is accompanied by a change over in the direction in which the magnetic tape is driven, thus preventing damage to the tape drive mechanism or to the tape that otherwise would be caused by abrupt reversal of tape movement and also obtaining better control over the tape position counter.

BRIEF DESCRIPTION OF THE DRAWINGS

The following detailed description, given by way of example and not intended to limit the invention solely to the illustrated embodiments, should be read in conjunction with the accompanying drawings in which.

DETAILED DESCRIPTION OF A PREFERRED EMBODIMENT

The present invention, now to be described, is particularly adapted for use in a portable, battery-operated dictate device. However, as will be apparent, this invention is equally applicable to a sound recorder that may be used for other applications and need not be limited solely for use as a dictate machine. Also, and as will be apparent, the present invention may be used to control the functions of a playback device which operates merely to reproduce pre-recorded information. Still further, the record/playback device described herein preferably is used with a miniature, thumb-sized, capstan-driven magnetic tape cassette, such as the tape cassette described in aforementioned copending applications Ser. Nos. 388,539 and 388,540. However, it should be readily appreciated that, if desired, the record/playback device described herein need not be limited solely for use with magnetic tape cassettes but, rather, may be used with other record media, such as small, flexible magnetic discs which may be rotatably driven and may be selectively engaged by a magnetic head that is moved in the forward and reverse directions. Also, the record medium may comprise a bubble-memory device wherein forward and reverse "movements" are simulated by forward and reverse shifting of "bubbles" which, as is known, represent information.

The Record/Playback Device

Figure 1:
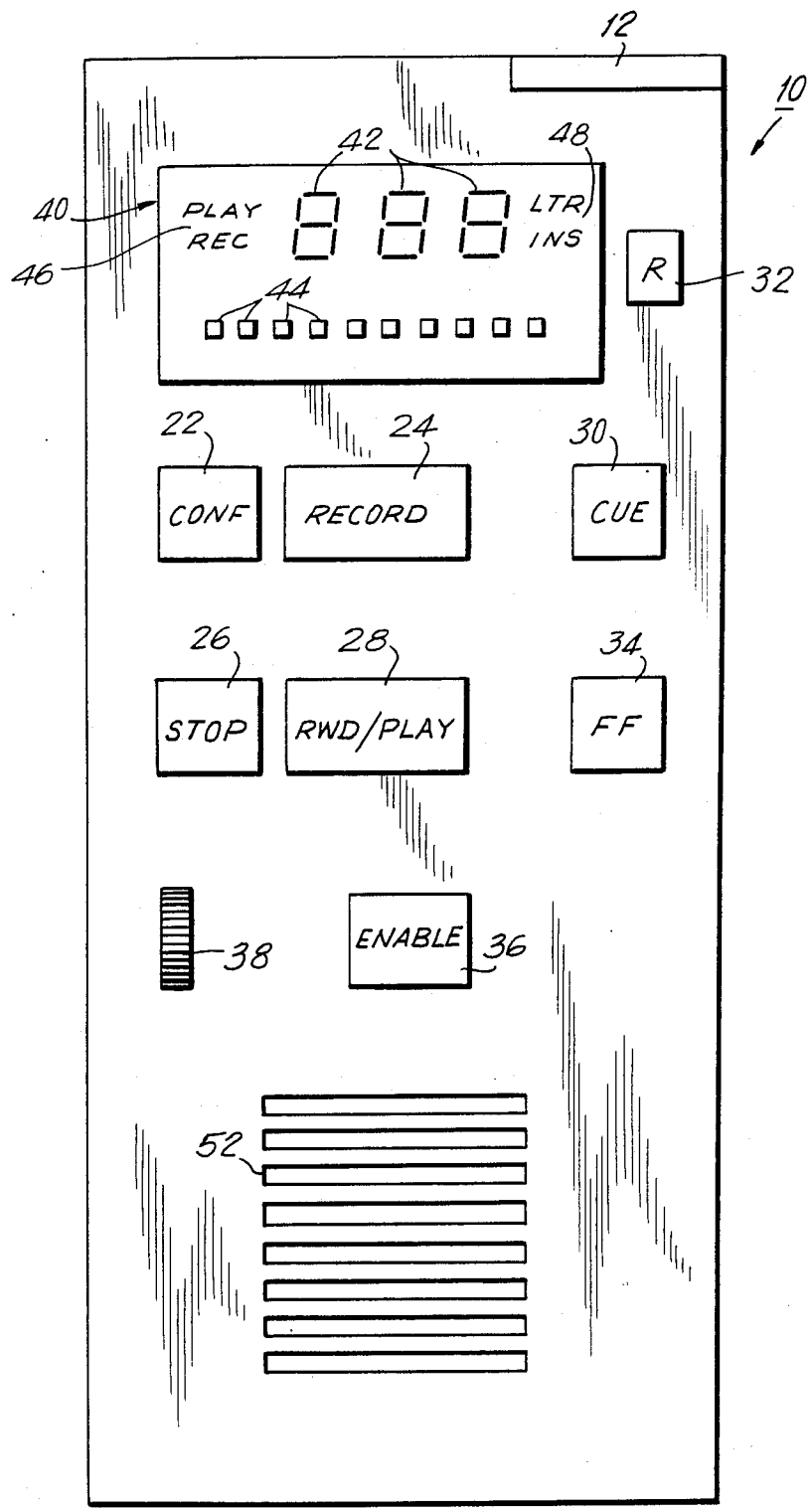
FIG. 1 is a schematic representation of a front view of one embodiment of the record/playback device in which the present invention may be used.

For convenience, the record/playback device is described herein in the context of a portable, battery-operated dictate machine. As shown in FIG. 1, device 10 is provided with a plurality of manually operable controls, plural displays, a microphone 12 (illustrated, as an example, at the upper right-hand corner of the device) and a speaker 52. In one embodiment, the manually operable controls comprise movable tactile push-button elements, each being selectively operable to control or initiate a corresponding function. Alternatively, these controls may be formed as touch-sensitive switches adapted to produce signals representing the actuation thereof when touched by the user of the device. In either embodiment, a respective signal is produced in response to the operation of a corresponding control element, and this signal is produced for so long as that element is operated. Upon release of the element, the signal terminates. Suitable push-buttons, switches and the like for providing these functions are conventional and are well known.

The displays, identified as displays 40, preferably are formed as LCD display devices which, as is conventional, require relatively little electrical energy to provide suitable indications; and, thus, advantageously impose little drain on the electrical storage battery which is used to energize device 10. Alternatively, other low-power, low-current display devices may be used to implement display 40.

Although not shown in FIG. 1, it will be appreciated that, in the embodiment described herein, device 10 is operable with a removable record medium. As mentioned above, this record medium preferably comprises a miniature, thumb-sized tape cassette. On the reverse, or backside of device 10 (not shown) there is provided a door to a cassette-receiving compartment in which the cassette is contained for operation. A suitable switch (also not shown) may be coupled to this door or may be contacted by a cassette loaded into the cassette compartment so as to produce a suitable signal when the cassette is removed. As will be described below, this switch functions to sense the ejection of the cassette and is referred to sometimes herein as an "eject" button.

The manual controls provided with record/playback device 10 include a conference record button, or switch, 22, a momentary record button, or switch, 24, a stop button, or switch, 26, a rewind/play button, or switch, 28, a cue/erase button, or switch, 30, a reset/mode button, or switch, 32, a fast forward button, or switch, 34 and a keyboard enable button, or switch, 36. For convenience, these elements are referred to merely as buttons. In addition, a volume adjustment control knob 38, such as a potentiometer, also is provided.

Conference record button 22 and momentary record button 24 are manually operable to dispose record/playback device 10 in the so-called "conference record" and "momentary record" modes of operation, respectively. When disposed in the conference record mode, the gain in the recording electronics is increased such that device 10 can be used to record a "conference" among individuals who are disposed at some distance from microphone 12. In the momentary record mode, the gain of the recording electronics is reduced, thus making the pick-up sensitivity of the device less sensitive. In the momentary record mode, it is expected that the user will hold device 10 in close proximity to his mouth. With reduced pick-up sensitivity, ambient noises will not be recorded and, thus, such noises will not interfere with the user's dictation. Furthermore, the operation of record button 24 establishes the momentary record mode for so long as this button is operated. Upon release of the record button, the mode of device 10 is changed over to an inactive, or stop, mode. However, when conference record button 22 is operated, the conference record mode is established, and this mode remains "latched" even when the conference record button is released.

Rewind/play button 28 is adapted, when operated, to dispose device 10 in a rewind mode, whereby the magnetic tape is driven in the reverse direction at a relatively high rate of speed. Upon release of button 28, the direction in which the tape is driven is reversed, and the rate at which the tape now is moved in the forward direction is reduced to the speed at which information can be played back. It is appreciated that this speed is equal to the speed at which the tape is driven when either conference record button 22 or momentary record button 24 is operated. Stop button 26, when operated, functions to change over device 10 from an active mode (e.g. record, play, etc.) to the inactive, or stop mode. It is appreciated that, in this inactive or stop mode, the tape is maintained stationary.

Cue/erase button 30 is adapted, when operated momentarily, to record a "cue" signal on the magnetic tape and, additionally, to provide a cue indication which represents the location along the tape at which the cue signal is recorded. As will be described below, this cue indication enables the user to rapidly move the tape in either the rewind or fast forward modes to the location at which that cue signal is recorded. Preferably, cue indications representing "letter" and "instruction" cues, respectively, may be recorded by selectively operating the cue button. For example, the "letter" cue indication is provided, and a corresponding "letter" cue signal is recorded, upon a single momentary operation of cue button 30. However, upon a repeated momentary operation thereof within a predetermined time period, for example, if the cue button is operated twice within a period of 1 second, an "instruction" cue is indicated and recorded.

As will be described below, display 40 includes a plural-digit (e.g. a 3-digit) numerical display 42 which functions as a tape counter to provide a numerical indication of the amount of tape which has been transported. Reset/mode button 32 is adapted, when operated or pushed for a prolonged period of time, to reset numerical display 42. When the reset/mode button is operated momentarily, the information displayed by numerical display 42 is changed over, or toggled, to display the number of "letter" cue signals that have been recorded, and/or the number of the particular letter which is being played back. Also, if device 10 is in its fast forward or rewind mode, numerical display 42 displays the number of the "instruction" cue signal that is detected.

Fast forward button 34, when operated, functions to dispose device 10 in its fast forward mode in which the magnetic tape is transported at a relatively rapid speed in the forward direction. In this mode, when the tape has been transported to a location at which a cue indication had been recorded, the tape transport provided in device 10 is temporarily interrupted so as to "pause" at that location. Hence, the tape may be rapidly transported to the location of a "letter" or an "instruction". Similarly, the tape may be rapidly transported in the reverse direction to a "letter" or "instruction" upon the operation of rewind/play button 28. That is, when device 10 is disposed in the rewind mode of operation, the tape is rapidly rewound until the location at which a cue indication had been recorded is reached, whereupon the tape transport "pauses" thereat.

Enable button 36, sometimes referred to herein as a keyboard enable button, functions in a manner analogous to a POWER ON switch. Device 10 is provided with a programmed microprocessor which is responsive to the selective actuation of the illustrated control buttons to control the operation of the device. The manner in which this microprocessor operates will be described in greater detail below. When not in use, device 10 and the microprocessor therein are disposed in a dormant, or non-operating condition. When the device is to be operated by the user, enable button 36 is operated so as to change over the device from its dormant condition to an inactive mode, thus awaiting subsequent actuation of a control button. As will be described below, when device 10 is disposed in its inactive mode, which corresponds to a "stop" mode, both the device and the microprocessor will change over to the dormant condition automatically if no active mode is initiated within a predetermined time period. Stated otherwise, when the device is disposed in its stop mode, it will revert to its dormant condition unless conference record button 22, momentary record button 24, rewind/play button 28 or fast forward button 34 is operated within the aforementioned time period. The operation of enable button 36 will bring the microprocessor out of the dormant condition.

As mentioned above, display 40 is provided with a plural-digit numerical display 42. As one example thereof, numerical display 42 may be comprised of a 3-digit display, each digit being represented by a 7-segment LCD element or other low-power numerical display device. This numerical display is adapted to be incremented and decremented as the tape is driven so as to provide a numerical indication of the amount of tape which has been transported.

Display 40 also is provided with an index display 44, a "record/play" indicator 46, and a "letter/instruction" indicator 48. Index display 44 is comprised of a plurality of individual elements or segments, such as LCD segments, which are adapted to be selectively energized to provide an indication of the approximate quantity of tape which has been transported. As an example, if index display 44 is formed of ten segments, each segment may represent approximately 10% of the overall length of tape; and as successive tape is transported in the forward direction, additional ones of segments 44 are energized. The index display is seen to be similar to a "bar graph" wherein the number of segments which are energized corresponds to the effective length of the "graph" to indicate the amount of tape which has been transported. Thus, numerical display 42 provides a relatively accurate indication of the location of the tape; and index display 44 provides a rough indication of the amount of tape which has been transported. In one embodiment, the segments which comprise the index display are selectively energized to provide a left-to-right shifting effect when device 10 is disposed in the fast forward mode; and these segments are energized to provide a right-to-left shifting effect when the device is disposed in its rewind mode.

"Record/play" indicator 46 is adapted to be energized to display REC when device 10 is disposed in its record mode and to display PLAY when the device is disposed in its playback mode. This provides the user with an indication of the particular mode of operation in which the device is disposed. "Letter/instruction" indicator 48 is adapted to display LTR when a letter cue signal is recorded and to display INS when an instruction cue signal is recorded. Also, upon the momentary operation of reset/mode button 32, the indication LTR is displayed together with a numerical indication by display 42 to indicate the number of the particular letter then juxtaposed the record/playback head of device 10. Additionally, if the aforementioned display mode had been selected, when the record medium with which device 10 is used is rewound or advanced rapidly to a previously recorded instruction cue signal, the indication INS and the number of that instruction cue signal are displayed.

In the preferred embodiment, the record medium which is used with device 10 is a capstan-driven cassette having a magnetic tape which extends between supply and take-up reels. A single, bi-directional two-speed motor is provided to drive the capstan and, also, to drive supply and take-up reel spindles, respectively. A relatively simple transmission, such as a belt-drive, is used to couple the motor to the capstan and also to the supply and take-up reel spindles. Preferably, suitable clutches are provided in the spindles to permit the tape to be bi-directionally driven between the reels.

A pinch roller is mounted on a movable device, referred to herein as an actuator, in a manner similar to that described in aforementioned, copending application Ser. No. 434,249, U.S. Pat. No. 4,547,821. During record and play modes of operation, the actuator is energized such that the pinch roller fully engages the capstan, thereby "pinching" the tape therebetween. The capstan is driven by energizing the motor in the forward direction, thereby transporting the tape from the supply reel to the take-up reel. A suitable record/playback head also is mounted on the actuator so as to be in good magnetic contact with the tape when the pinch roller is engaged. Consequently, information may be recorded on or played back from the tape by this head.

In the rewind and fast forward modes, the pinch roller is disengaged from the capstan by suitably energizing the actuator. This also withdraws the magnetic head from good contact with the tape. When the motor then is energized in the fast reverse direction, the tape is rewound from the take-up reel to the supply reel. Conversely, when the motor is energized in the fast forward direction, the tape is rapidly advanced from the supply reel to the take-up reel. Preferably, although the head is withdrawn from the tape, it still remains in sufficiently close contact so as to reproduce unintelligible sounds, simulating "monkey chatter" when the tape is driven. This apprises the operator of the rewind or fast forward modes of operation. For purposes of the present description, the position of the actuator during the rewind and fast forward modes is referred to as the "partially engaged" position, whereby the pinch roller is separated from the capstan and the head is "partially engaged" with the tape. In this partial engagement, the tape is free to be transported rapidly past the capstan; yet the head is sufficiently close to the tape so as to pick up the aforementioned unintelligible sounds but distinguish "pauses" between audio segments. Finally, when device 10 is disposed in the inactive, or stop mode, the actuator is energized so as to disengage fully both the pinch roller and head from the capstan and tape, respectively. It is this fully disengaged position that is assumed when device 10 is changed over to the aforementioned dormant condition.

As will be described below, the microprocessor is programmed to impart a suitable delay in changing over the energization of the motor between forward and reverse drives, such as when the device is changed over from its play mode to its rewind mode. This delay prevents a sudden reversal in the direction in which the tape is driven and, thus, prevents the tape drive mechanism and the tape from being damaged by such a sudden reversal, and also prevents errors in calculating the correct position of the tape.

The Overall Program

Figure 2:
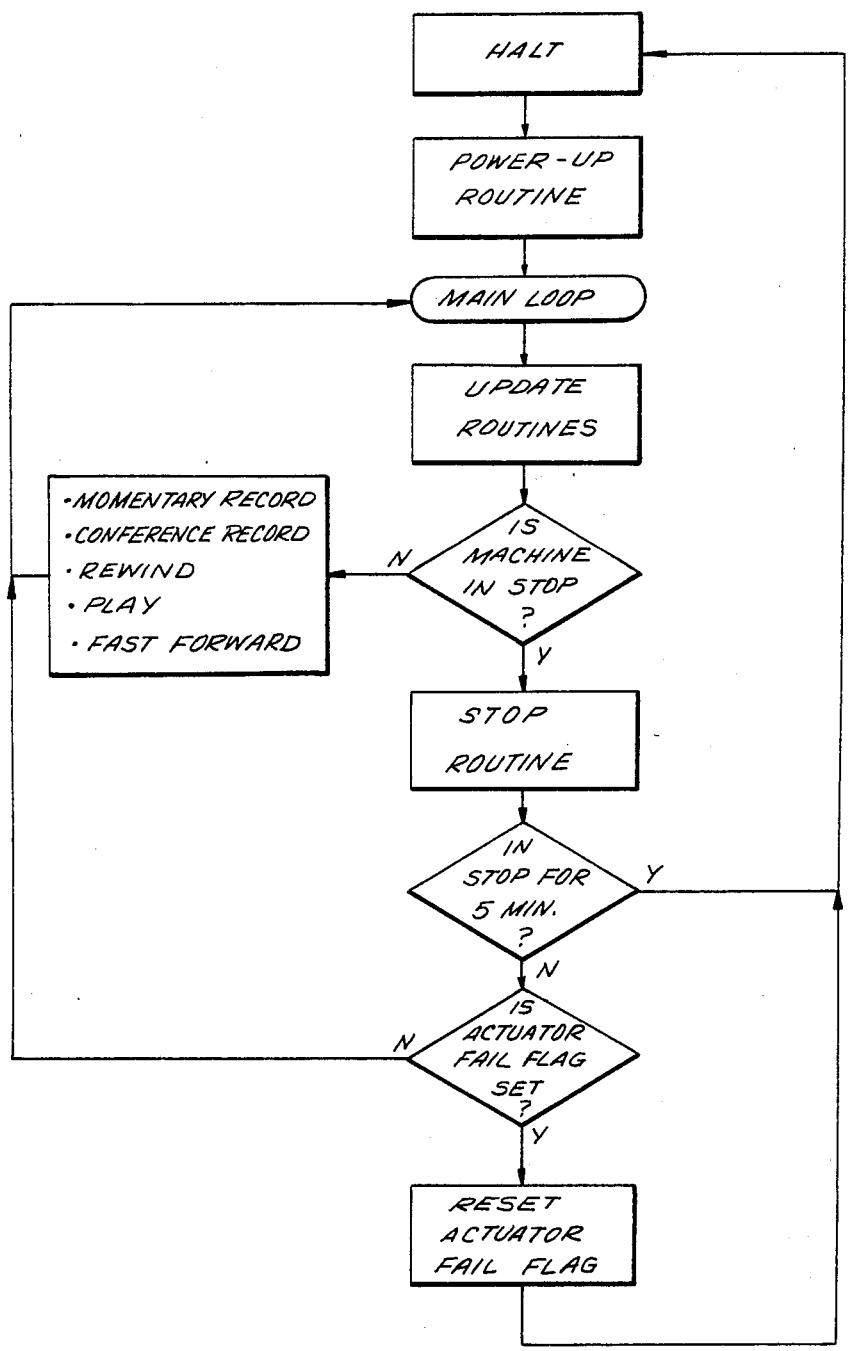
FIGS. 2–11 are flow charts corresponding to the programmed set of instructions that are used by processor apparatus in accordance with the present invention to control the record/playback device shown in FIG. 1.

Referring now to FIG. 2, there is illustrated a flow chart of the overall program for the microprocessor included in recorder 10. It will be appreciated that the term microprocessor is intended to refer to a digital central processor which operates in accordance with a cyclical programmed set of instructions and, in conjunction with various peripheral devices comprise a microcomputer. In accordance with the present invention, the central processor may include a conventional microprocessor, such as a National Semiconductor Model COPS 444C, a Hitachi Model LCD-3, or the like. The overall program described herein is represented in the form of flow charts which may be implemented by any of the foregoing microprocessors.

The overall program includes, broadly, a power-up routine that is carried out when device 10 is brought out of its dormant condition, as when enable button 36 (FIG. 1) is operated, and a main loop which is executed when the device is changed over from its dormant routine. The main loop includes various update routines, the relevant ones of which are described in greater detail below. Included in these update routines are a tone and timer update routine and a tape counter update routine. When carrying out the tone and timer update routine, various timers are incremented in response to the clock circuit of the microprocessor.

The tone and timer update routine functions to control the generation of warning tone signals upon the occurrence of certain predetermined events. For example, when certain cue signals are generated, the tone routine initiates the generation of a corresponding warning tone such that the user of device 10 is apprised of the generation of the cue signal. Also, when the magnetic tape with which device 10 is used is advanced to an end zone region thereof, an appropriate warning tone is generated to apprise the user that only a relatively small quantity of tape remains available for further recording. In addition, when the tape has been fully advanced such that the end of tape has been reached, a suitable warning tone is generated. Still further, when device 10 is operated in a mode whereby previously recorded information is erased from the magnetic tape, suitable warning tones are generated during this erase process.

After the tone and timer update routines are carried out, the microprocessor carries out its tape counter update routine. The purpose of this routine is to update various tape counters which are used to indicate the amount of tape which has been transported and, additionally, to indicate the present position of the tape.

After carrying out the update routines, the microprocessor advances to inquire whether device 10 (also referred to in these flow charts as the "machine") is disposed in its stop mode. As will be described, this inquiry is determined by sensing which, if any, of the control buttons is operated; and if it is determined that the device is not disposed in its stop mode, then the routine commanded by the operated control button is carried out prior to cycling through the main loop once again. For example, the momentary record routine is executed if record button 24 is operated; the conference record routine is carried out if conference button 22 had been operated; the rewind routine is carried out if rewind/play button 28 is operated; the play routine is carried out if the rewind/play button had been operated and then released; and the fast forward routine is carried out if fast forward button 34 is operated. If none of these control buttons is operated, or if stop button 26 is operated, the inquiry as to whether the device is disposed in its stop mode is answered in the affirmative, and the stop routine is carried out. This routine is described in greater detail hereinbelow with respect to the flow chart shown in FIG. 7A. As part of the stop routine, inquiry is made as to whether device 10 has remained in the stop mode for a predetermined time (e.g. five minutes). If so, the device promptly assumes its dormant (or "halt") condition. But, if the device has not remained in the stop mode for this predetermined time, inquiry next is made as to whether the actuator on which the pinch roller and record/playback head are supported, has failed in not returning to its fully disengaged position. If so, a suitable indication thereof is provided and the device then assumes its dormant condition. However, if the actuator has not failed, the microprocessor cycles through the main loop once again.

Main Loop

Figure 3:
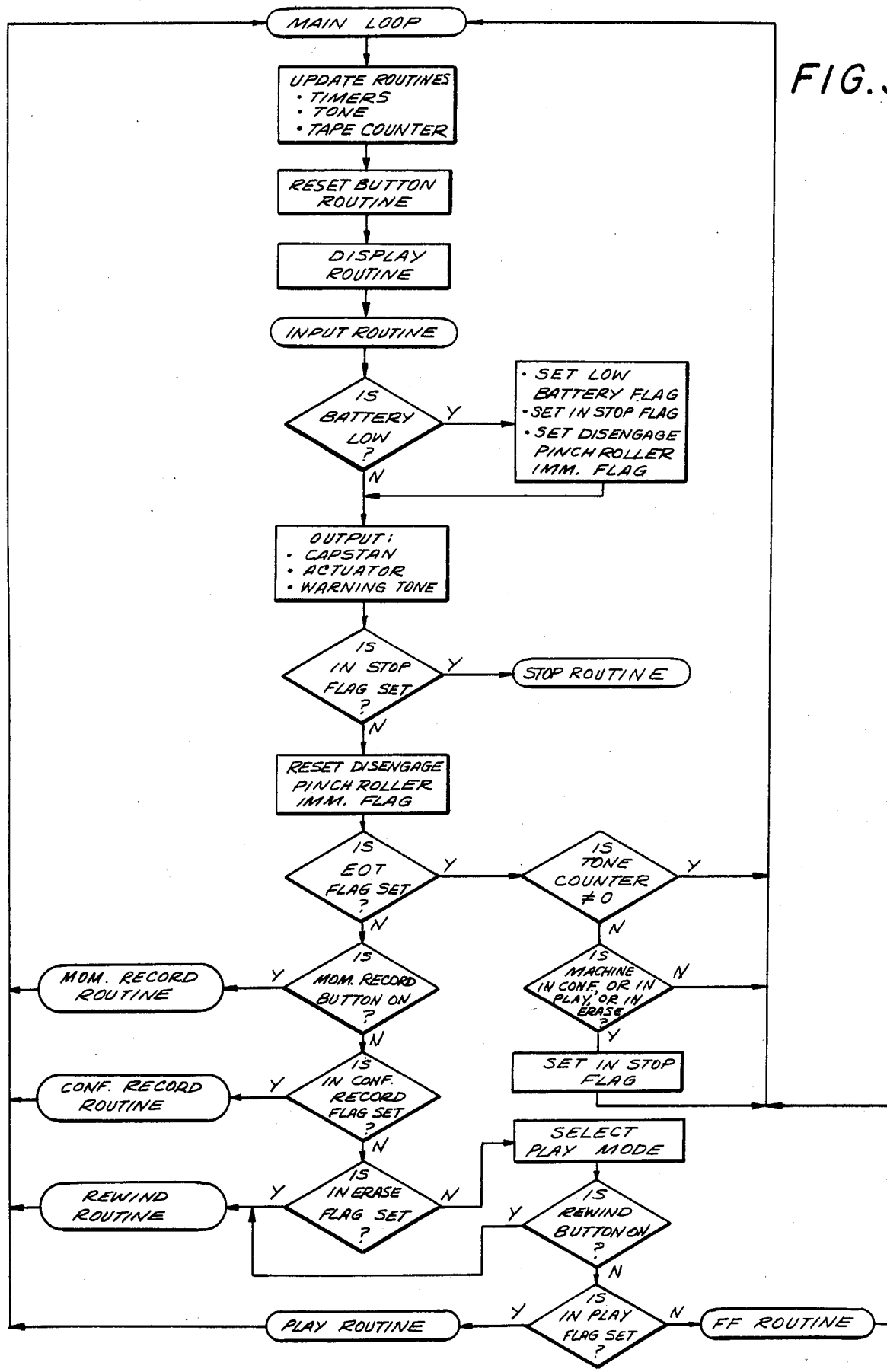

In the flow chart illustrated in FIG. 3, the main loop commences with update routines for the various timers, for tone generation and for the tape counter. The tone and timer update routine is described below with respect to the flow chart shown in FIG. 4; and the tape counter update routine is described with respect to the flow chart of FIG. 5. After these update routines are carried out, a reset button routine is executed. This routine detects whether reset/mode button 32 is operated and, if so, whether display 40 is in its "tape count" mode, whereby numerical display 42 displays a count representing the present position of the record medium, or if the display is in its "cue" mode, whereby the numerical display displays the number of the particular letter now juxtaposed the record/playback head or the number of the particular instruction to which the record medium has been rewound or advanced. After carrying out the reset button routine, a display routine is executed, by which the appropriate information is displayed on display 40, e.g. whether a tape count or letter count or instruction count is displayed. The reset button and display routines are described more particularly in copending application Ser. No. 564,480. After carrying out these routines, the main loop advances to the input routine.

Figure 6:
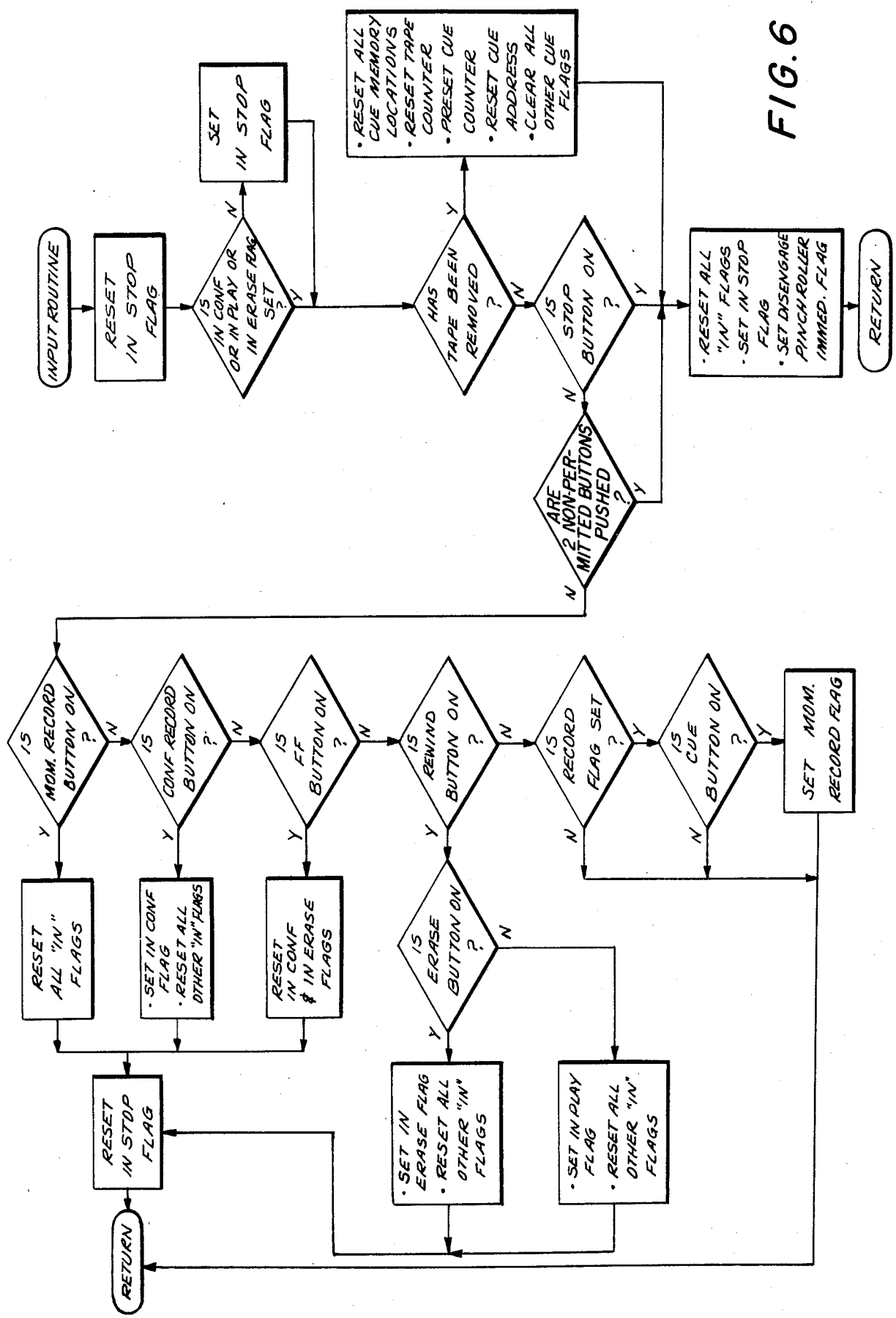

The input routine is described with respect to FIG. 6. In this routine, the operation of a control button is sensed; and various flags are set or reset for use in establishing the commanded mode of operation of device 10. Hence, the input routine may be thought of as preconditioning the microprocessor for the subsequent execution of a suitable active (or inactive) routine.

After carrying out the input routine, the main loop inquires as to whether the energy level of the battery is below a threshold level. If this battery check inquiry results in an affirmative answer, a low battery flag is set, an in stop flag is set and a disengage pinch roller immediately flag is set, all in preparation for changing over the device to its stop mode and thence to its dormant condition. The low battery flag, if set, is used in the display routine to effect a suitable display of a low battery condition (e.g. by "flashing" whatever is displayed on display 40). After these flags are set, suitable output signals are supplied to the capstan motor, the actuator motor and a warning tone generator. As illustrated in FIG. 3, these output signals also are provided in the event that the battery check inquiry results in a negative answer.

The signal supplied to the capstan motor is an energizing signal to turn this motor ON or OFF and, when turning the capstan motor ON, the type of energization. That is, the capstan may be turned ON to drive the tape in the normal forward direction for recording or playback, or the motor may be energized for fast forward operation or for rewind operation. Likewise, the signal supplied to the actuator motor may turn this motor ON or OFF. When turned ON, the actuator is driven in the manner described in aforementioned copending application Ser. No. 434,249, now U.S. Pat. No. 4,547,821. The pinch roller and head thus are brought to their engaged positions, or to their partially engaged positions, or to their disengaged positions, depending upon when this actuator motor is turned OFF. Finally, the signal supplied to the warning tone generator is adapted to turn the generator ON or OFF. A warning tone is generated when the generator is turned ON. As will be described below, the signal supplied to the warning tone generator is controlled by the tone update routine.

After supplying suitable signals to the capstan motor, the actuator motor and the warning tone generator, the main loop advances to inquire as to whether the in stop flag is set. This flag is set if the energy level of the battery has been detected as being low, as mentioned above, and also is set if, during the input routine, stop button 26 is sensed as being operated, or none of the control buttons is sensed as being operated and no flag which represents an active mode is set. When this in stop flag is set, the microprocessor jumps to the stop routine, described below with respect to FIG. 7A. However, if the in stop flag is not set, the main loop proceeds to reset the disengage pinch roller immediately flag. This flag is set whenever the actuator is to be driven to re-position the pinch roller, as when the stop button is operated, or the battery level is detected as being low, or two operating buttons are operated concurrently.

After resetting the disengage pinch roller immediately flag, inquiry is made as to whether the end-of-tape (EOT) flag is set. If the tape has been advanced or rewound to the end or beginning thereof, respectively, this EOT flag will be set. If so, inquiry is made as to whether the count of the tone counter differs from zero. This tone counter determines the number of warning tone pulses that are to be generated, and the tone counter is decremented from various preset counts in accordance with the type of warning tone that is to be produced. If this tone count differs from zero, the microprocessor returns to the beginning of the main loop and the routine thus far described is repeated. However, if the tone count is equal to zero, inquiry next is made as to whether device 10 is disposed in its conference, play or erase modes. If not, the microprocessor returns to the beginning of the main loop. However, if the EOT flag has been set and if the tone count is equal to zero and if the device is disposed in its conference, play or erase modes, the in stop flag is set to enable the microprocessor to enter its stop routine; and the microprocessor then returns to the beginning of its main loop.

If, however, the EOT flag is not set, inquiry is made as to whether momentary record button 24 is operated. If so, the microprocessor advances to the momentary record routine, described in FIGS. 8A, 8B and 8C, and when this routine is completed, the microprocessor returns to the beginning of the main loop.

If the momentary record button is not being operated by the user, inquiry is made as to whether the conference record flag is set. This flag will be set when the user operates conference record button 22, and will remain set even when this button is released. If the conference record flag is set, the microprocessor jumps to the conference record routine, described below with respect to FIGS. 8A, 8B and 8C, and when this routine is completed, the microprocessor returns to the beginning of the main loop.

If the conference record flag is not set, inquiry is made as to whether the erase flag is set. As will be described below with respect to the input routine shown in FIG. 6, the erase flag is set when rewind/play button 28 and cue/erase button 30 both are operated concurrently. In the present embodiment, these are the only two buttons that, when operated concurrently, do not change over the device to its inactive, or stop, mode. If the erase flag is set, the microprocessor jumps to the rewind routine and, when this routine is completed, the microprocessor returns to the beginning of the main loop. However, if the erase flag is not set, the playback electronics are set, or enabled. This is represented in the flow chart of FIG. 3 by selecting the playback mode. One of ordinary skill in the art will recognize that this permits a single head to play back prerecorded information (when the play mode is selected) or to record information (when the record mode is selected). Then, after selecting the play mode, inquiry is made as to whether rewind/play button 28 is operated. If so, the microprocessor jumps to the rewind routine. If not, inquiry is made as to whether the in play flag is set. As will be described, the in play flag is set during the input routine when the rewind button is sensed as being operated but the cue/erase button is sensed as being not operated. If the in play flag is set, the microprocessor jumps to the play routine, described below with respect to FIG. 10. After this routine is completed, the microprocessor returns to the beginning of the main loop. However, if the in play flag is not set, the microprocessor jumps to the fast forward routine, described with respect to FIG. 11; and when this routine is completed, the microprocessor returns to the beginning of the main loop. Thus, in accordance with the hierarchy represented by the flow chart of FIG. 3, if the in stop flag is not set, the fast forward routine is carried out by a process of elimination if no other control button is operated and if no other active mode flag is set.

The microprocessor recycles through the main loop, with controlled jumps to the stop, momentary record, conference record, rewind, play or fast forward routines, periodically. Although the particular routine to which the microprocessor jumps is determined by the selected operation of the control buttons, it is seen from the illustrated flow chart that the tone and timer update routines as well as the tape counter update routine, and also the input routine, are carried out during each cycle through the main loop regardless of the operated control button. Reference now is made to the tone and timer update routine which is functionally represented by the flow chart of FIG. 4.

Tone and Timer Update Routine

In the tone and timer update routine, inquiry is first made as to whether a timer has overflowed. For convenience, this timer is referred to as the "primary" timer and is adapted to be driven by the usual clock circuit for the microprocessor. When a predetermined number of clock pulses is received, the primary timer overflows and is reset to, for example, a zero count. It is appreciated that the time duration required for this primary timer to overflow is substantially constant and, for the purpose of a numerical example, may be on the order of about 16 msec. When this timer overflows, various display timers are updated, and additional timers are incremented. These timers merely may be comprised of counters, and each such counter is incremented upon the overflow of the primary timer. For the purpose of the present description, when the primary timer overflows, each of additional timers such as a tone timer, a cue timer, a change direction timer, an erase timer, a pause timer, a stop timer, an end zone timer and an EOT timer is incremented. During certain routines, respective ones of these timers are reset. The use of such timers will be described below in conjunction with various ones of these routines.

After the aforementioned timers are incremented or, in the alternative, if the primary timer has not overflowed, inquiry is made as to whether a tone flag is set. As will be described, this flag is set when a warning tone is to be generated. If this tone flag is not set, inquiry is made as to whether the count of the tone counter is equal to zero. This is the same tone counter about whose count inquiry was made in the main loop. In response to certain conditions, as when the end of tape is sensed, or when a particular cue signal is generated, the count of the tone counter will be other than zero. In most other instances, however, the count of this tone counter is equal to zero. If the tone count is sensed as being zero, the microprocessor advances to the tape counter update routine. However, if the tone counter is sensed as being other than zero, inquiry next is made as to whether the tone timer (which, as mentioned above, is incremented during this routine) has a count which is equal to or greater than a count corresponding to 0.5 seconds. From the foregoing numerical example wherein the tone timer is incremented approximately once every 16 msec., a count of 32 is approximately equal to 0.5 seconds. If the count of the tone timer is less than 0.5 seconds, the tape counter update routine next is carried out. However, if the count of the tone timer is equal to or greater than 0.5 seconds, the tone timer is reset, the tone flag is set and the count of the tone counter is decremented. Then, the microprocessor advances to carry out the tape counter update routine. When the tone flag is set, the tone generator is controlled to generate the warning tone.

Returning to the inquiry of whether the tone flag is set, if so, inquiry is made as to whether the count of the tone timer is equal to or greater than one second. If not, the tape counter update routine is executed. However, if the count of the tone timer is equal to or greater than one second, the tone timer is reset and the tone flag (which had been set in order to arrive at this point) is reset. Then, the microprocessor advances to carry out the tape counter update routine.

Tape Counter Update Routine

Figure 5A:
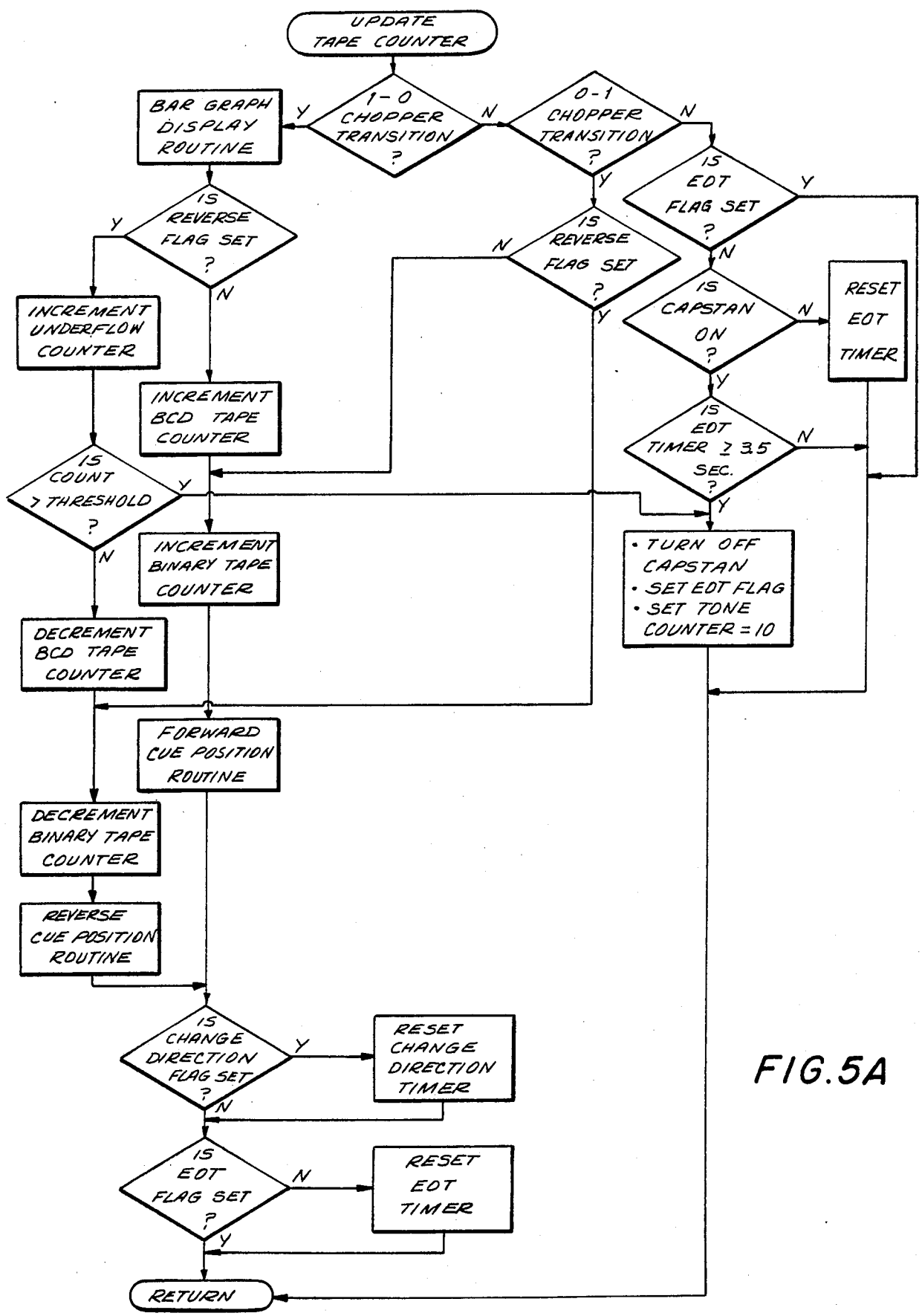

After the tone and timer update routine is carried out, as described above, the microprocessor advances to execute the tape counter update routine, diagrammatically represented by the flow chart shown in FIG. 5A. The purpose of this routine is to sense when tape is moved and the direction in which movement is effected. Preferably, a so-called chopper wheel is mechanically coupled to the supply reel drive spindle so as to generate pulses at a rate corresponding to the rotary speed of the supply reel. Chopper wheels of various constructions are known to produce voltage transitions as the reel rotates. For convenience, a voltage transition from a relatively higher voltage level to a lower level is referred to herein as a transition from a binary "1" level to a binary "0" level (a 1/0 transition), and a voltage transition from a relatively lower voltage level to a relatively higher level is referred to as a binary "0" to binary "1" transition (a 0/1 transition).

Preferably, the chopper wheel is mechanically coupled to the supply reel drive spindle. Hence, as tape continues to be wound upon the take-up reel, the supply reel rotates at a faster speed because of reduced tape diameter. Consequently, the chopper pulses likewise exhibit a higher repetition rate. Alternatively, if the chopper wheel is mechanically coupled to the take-up reel drive spindle, the repetition rate of the chopper pulses decreases as more tape is wound upon the take-up reel. The tape counter update routine increments or decrements a tape counter, thus generating information as to the relative location of the tape along its length.

As shown in FIG. 5A, the tape counter update routine commences by sensing whether a 1/0 chopper pulse transition is present. If not, inquiry is made as to whether a 0/1 transition is present. In the absence of a chopper pulse transition, inquiry is made as to whether an end-of-tape (EOT) flag is set. If it is, the microprocessor now returns to the main loop to continue with the main loop routine following the update routines. However, if the EOT flag is not set, inquiry is made as to whether the capstan motor is operating. If not, the EOT timer, which is incremented during the tone and timer update routine, is reset; and the microprocessor then returns to the main loop. But, if the capstan motor is on, inquiry is made as to whether the count of the EOT timer is equal to or greater than 3.5 seconds. If the count of the EOT timer is less than this quantity, the microprocessor returns to the main loop. But, if the count of the EOT timer is equal to or greater than 3.5 seconds, the capstan motor is turned off, the EOT flag is set and the tone counter is set to a predetermined count, for example, a count of ten. Then, the microprocessor returns to the main loop. It will be seen that the end of tape (EOT) is sensed when no chopper pulse transitions are produced while the count of the EOT timer is incremented to a count equivalent to 3.5 seconds. It will further be seen that the EOT timer is permitted to be incremented during active modes, that is, when the capstan motor is energized to drive the tape. However, when the capstan motor is turned off, the EOT timer is reset during each cycle through the tape counter update routine.

Let it be assumed that a 1/0 chopper pulse transition is sensed: A bar graph display routine, described in copending application Ser. No. 564,480 first is carried out to update index display 44 (FIG. 1), and then inquiry is made as to whether a reverse flag is set. As will be described below, the reverse flag is set when, for example, rewind/play button 28 is operated to rewind the tape. If this flag is not set, a BCD tape counter is incremented. Then, a binary tape counter is incremented. Although two different tape counters are employed in one embodiment of this invention, it will be appreciated that, if desired, only a single tape counter may be used.

If a 1/0 chopper pulse transition is not present but a 0/1 transition is, inquiry is made as to whether the reverse flag is set. If not, the binary tape counter is incremented. It is seen, from the flow chart shown in FIG. 5A, that the binary tape counter is incremented in response to each chopper pulse transition; but the BCD tape counter is incremented only in response to 1/0 chopper pulse transitions. The binary tape counter thus is provided with a count of higher resolution and more precision than the BCD tape counter. Nevertheless, the count provided by the BCD tape counter is sufficient to be displayed by numerical display 42 (FIG. 1) and provide an indication of the present location of the tape. Alternatively, the BCD tape counter can be omitted and the binary tape counter used to control display 42. In addition to controlling the numerical display, the count present in the tape counter, preferably the binary tape counter, is used to indicate the locations of cue signals which are recorded on the tape. This is described in greater detail below with respect to the flow charts shown in FIGS. 8A, 8B, 8C and 10.

In the event that the reverse flag is set when a 1/0 or 0/1 chopper pulse transition is sensed, the BCD and binary tape counters are decremented accordingly. In particular, if the reverse flag is set when a 1/0 transition is detected, an underflow counter first is incremented. Then, inquiry is made as to whether the count of this underflow counter is greater than a threshold value. It will be appreciated that, during a rewind operation, if the tape breaks, the supply reel drive spindle may, nevertheless, continue to be driven. To apprise the user that, in fact, the tape has broken and is not being rewound, the underflow counter is incremented in response to 1/0 chopper pulse transitions; and when the count of this underflow counter exceeds a threshold value, the capstan motor is turned off, the EOT flag is set and the tone counter is set to a predetermined count such as the count of ten, all this being similar to the operations that take place when the end of tape has been reached. Thus, the underflow counter is used to sense the possibility of tape breakage in the rewind mode. It will be appreciated that if the tape breaks when being transported in the forward direction, the supply reel no longer rotates; and this is the very same condition which obtains when the end of tape is reached. There is, therefore, no need to provide separate means by which tape breakage in the forward direction is sensed.

If the underflow counter has not been incremented beyond the threshold value, the BCD tape counter is decremented and then the binary tape counter also is decremented. From the flow chart of FIG. 5A, it is seen that if a 0/1 transition is sensed and if the reverse flag is set, then only the binary tape counter is decremented. Thus, the binary tape counter is both incremented and decremented in response to each chopper pulse transition, whereas the BCD tape counter is incremented and decremented in response only to 1/0 chopper pulse transitions.

After the binary tape counter is updated, that is, after it has been incremented or decremented, depending upon whether the reverse flag is set, a forward or reverse cue position routine is carried out. More particularly, the forward cue position routine is executed when the tape is driven in the forward direction and the reverse cue position routine is executed when the tape is driven in the reverse direction. The purpose of the forward or reverse cue position routine is to update a cue memory address which addresses a cue memory that stores, in separate addressable locations, counts of the binary tape counter that represent those locations on the magnetic tape at which letter or instruction cue signals have been recorded. In one embodiment, such counts are stored in successive locations of a "letter" section of the cue memory to represent the locations of letter cue signals, and other counts are stored in successive locations of an "instruction" section of the cue memory to represent the locations of instruction cue signals. The cue memory address is adapted to address the next successive location in the "letter" or "instruction" section of the cue memory to store a "letter" count or "instruction" count, respectively, if a letter or instruction cue signal is generated. However, if the tape is rewound past a previously recorded cue signal, the cue memory address should be decremented to make available the cue memory location that stored a "letter" or "instruction" count that may be discarded. Similarly, if the tape is advanced past that previously recorded cue signal, the cue memory address should be incremented to make available the next cue memory location because the previously stored "letter" or "instruction" count may be retained.

Figure 5B:
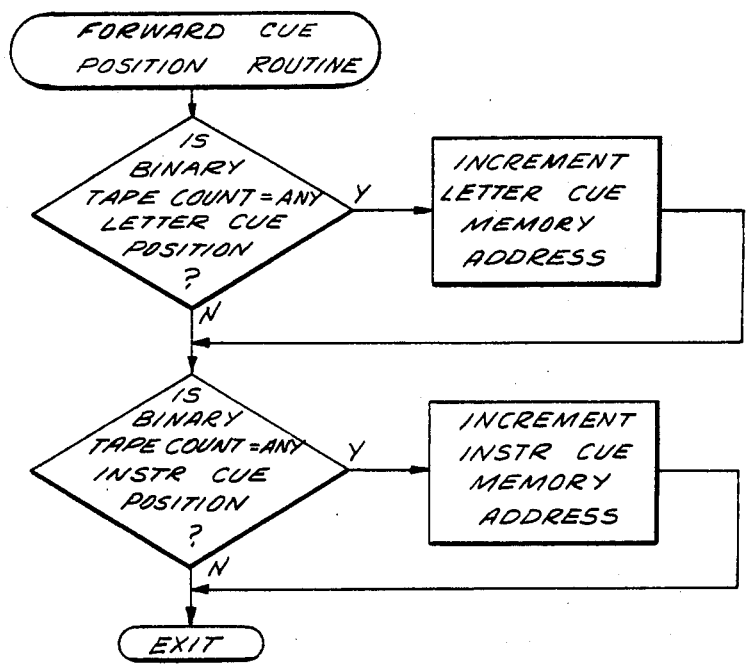

Turning to FIG. 5B, the forward cue position routine is carried out by inquiring if the present count of the binary tape counter is equal to any count stored in the "letter" section of the cue memory. This inquires if the present position of the tape is equal to a position at which a letter cue signal had been recorded. If so, the letter cue memory address is incremented. Then, after the letter cue memory address is incremented or, alternatively, if the count of the binary tape counter is not equal to a stored letter cue position, inquiry is made if the count of the binary tape counter is equal to a stored count representing the location (or position) of a previously recorded instruction cue signal. If this inquiry is answered in the negative, the microprocessor exits the forward cue position routines to continue the tape counter update routine. But, if the tape is positioned at a location at which an instruction cue signal had been generated, the instruction cue memory address is incremented, thereby addressing the next successive location of the "instruction" section of the cue memory. Then, the microprocessor exits the forward cue position routine.

Figure 5C:
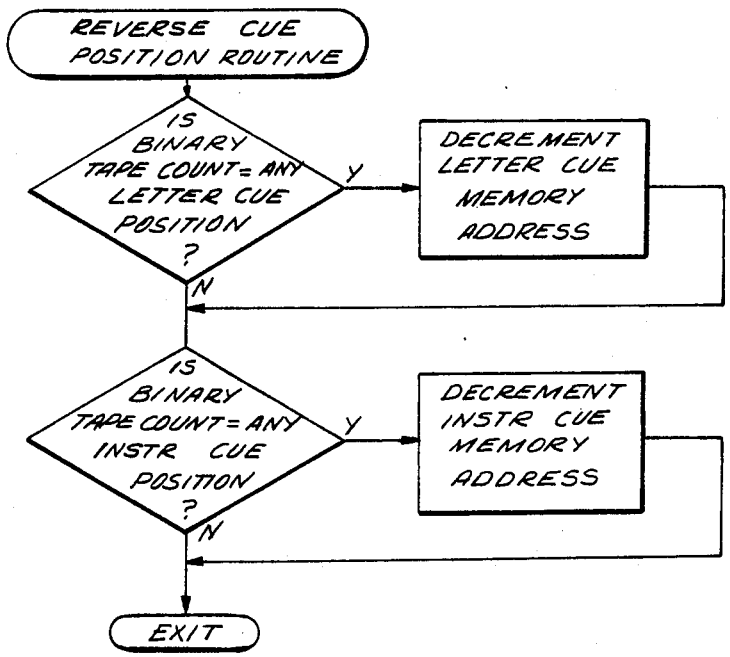

The reverse cue position routine is similar to the forward cue position routine and is represented by the flow chart of FIG. 5C. As before, inquiry first is made of whether the present count of the binary tape counter is equal to a stored count representing the location of a previously recorded letter cue signal. If so, the letter cue memory address is decremented. Then, or in the alternative if this inquiry is answered in the negative, inquiry next is made as to whether this count of the binary tape counter is equal to a stored count representing the location of a previously recorded instruction cue signal. If so, the instruction cue memory address is decremented and the microprocessor then exits the reverse cue position routine to continue the tape counter update routine. However, if this last inquiry is answered in the negative, the microprocessor merely exits the reverse cue position routine and continues the tape counter update routine.

Thus, it is seen that the cue memory address is incremented or decremented, depending upon the direction in which the tape is moved, when the present position of the tape coincides with a previously recorded letter or instruction cue signal. When the tape is reversed to pass over a previously recorded cue signal, that cue signal may be discarded because its stored count (representing the position at which it had been recorded) now may be "over-written" in the cue memory.

After the forward or reverse cue position routine is carried out, inquiry is made as to whether the change direction flag is set. This flag is set when the direction in which the tape is driven is reversed. Thus, if the tape had been driven in the forward direction to carry out a record or play or fast forward operation, the change direction flag will be set in response to the operation of rewind/play button 28. Alternatively, if the tape had been driven in the reverse direction, the change direction flag will be set when rewind/play button 28 is released or when conference record button 22 or momentary record button 24 or fast forward button 34 next is operated. If the inquiry as to whether the change direction flag is set is answered in the affirmative, the change direction timer (mentioned in connection with the tone and timer update routine of FIG. 4) is reset. Next, or if the change direction flag is not set, inquiry is made as to whether the EOT flag is set. If so, the microprocessor returns to the main loop; and if not, the EOT timer first is reset before returning to the main loop.

Input Routine

After returning to the main loop upon the completion of the tape counter update routine, the microprocessor proceeds, as illustrated in the flow chart of FIG. 3, until the input routine is reached. The input routine is shown by the flow chart of FIG. 6 and will now be described. Initially, the in stop flag is reset. As will become apparent, this flag normally is reset when device 10 is disposed in an active mode. After the in stop flag is reset, inquiry is made as to whether the device is in its conference mode, its play mode or its erase mode. If not, the in stop flag is set and the input routine advances to the next inquiry. If, however, the conference, play or erase mode is present, the in stop flag is not set, and the input routine then advances to the next inquiry of whether the record medium (assumed herein to be a tape cassette) has been removed from the device. For example, a suitable flag may be set or reset when the record medium is loaded and ejected, respectively, from the device. Sensing of this flag determines whether the record medium has been removed. If the record medium has been removed, that is, if this inquiry is answered in the affirmative, all cue memory locations—both "letter" and "instruction" cue locations—are reset, the binary tape counter is reset, the cue memory address is reset, a cue counter (which counts the number of "letter" cue signals and the number of "instruction" cue signals that have been recorded) is preset and all other cue flags that may have been set are reset. Thus, upon removal of the record medium, all stored cue information associated therewith is cleared in preparation for a fresh record medium that may be loaded into the device.

Continuing with the flow chart shown in FIG. 6, if the record medium has not been removed from the device, inquiry is made as to whether the stop button is operated. If so, the input routine advances to reset all "in" flags, that is, to reset the in conference, in play or in erase flag, to set the in stop flag and to set the disengage pinch roller immediately flag. It will be explained below that the last-mentioned flag is used to control the actuator for selectively positioning the pinch roller and record/playback head. Then, the microprocessor returns from the input routine to the main loop to continue through the main loop.

The aforementioned "in" flags will be reset and the in stop flag will be set following the resetting of all of the cue memory locations, the resetting of the tape counter, the resetting of the cue memory address, the presetting of the cue counter and the clearing of all other cue flags, in the event that the record medium has been removed from the device.

If the stop button is not operated, inquiry is made as to whether any two operating buttons are operated concurrently (except for the concurrent operation of the rewind and cue/erase buttons which is needed to effect an erase operation). If this inquiry is answered in the affirmative, the "in" flags are reset, the in stop flag is set and the disengage pinch roller immediately flag is set. However, if two operating buttons are not operated concurrently, inquiry next is made as to whether momentary record button 24 is operated. If so, the aforementioned "in" flags are reset and, as illustrated in FIG. 6, the in stop flag also is reset. The microprocessor then returns to the main loop.

However, if the momentary record button is not operated, inquiry is made as to whether conference record button 22 now is being operated. If so, the in conference flag is set and the other "in" flags (i. e. the in play and in erase flags) are reset. Then, the in stop flag is reset and the microprocessor returns to the main loop. However, if the conference record button is not being operated, inquiry is made as to whether fast-forward button 34 is being operated. If so, the in conference and in erase flags are reset, the in stop flag also is reset and the microprocessor returns to the main loop.

If the fast forward button is not being operated, inquiry is made as to whether rewind/play button 28 is being operated. If so, inquiry next is made as to whether cue/erase button 30 also is being operated. If it is, the in erase flag is set, all other "in" flags are reset, the in stop flag also is reset and the input routine returns to the main loop. But, if the rewind button is being operated but the erase button is not, the in play flag is set, all other "in" flags are reset, the in stop flag also is reset and the microprocessor next returns to the main loop.

If the rewind button is not being operated, inquiry is made as to whether the record flag has been set. If not, the input routine merely returns to the main loop. But, if this inquiry is answered in the affirmative, the next inquiry which is made is whether cue/erase button 30 is being operated. If it is, the momentary record flag is set and the microprocessor then returns to the main loop. But, if the record flag is set but cue/erase button 30 is not being operated, the input routine merely returns to the main loop.

Thus, the input routine functions to detect whether an operating button has been pushed and, if so, to set an appropriate flag as a function of that button. For example, if the conference record button is pushed, the in conference flag is set. If the rewind button is pushed, the in play flag is set. If the rewind button and the cue/erase button are pushed concurrently, the in erase flag is set. If the stop button is pushed, the in stop flag is set. If two operating buttons are pushed concurrently (with the exception of the rewind and cue/erase buttons), the in stop flag is set. Finally, if no operating button is pushed and if the device is not in its conference, play or erase modes of operation, the in stop flag is set. It will be appreciated, from the discussions set out below, that the input routine conditions the device to operate in the mode which is selected by the operator.

Figure 7A:
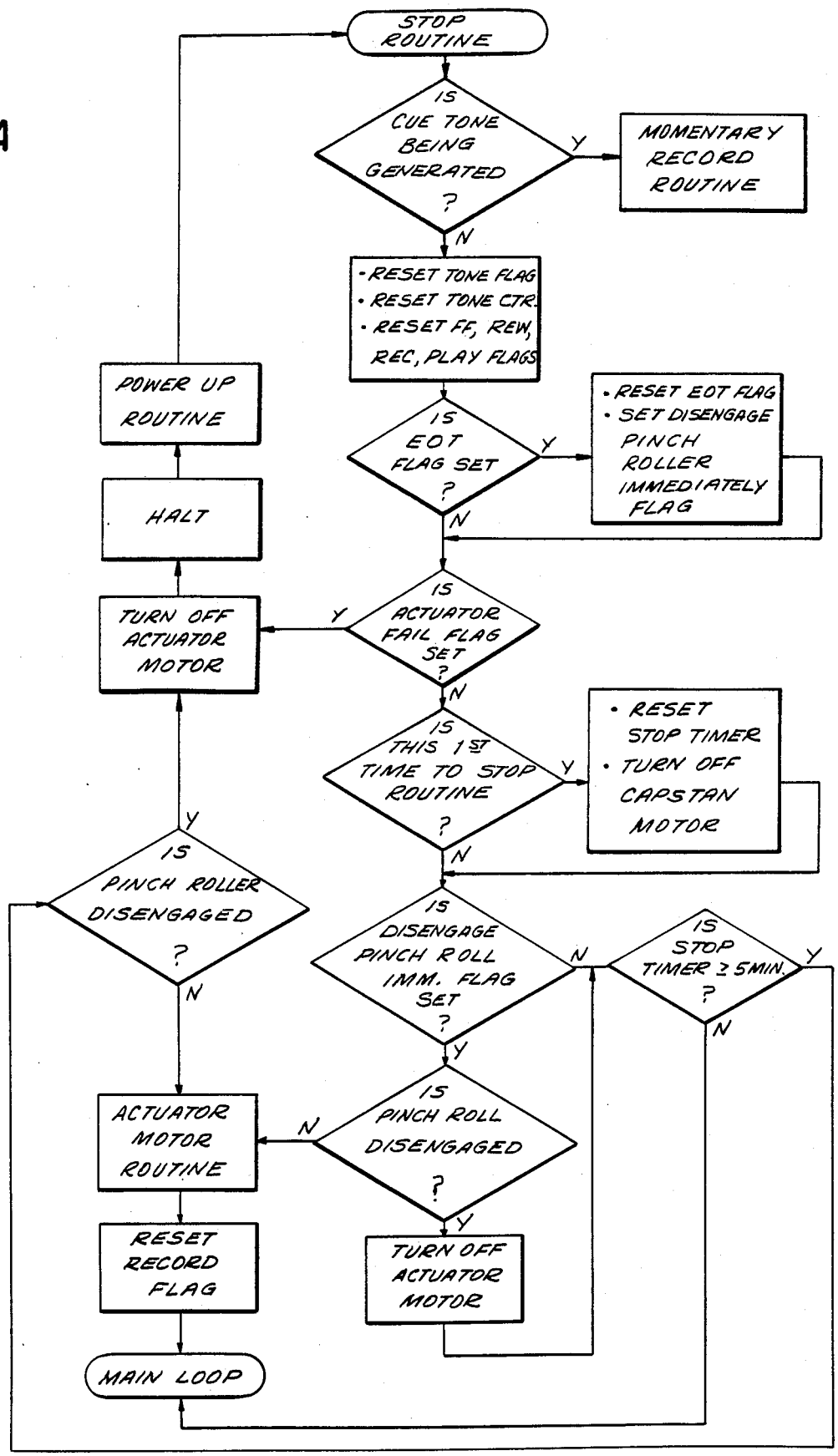

As described above, after the input routine is executed, the main loop proceeds, as illustrated in FIG. 3. If, in executing this main loop, inquiry as to whether the in stop flag is set is answered in the affirmative (the in stop flag having been set during the input routine), the main loop jumps to the stop routine. The flow chart which functionally represents this stop routine is illustrated in FIG. 7A and now will be described.

Stop Routine

Inquiry initially is made as to whether a cue tone is being generated. If so, the stop routine branches to the momentary record routine, described below with respect to FIGS. 8A, 8B and 8C. However, if the cue tone is not being generated, the tone flag is reset, the tone counter is reset and the fast forward, rewind, play and record flags all are reset. Then, inquiry is made as to whether the EOT flag is set. If so, this flag is reset (which results in the termination of end-of-tape warning tones) and the disengage pinch roller immediately flag is set. Then, the next inquiry is made. However, if the EOT flag is not set, the stop routine proceeds immediately to this next inquiry.

As shown, the next inquiry is whether the actuator fail flag is set. This flag is set, as will be described below with respect to FIG. 7B, in the event that the actuator is energized to withdraw the pinch roller and record/playback head to their disengaged positions, but fails to do so. If this inquiry is answered in the affirmative, thus indicating that the actuator has not disengaged the pinch roller and head, the actuator motor is turned off and the microprocessor and device both advance to the dormant condition. The device may be brought out of the dormant condition by operating enable button 36, which initiates the power-up routine, from which the microprocessor advances to the illustrated stop routine. Although not described in detail herein, one purpose of the power-up routine is to determine when the enable button has been operated or the battery used to power the device has been replaced. If the latter, the tape counters and cue memory are cleared. Another purpose of the power-up routine is to reset the actuator fail flag.

Returning to the stop routine, if the inquiry as to whether the actuator fail flag is set is answered in the negative, inquiry then is made as to whether this is the first branch to the stop routine. If so, the stop timer is reset and the capstan motor is turned off. However, if this is not the first cycle through the stop routine, inquiry next is made as to whether the disengage pinch roller immediately flag has been set. If so, inquiry is made as to whether the pinch roller is disengaged, and if it is not, the actuator motor is turned on by executing the actuator motor routine illustrated in FIG. 7B until the pinch roller is sensed as being fully disengaged. If the pinch roller is fully disengaged, the inquiry as to whether this pinch roller is disengaged is answered in the affirmative; and then the actuator motor is turned off and inquiry is made as to whether the stop timer has been incremented to a count that is equal to or greater than five minutes. This inquiry as to the count of the stop timer also is made if, in the stop routine, the inquiry of whether the disengage pinch roller immediately flag is set is answered in the negative. If the stop timer, which is reset in the first cycle through the stop routine, has been incremented to a count that is not yet equal to five minutes, the microprocessor returns to the beginning of the main loop. However, once this timer has been incremented to a count equal to or greater than five minutes, that is, once it is determined that device 10 has been in its inactive mode for at least five minutes, the stop routine advances to inquire as to whether the pinch roller is disengaged. Usually, this inquiry now will be answered in the affirmative, and the microprocessor then advances to the dormant condition after turning off the actuator motor. However, if the pinch roller is not yet disengaged, the actuator motor routine is carried out until pinch roller disengagement; whereupon the actuator motor is turned off and the microprocessor returns to the main loop. As illustrated, after cycling through the actuator motor routine, the record flag is reset. Subsequently, the dormant condition is assumed.

Actuator Motor Turn-On Routine

Figure 7B:
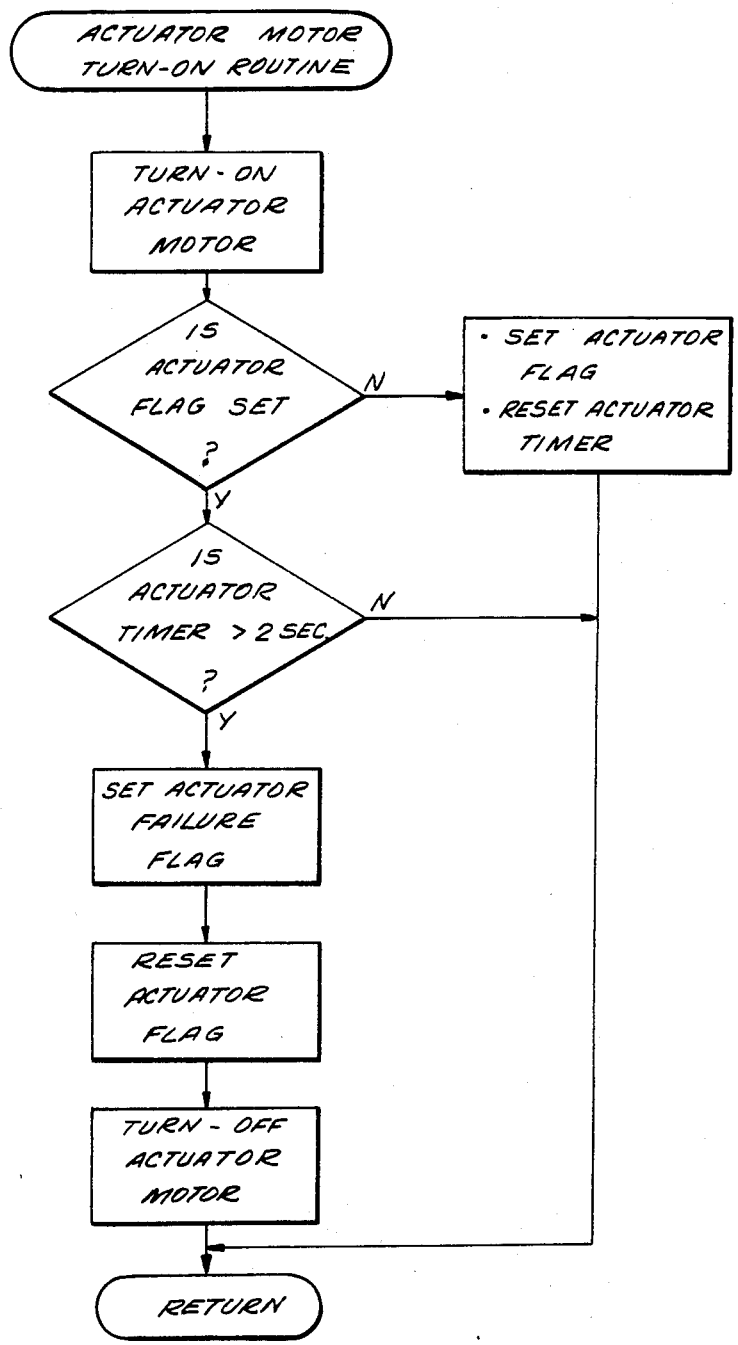

The actuator motor turn-on routine is illustrated by the flow chart shown in FIG. 7B. The microprocessor carries out this routine whenever the pinch roller and record/playback head are to be moved from one position to another. For example, if the pinch roller and head are to be moved to their fully disengaged position, or to their partially engaged position, or to their fully engaged position, as in response to the operation of the stop button, the rewind or fast forward buttons, the momentary record or conference record buttons, or the release of the rewind button, the actuator motor turn-on routine is executed.

On cycling through the actuator motor turn-on routine, the actuator motor first is turned on, and then inquiry is made as to whether an actuator flag is set. Normally, this flag is not set; and this inquiry is answered in the negative. Consequently, the actuator flag is set and an actuator timer is reset. Then, the microprocessor returns to that portion of its program from which it entered the actuator motor turn-on routine.

In the event that the actuator flag had been set, resulting in an affirmative answer to the inquiry of whether this flag is set, inquiry next is made as to whether the actuator timer has exceeded a count corresponding to 2 seconds. If not, the microprocessor returns to that portion of its program from which it entered the actuator motor turn-on routine; but if the actuator timer has exceeded a count corresponding to 2 seconds, the actuator failure flag is set. Then, the actuator flag is reset and the actuator motor is turned off. The microprocessor then returns to that portion of its program from which it entered the actuator motor turn-on routine.

Thus, from the routine described above and illustrated in FIG. 7B, it is seen that a time period of 2 seconds is established for the actuator to be driven to its commanded position (i.e. to its fully disengaged, its partially engaged or its fully engaged position). If this has not occurred, the actuator failure flag is set and, as illustrated in the stop routine flow chart of FIG. 7A, this results in disposing the microprocessor and device in its dormant condition.

Momentary Record and Conference Record Routines

Figure 8A:
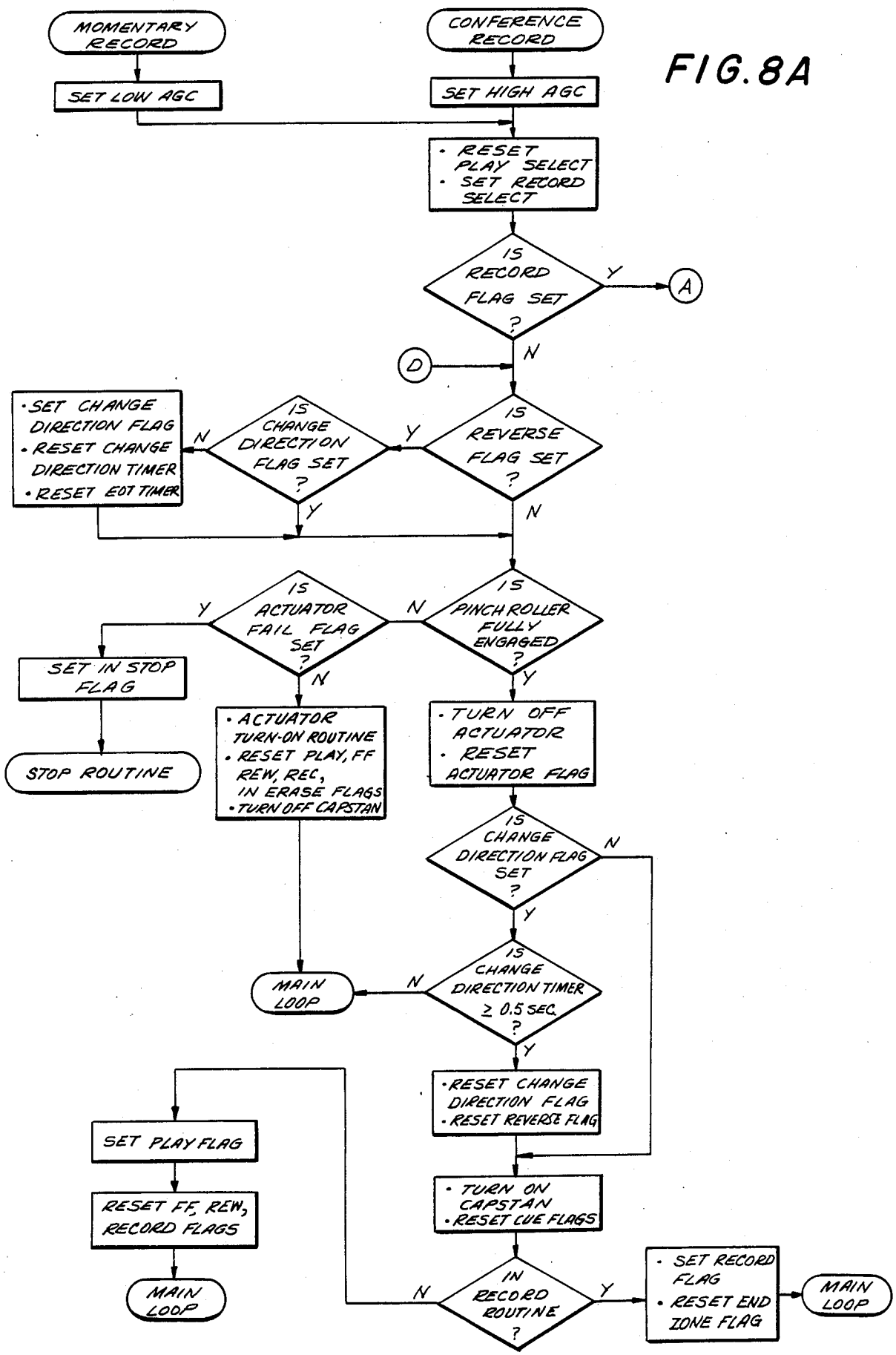
Figure 8B:
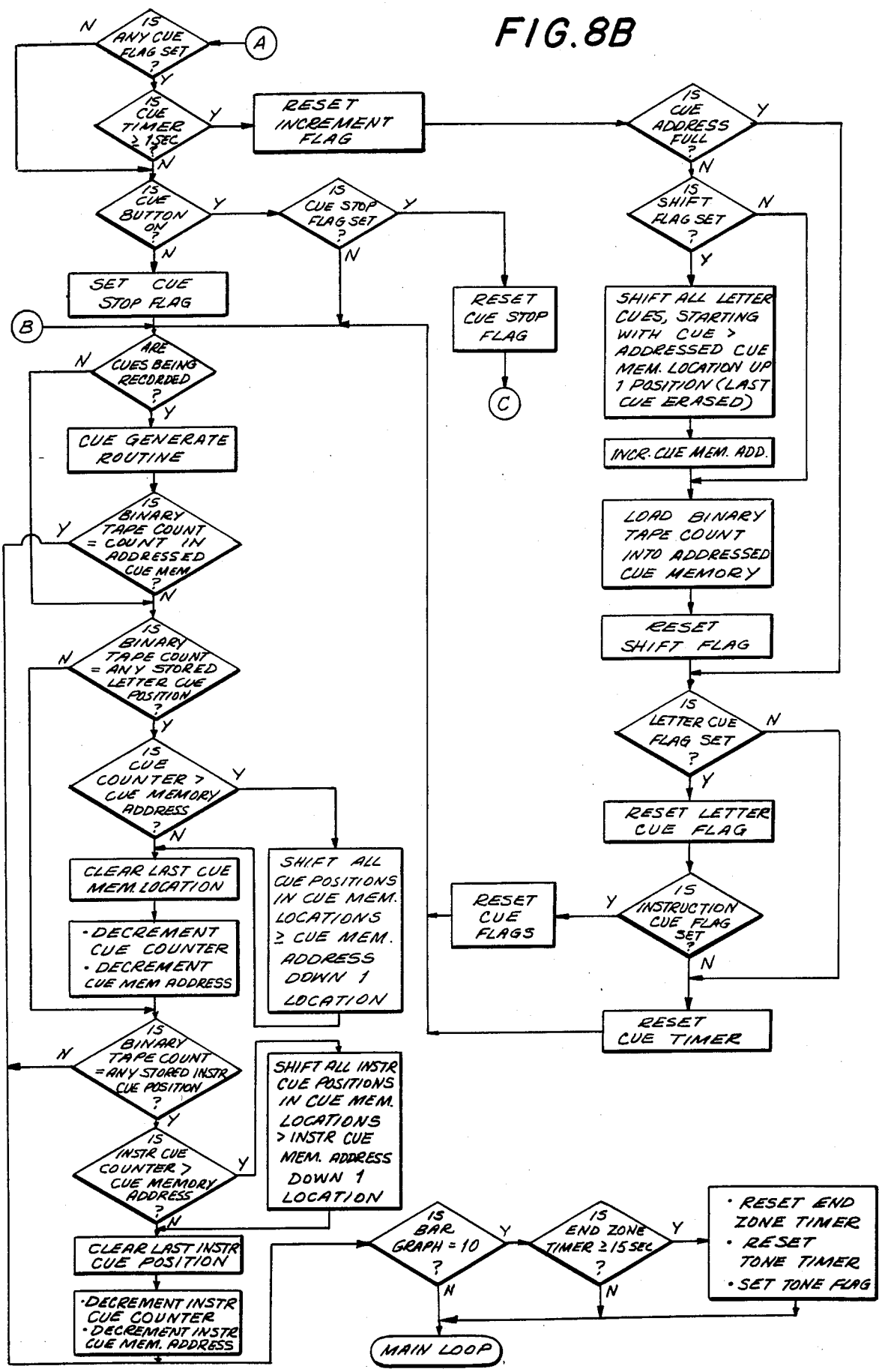
Figure 8C:
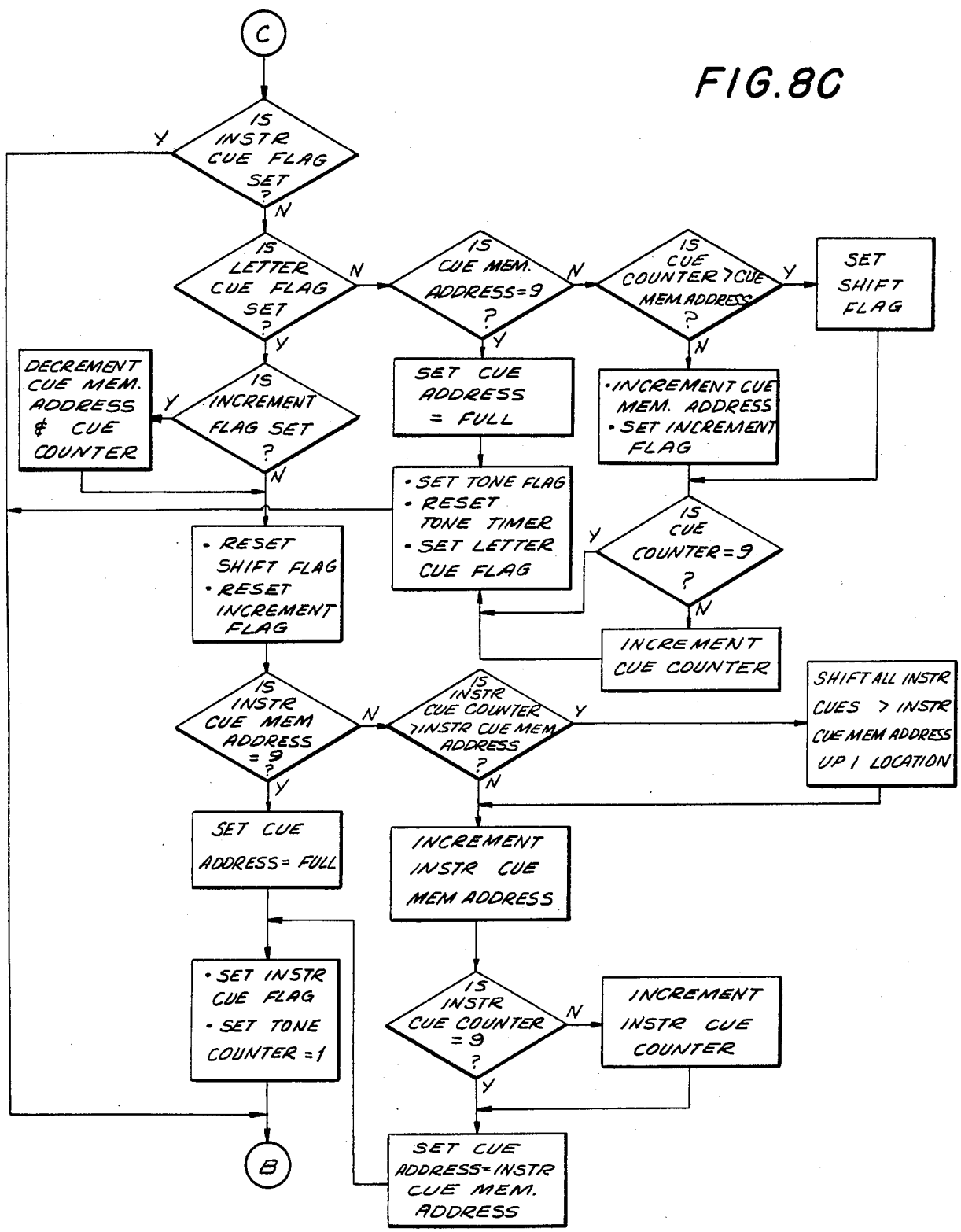

The momentary record routine is carried out if, while executing the main loop, the momentary record button is sensed as being operated. The conference record routine is carried out if, during the input routine, the conference record button is sensed as being operated, thus setting the in conference record flag, and then while executing the main loop, the in conference record flag is sensed as being set. The momentary and conference record routines are quite similar, with the only major difference being the setting of the record amplifier gain. These routines are illustrated in FIGS. 8A, 8B and 8C. As illustrated, when the momentary record routine is carried out, a low AGC or low record amplifier gain, is set. However, when the conference record routine is carried out, a high AGC, or amplifier gain, is set. Thereafter, both routines are identical.

After setting the record amplifier gain, the record electronics are enabled and the playback electronics are inhibited. Thus, play select is reset and record select is set. It is appreciated that the microprocessor provides suitable output signals to selectively control the gain of the record amplifier and circuitry and also to selectively enable and disable the record and playback circuitry.

After the record circuit is enabled, inquiry is made as to whether the record flag is set. If not, as when this is the first cycle through the record routine, inquiry is made as to whether the reverse flag is set. If it is, as when the immediately preceding active mode of the device was the rewind mode, inquiry is made as to whether the change direction flag is set. If not, then this flag is set, the change direction timer is reset and the EOT timer also is reset. Both of these timers are incremented during the tone and timer update routine, as described above with respect to FIG. 4. Then, inquiry is made as to whether the pinch roller is fully engaged. From the flow chart shown in FIG. 8A, it is recognized that this inquiry also is made in the event that the reverse flag is not set or in the event that, although the reverse flag is set, the change direction flag also is set.

It is appreciated that, in order to advance the tape at the record speed, the pinch roller must be fully engaged. Hence, if the inquiry as to whether the pinch roller is fully engaged is answered in the negative, inquiry next is made as to whether the actuator fail flag is set. If not, the actuator motor routine (FIG. 7B) is carried out in order to engage the pinch roller. Also, the play, fast forward, rewind, record and in erase flags all are reset, and the capstan motor is turned off. Thus, the capstan is not driven while the actuator is turned on, thereby conserving battery power. Then, the record routine advances to the beginning of the main loop. However, if the actuator fail flag has been set, as described above in conjunction with FIG. 7B, the microprocessor advances to the stop routine.

If, however, the inquiry as to whether the pinch roller is fully engaged is answered in the affirmative, the actuator motor is turned off, the actuator flag (which had been set during the actuate motor routine) is reset, and inquiry next is made as to whether the change direction flag is set. If so, thus indicating that the previous active mode of the device was the rewind mode, inquiry is made as to whether the count of the change direction timer is greater than or equal to 0.5 seconds. This timer had been reset previously in the record routine, and if the timer is not equal to 0.5 seconds, the microprocessor advances to the beginning of the main loop. But, if the count of the change direction timer is equal to or greater than 0.5 seconds, the record routine advances to reset the change direction flag and to reset the reverse flag. Next, the capstan motor is turned on and the "letter" and "instruction" cue flags are reset. As illustrated, the capstan motor is turned on and these cue flags are reset in the event that the change direction flag had not been set.

Then, inquiry is made as to whether device 10 is being commanded to operate in its record mode. If not, the play flag is set and the fast forward, rewind and record flags are reset. The microprocessor then returns to the beginning of the main loop.

However, if the record mode is commanded, the record flag is set, the end zone flag is reset and the record routine advances to the beginning of the main loop.

The foregoing steps, commencing with the inquiry as to whether the reverse flag is set, is based upon a negative answer to the inquiry as to whether the record flag is set. If, however, this record flag is set, the record routine advances to point A shown in FIG. 8B, to inquire whether any cue flag (i.e. the "letter" or "instruction" cue flag) is set. If no cue flag is set, inquiry next is made as to whether cue button 30 is being operated. If the cue button is not operated, the cue stop flag is set and the record routine advances to inquire if any cue signals (i.e. letter or instruction cue signals) are in the process of being recorded. If so, a cue generate routine (similar to that described in U.S. Pat. No. 4,378,577) is carried out and then inquiry is made whether the count of the binary tape counter is equal to a count stored in the location of the cue memory which is addressed by the cue address generator. Stated otherwise, inquiry is made as to whether the binary tape count is equal to a cue position count stored in the addressed cue memory location. From the flow chart of FIG. 8B, this inquiry also is made if cue signals are not in the process of being recorded.

If the preceding inquiry is answered in the affirmative, the record routine advances to inquire whether the last element of bar graph display 44 (FIG. 1) is energized. However, if the binary tape count is not equal to the cue position count stored in the addressed location of the cue memory, inquiry next is made as to whether the binary tape count is equal to any letter cue position count stored in the cue memory. If so, inquiry is made as to whether the count of a letter cue counter is greater than the letter cue memory location then being addressed. The microprocessor (or equivalent) includes a letter cue counter which is incremented each time a letter cue signal is recorded and an instruction cue counter which is incremented each time an instruction cue signal is recorded. As mentioned above, the cue memory is comprised of a "letter" section and an "instruction" section, each adapted to store cue position counts representing the locations on the record medium at which letter cue signals or instruction cue signals are recorded. Preferably, letter cue position counts are stored in successive locations of the "letter" section of the cue memory and, likewise, instruction cue position counts are stored in successive locations of the "instruction" section of the cue memory. When a letter (or instruction) cue signal is recorded, both the letter (or instruction) cue counter and the letter (or instruction) cue memory address are incremented. Hence, the count of the letter (or instruction) cue counter and the letter (or instruction) cue memory address normally correspond to each other, e. g. they normally are equal. It is recalled from FIGS. 5B and 5C that the letter (or instruction) cue memory address is decremented when the record medium is rewound past the location of a previously recorded letter (or instruction) cue signal and is incremented when the record medium is advanced past such a location. Although the cue memory address is changed, the cue count is not because only the recording of additional cue signals effects a change therein. Hence the cue count is not affected merely by the rewinding or advancing of the record medium.

Therefore, if the record medium had been rewound past two or more previously recorded letter cue signals and then, during the record routine, the first of these cue signal positions is detected, the inquiry of whether the letter cue count exceeds the letter cue memory address will be answered in the affirmative. Then, the cue position counts stored in those letter cue memory locations equal to and greater than the location then being addressed by the letter cue memory address are shifted down one position, with the cue position count stored in the addressed location being "overwritten" by the cue position count stored in the next higher location. For example, if the letter cue memory address now is "4" and the letter cue count is "6", the cue position count stored in location "5" is shifted down into location "4" and the cue position count stored in location "6" is shifted down into location "5". Next, the cue position count stored in the last or highest location (e. g. location "6" in the present example) is cleared. This last step also is carried out in the event that the binary tape count is equal to a stored letter cue position count but the cue count does not exceed the letter cue memory address. For example, if the record medium is reversed and then advanced to record information over the position at which the last letter cue signal was recorded, the cue position count representing that last letter cue signal simply is cleared from the cue memory.

After the letter cue position count stored in the last location of the cue memory is cleared, both the letter cue counter and the letter cue memory address are decremented.

Next, a similar set of steps is carried out for instruction cue position counts. That is, inquiry is made as to whether the binary tape count is equal to any instruction cue position count stored in the cue memory. It is seen from the flow chart of FIG. 8B that this inquiry also follows in the event that the binary tape count is not equal to any stored letter cue position count. If this inquiry is answered in the negative, the routine advances to inquire if the last element of bar graph display 44 is energized. However, if this inquiry is answered in the affirmative, inquiry next is made as to whether the instruction cue count exceeds the instruction cue memory address. If so, the instruction cue position counts stored in those instruction cue memory locations greater than the location then being addressed by the instruction cue memory address are shifted down one position. Next, the count stored in the last instruction cue memory location is cleared. This last step also is carried out in the event that the binary tape count is equal to a stored instruction cue position count but the instruction cue count does not exceed the instruction cue memory address.

After the instruction cue position count stored in the last location of the instruction cue memory is cleared, both the instruction cue counter and the instruction cue memory address are decremented. Then, inquiry is made of whether the last element of the bar graph display is energized.

If the last mentioned inquiry is answered in the negative, the microprocessor returns to the beginning of the main loop. However, if the last element of the bar graph display is being energized, inquiry of whether the end zone timer has reached a count equal to or greater than fifteen seconds is made. If not, the microprocessor returns to the beginning of the main loop. But, if this inquiry is answered in the affirmative, the end zone timer is reset, the tone timer is reset and the tone flag is set. As will be described, the count of the end zone timer is used to control the generation of a warning tone which indicates that the end zone region has been reached; and this region corresponds to the energization of the last element of the bar graph display.

Returning to point A shown in the flow chart of FIG. 8B, let it be assumed that a letter or instruction cue flag has been set. The manner in which these flags are set will be described below with respect to the flow chart of FIG. 8C. Next, inquiry is made of whether the count of the cue timer is equal to or greater than one second. If it is not, inquiry then is made of whether the cue button is in the process of being operated. This inquiry has been discussed above, and the steps ensuing therefrom in the event that it is answered in the negative also have been described. If the count of the cue timer is less than one second and if the cue button is in the process of being operated, inquiry is made of whether the cue stop flag is set. Normally, this flag will be set and the record routine then advances to reset it and, thereafter, the routine proceeds to point C in the flow chart of FIG.

8C. However, if the cue stop flag is not set, for example, if this is the second cycle through the flow chart shown in FIG. 8B following the operation of the cue button, the record routine advances to inquire as to whether any cue signals are in the process of being recorded. The steps ensuing from this inquiry have been described in detail hereinabove.

Let it be assumed that, in the flow chart shown in FIG. 8B, a cue flag has been set and the count of the cue timer is at least equal to one second. The next step in the record routine is to reset an increment flag. From the discussion set out below, it will be apparent that, if desired, this step, as well as the increment flag, may be omitted.

Next, inquiry is made as to whether the cue memory is full. For example, if a letter cue signal is in the process of being recorded, this inquiry is determined by detecting whether the highest letter cue memory address has been reached. Similarly, if an instruction cue signal is in the process of being recorded, this inquiry is determined by sensing if the highest instruction cue memory address has been reached. If so, that is, if the cue memory address is full and, thus, additional letter cue position counts or additional instruction cue position counts cannot be stored, the record routine advances, as shown in FIG. 8B, to inquire if the letter cue flag is set. However, if the cue memory is not full, that is, if there is an available location therein to store a letter cue position count now being produced or an instruction cue position count now being produced, inquiry is made as to whether a shift flag is set. As will be described below, the shift flag is set in the event that a letter or instruction cue signal is to be inserted between two previously recorded letter or instruction cue signals. If this shift flag is set, all letter cue position counts that are stored at letter cue memory addresses greater than the location now being addressed are shifted upward by one location; and if the letter cue memory had been filled, the letter cue position count that had been stored in the last location therein is cleared.

The aforementioned shifting operation will best be understood by a numerical example. Let it be assumed that eight letter cue position counts have been stored in locations "1" to "8" in the letter cue memory. Let it be further assumed that the record medium is rewound from its present position back through the eighth letter and then through the seventh letter and then into the sixth letter. It is recalled, from the aforedescribed reverse cue position routine (FIG. 5C) that, during this rewind operation, the letter cue memory address is decremented from its count of "8" to "7" to "6" and then, when the record medium is rewound to the sixth letter, this letter cue memory address is decremented to a count of "5". Now, let it be assumed that the user of the device modifies the sixth letter which he recorded and now records a letter cue signal upstream of the location at which the sixth letter cue signal had been recorded previously. That is, a letter cue signal now must be inserted between the fifth and sixth letter cue signals that have been previously recorded. This is effected by shifting the letter cue position counts that had been stored at letter cue memory locations "6", "7" and "8" upward by one location to new locations "7", "8" and "9", respectively. Thus, the letter cue position count that had been stored at letter cue memory location "6" is shifted into location "7", thus making location "6" available to store the letter cue position count now generated in response to the operation of the cue button. From the foregoing numerical example, it is appreciated that those letter cue position counts which were stored at locations greater than the letter cue memory location now being addressed (e.g. those locations greater than location "5") are respectively shifted upward by one location.

Returning to the flow chart shown in FIG. 8B, after the aforementioned shifting operation is carried out, the letter cue memory address is incremented; and then the binary tape count then present in the binary tape counter is loaded into the addressed letter cue memory location. Consistent with the aforedescribed numerical example, the letter cue memory address of "5" first is incremented to address location "6"; and the count then present in the binary tape counter is loaded into location "6". Hence, the location in the letter cue memory which has been made available to store an inserted cue position count now receives that count. Consequently, the successive locations within the letter cue memory have the contents thereof shifted upward accordingly in order to allow an additional cue position count to be inserted at the proper memory location.

In the event that the shift flag was not set, the count of the binary tape counter merely is shifted into the location of the letter cue memory now being addressed. That is, the aforementioned shifting operation is omitted if the shift flag is not set.

After the count of the binary tape counter is loaded into the addressed letter cue memory location, the shift flag is reset. Then, inquiry is made as to whether the letter cue flag is set. As will be described, this letter cue flag is set in response to the first operation of the cue button to indicate that the letter cue signal is being recorded. If the cue button is operated once again within one second, that is, before the count of the cue timer reaches one second, the instruction cue flag will be set. In any event, the present inquiry of whether the letter cue flag is set is reached only after the count of the cue timer reaches one second. Hence, if the letter cue flag is set at that time, it then is reset and inquiry is made of whether the instruction cue flag is set. If it is, all of the cue flags (including the instruction cue flag) are reset; and the record routine advances to the set of instructions commencing with the inquiry of whether any cue signals are being recorded.

However, if the letter cue flag is not set or, alternatively, if it is but the instruction cue flag is not set, the record routine first resets the cue timer and then advances to the set of instructions commencing with the inquiry of whether any cue signals are being recorded.

In the flow chart of FIG. 8B, the first time that the operation of the cue button is detected results in resetting the cue stop flag, whereupon the record routine advances to point C of the flow chart shown in FIG. 8C. From this point, inquiry is made of whether the instruction cue flag is set. If it is, the record routine merely returns to point B of the flow chart shown in FIG. 8B. However, if the instruction cue flag is not set, inquiry next is made as to whether the letter cue flag is set. If it is, inquiry is made as to whether the aforementioned increment flag is set. As referred to above, this flag may be omitted; but, in the embodiment described herein, it is set when the cue button first is operated, thus conditioning the record routine to respond to repeated operation thereof, as when an instruction cue signal is recorded. If the increment flag is set, the cue memory address and cue counter are decremented. As will be described, when the cue button first is operated, both the cue counter and cue memory address are incremented to indicate the recording of another cue signal and to permit the cue position count corresponding thereto to be stored in the next successive address. However, this assumes that the cue signal which is being recorded is a letter cue signal. If the operator is, in fact, recording an instruction cue signal, the cue counter and cue memory address should be decremented at this stage in the program to restore both to their conditions prior to the first operation of the cue button. That is, the cue memory address now addresses the proper location for storing an instruction (as opposed to a letter) cue position count, and the cue counter now is conditioned to indicate the recording of an instruction (as opposed to a letter) cue signal.

If the increment flag has not been set or, alternatively, after the cue memory address and cue counter had been decremented, the shift flag and the increment flag both are reset.

Let it be assumed that neither the instruction cue flag nor the letter cue flag is set. Proceeding with the record routine shown in FIG. 8C, inquiry next is made as to whether the letter cue memory address is equal to the highest location in the letter cue memory. For the purpose of the present description, it is assumed that a maximum of nine letter cue position counts and a maximum of nine instruction cue position counts may be stored in the cue memory. Of course, it is appreciated that any desired maximum number of letter and instruction cue position counts may be stored. The present discussion will proceed with the assumption that the maximum number of such cue position counts is equal to nine. If this inquiry is answered in the negative, inquiry next is made as to whether the letter cue count exceeds the letter cue memory address. A similar inquiry has been discussed hereinabove in conjunction with the flow chart shown in FIG. 8B, wherein the record medium is advanced to record information over a location at which a letter cue signal had been recorded previously.

If the letter cue count does not exceed the letter cue memory address, the letter cue memory address is incremented and the increment flag is set. It will be appreciated that, by incrementing the cue memory address, the next successive location in the letter cue memory is addressed to receive the binary tape count. Next, inquiry is made of whether the cue count has reached its maximum count (assumed herein to be the count of nine). If not, the cue counter is incremented. Thereafter, the tone flag is set, the tone timer is reset and the letter cue flag is set. These flags and timers are set and reset in the same manner in the event that the cue count is equal to nine. Then, the record routine advances to point B shown in FIG. 8B.

If the cue memory address is equal to a count of 9, the cue address is preset to a count representing that the cue memory is full; and then the tone flag and letter cue flag are set, and the tone timer is reset. However, if the cue memory address is not equal to a count of 9, but the cue count exceeds the cue memory address, the shift flag is set. From FIG. 8C, it is seen that, when the shift flag is set, the steps of incrementing the cue memory address and setting the increment flag are bypassed.

Instructions similar to those which are carried out in the event that the instruction cue flag is not set and the letter cue flag also is not set are executed in the event that the letter cue flag is set. Proceeding with the flow chart shown in FIG. 8C, and following the step of resetting both the shift flag and the increment flag, it is seen that inquiry is made as to whether the instruction cue memory address is equal to a count of 9 (i. e. the maximum count). If it is, the cue address is preset to a count representing that the instruction cue memory is full; and then the instruction cue flag is set and the tone counter is set to a count of 1. The record routine then advances to point B shown in FIG. 8B.

However, if the instruction cue memory address is not equal to 9 (that is, if it is not equal to the maximum number of instruction cue storage locations), inquiry is made as to whether the instruction cue count exceeds the instruction cue memory address. A similar inquiry has been described above with respect to the flow chart of FIG. 8B. If this inquiry now is answered in the affirmative, those instruction cue position counts which are stored at instruction cue memory locations greater than the present instruction cue memory address are respectively shifted upward by one location; and if an instruction cue position count had been stored at location "9", this position count is cleared. Then, the instruction cue memory address is incremented. It is seen that this address also is incremented if the instruction cue count does not exceed the instruction cue memory address.

After the instruction cue memory address is incremented, inquiry is made as to whether the instruction cue count is equal to 9. If not, this count is incremented. However, if the instruction cue count is equal to 9, the last-mentioned step is omitted and the cue address now is set equal to the instruction cue memory address. Thereafter, the instruction cue flag is set and the tone counter is set to a count of 1. The record routine then advances to point B of FIG. 8B.

In the present example, it is seen that the cue address normally coincides with the letter cue memory address, except when an instruction cue signal is recorded. At that time, the cue address is changed over to correspond to the instruction cue memory address. Thus, the cue memory is addressed merely by a single cue address generator which, of course, selects suitable locations in the letter or instruction sections of the cue memory. Stated otherwise, the letter and instruction cue memory addresses are multiplexed for the purpose of addressing the cue memory.

Rewind Routine

As represented by the flow chart of the main loop shown in FIG. 3, the rewind routine is carried out if the in erase flag is set or, alternatively, if the rewind button is being operated. The rewind routine is diagrammatically represented by the flow chart shown in FIG. 9A, wherein inquiry first is made as to whether the rewind flag is set. As will be described below, this flag is set when all the conditions needed to carry out a rewind operation are satisfied.

If the rewind flag is not set, inquiry is made as to whether the reverse flag is set. Here too, the reverse flag is set when all of the conditions appropriate for the rewind operation are satisfied. If the reverse flag is not set, inquiry is made as to whether the change direction flag is set. It will be appreciated that this flag is set if the immediately preceding active mode of device 10 provided for the forward movement of the tape, either at normal or fast speeds.

If the microprocessor has branched to the rewind routine and neither the rewind flag nor the reverse flag nor the change direction flag is set, the microprocessor advances to set the change direction flag and to reset both the change direction timer and the EOT timer. It is recalled that both of these timers are incremented during the tone and timer update routine. Then, inquiry is made as to whether the pinch roller is partially engaged. This same inquiry is made if the reverse flag is set or if the change direction flag is set. It is preferred that, in the rewind mode, the pinch roller be spaced from the capstan and the head be in partial engagement with the tape. This is referred to as "partial engagement" and permits the tape to be transported rapidly, and brings the head in sufficiently close proximity to the tape so as to reproduce unintelligible sounds, or "monkey chatter" as the tape is being driven. Such reproduced sounds apprise the operator that the tape is being transported and permit him to locate "blank" portions on the tape.

If the pinch roller is not partially engaged, inquiry is made as to whether the actuator fail flag is set. If it is, the in stop flag is set and the microprocessor advances to the stop routine, described above. However, if the pinch roller is not partially engaged and if the actuator fail flag is not set, the fast forward, rewind, record and play flags all are reset, the capstan motor is turned off and the actuator motor routine is carried out. The rewind routine then proceeds to the beginning of the main loop. It will be appreciated that the main loop jumps to the rewind routine and then cycles back to the beginning of the main loop until the pinch roller is sensed as being partially engaged, or until the actuator fail flag is set. When the inquiry of whether the pinch roller is partially engaged is answered in the affirmative, the "letter" and "instruction" cue flags are reset, the fast forward, rewind, record and play flags are reset and the actuator motor is turned off.

Next, inquiry is made as to whether the change direction flag is set. As mentioned above, this flag is set if the immediately preceding active mode of the device included tape movement in the direction opposite to that for which tape movement now is commanded. If the change direction flag is set, inquiry next is made as to whether the count of the change direction timer is greater than or equal to 0.5 seconds. It is recalled that the change direction timer is reset upon the first cycle through the rewind routine. If the count of the change direction timer has not yet reached 0.5 seconds, the microprocessor advances to the beginning of the main loop. Then, the microprocessor continues to cycle through the main loop and jump to the rewind routine until the count of the change direction timer is equal to or greater than 0.5 seconds. At that time, the change direction flag is reset, the reverse and rewind flags are set, the capstan motor is energized in the reverse direction and the underflow counter is reset. These operations also are carried out in the event that the pinch roller is partially engaged and the change direction flag is not set. After these operations are executed, the microprocessor returns to the beginning of the main loop.

At subsequent cycles through the rewind routine, the inquiry of whether the rewind flag is set now will be answered in the affirmative. Then, the capstan motor remains energized for reverse operation; and inquiry next is made as to whether the in erase flag is set. If not, the microprocessor advances to the cue pause routine, described below with respect to FIG. 10. However, if the in erase flag is set, an erase operation is carried out by enabling the DC erase circuitry.

Figure 9A:
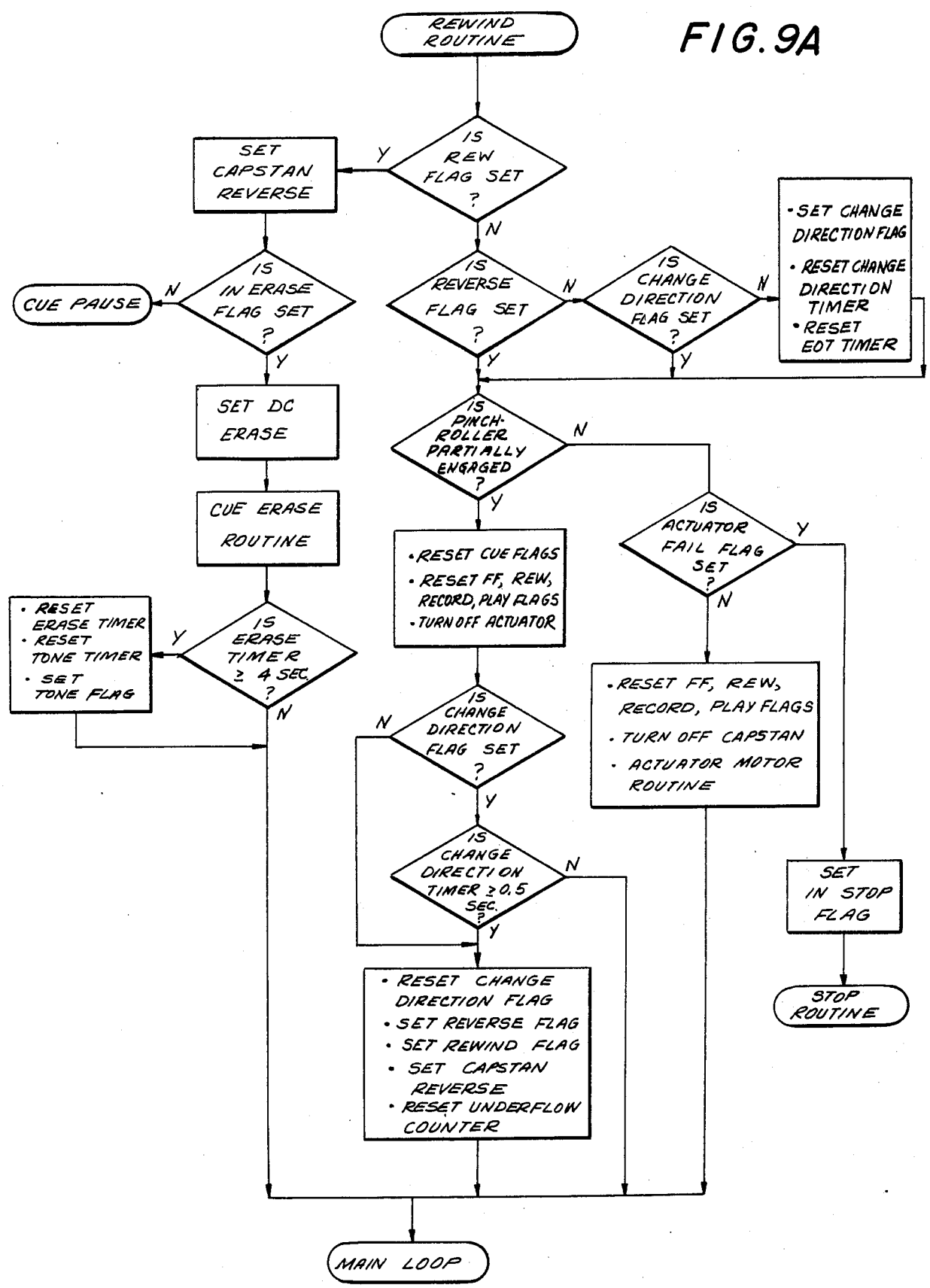
Figure 9B:
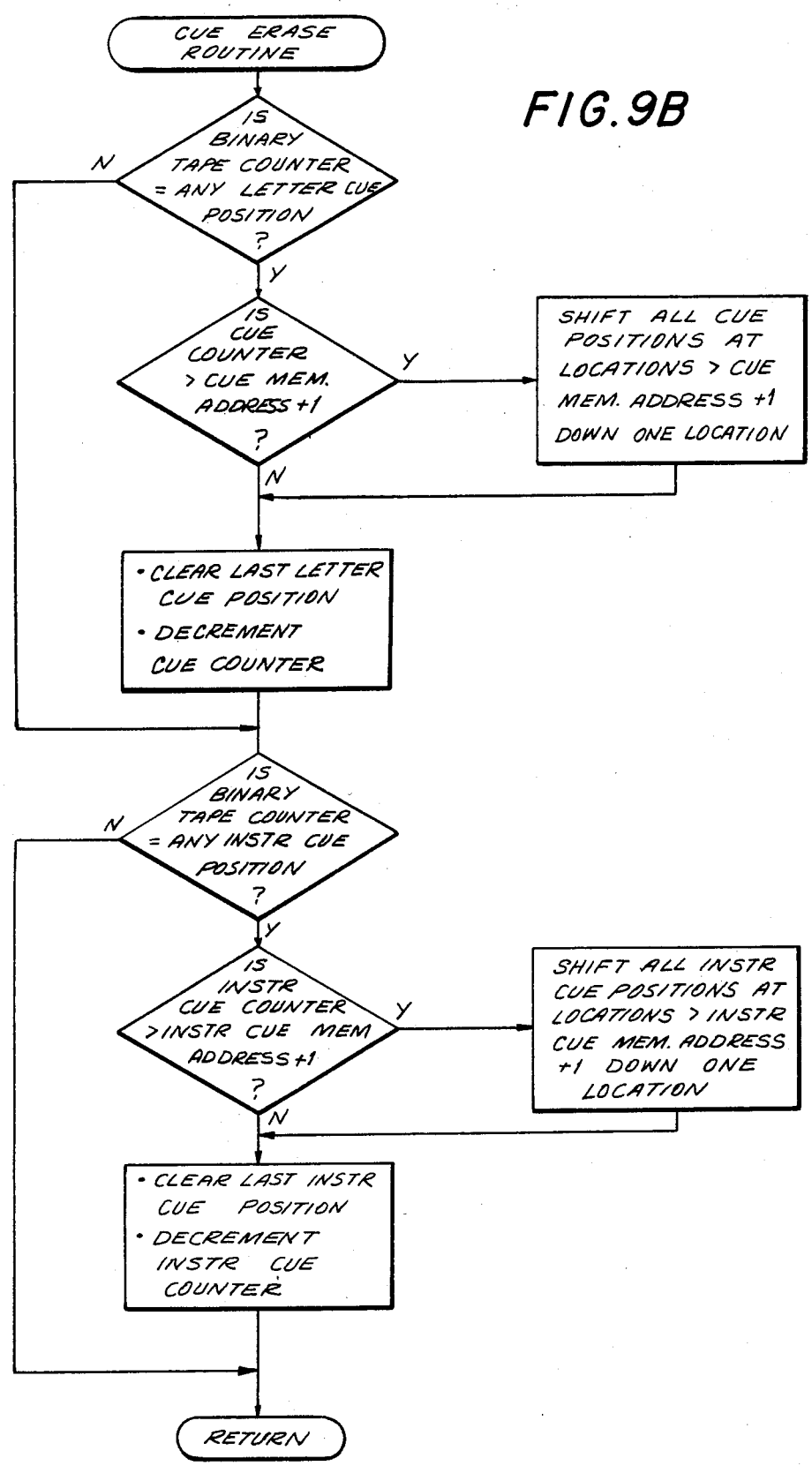

Then, a cue erase routine, described below with respect to FIG. 9B, is carried out. After the cue erase routine is performed, inquiry is made as to whether the count of the erase timer is greater than or equal to four seconds. As mentioned above with respect to the tone and timer update routine illustrated in FIG. 4, the erase timer is incremented during the tone and timer update routine. If the count of the erase timer is not yet equal to four seconds, the microprocessor returns to the beginning of the main loop. However, once the count of the erase timer reaches four seconds, that timer is reset, the tone timer is reset and the tone flag is set. Then, the microprocessor returns to the beginning of the main loop.

Cue Erase Routine

As mentioned above, this routine is carried out during the rewind routine if the in erase flag is set. The cue erase routine commences with the inquiry of whether the count of the binary tape counter is equal to any stored letter cue position count. If not, the cue erase routine jumps to inquire whether the count of the binary tape counter is equal to any stored instruction cue position count. If not, the microprocessor returns to continue with the rewind routine.

If the count of the binary tape counter is equal to a stored letter cue position count, inquiry next is made as to whether the letter cue count exceeds the letter cue memory address +1. This adding of the constant "1" to the cue memory address is needed because, it is recalled, during a rewind operation, the cue memory address is decremented when the location on the record medium at which a previously recorded letter cue signal is reached. The letter cue count will exceed the cue memory address +1 if additional letter cue position counts had been inserted between previously recorded letter cue position counts. If this inquiry is answered in the negative, thus indicating that the last-recorded letter cue signal has been reached, the letter cue position count stored in the last, or highest, location in the letter cue memory is cleared therefrom, and the letter cue counter is decremented. However, if the aforementioned inquiry is answered in the affirmative, the steps of clearing the last location in the letter cue memory and decrementing the letter cue counter are preceded by the step of shifting downward by one location all of the letter cue position counts which are stored at locations in the letter cue memory which exceed the letter cue memory address +1.

If the count of the binary tape counter is equal to a stored instruction cue position count, inquiry is made as to whether the instruction cue count exceeds the instruction cue memory address +1. If not, the last, or highest, location in the instruction cue memory at which an instruction cue position count has been stored is cleared, and the instruction cue count is decremented. However, if this inquiry is answered in the affirmative, the last-mentioned steps are preceded by the step of shifting downward by one location all instruction cue position counts which are stored at locations in the instruction cue memory that exceed the instruction cue memory address +1. Thereafter, the microprocessor exits the cue erase routine and returns to the rewind routine.

Play Routine

Figure 10:
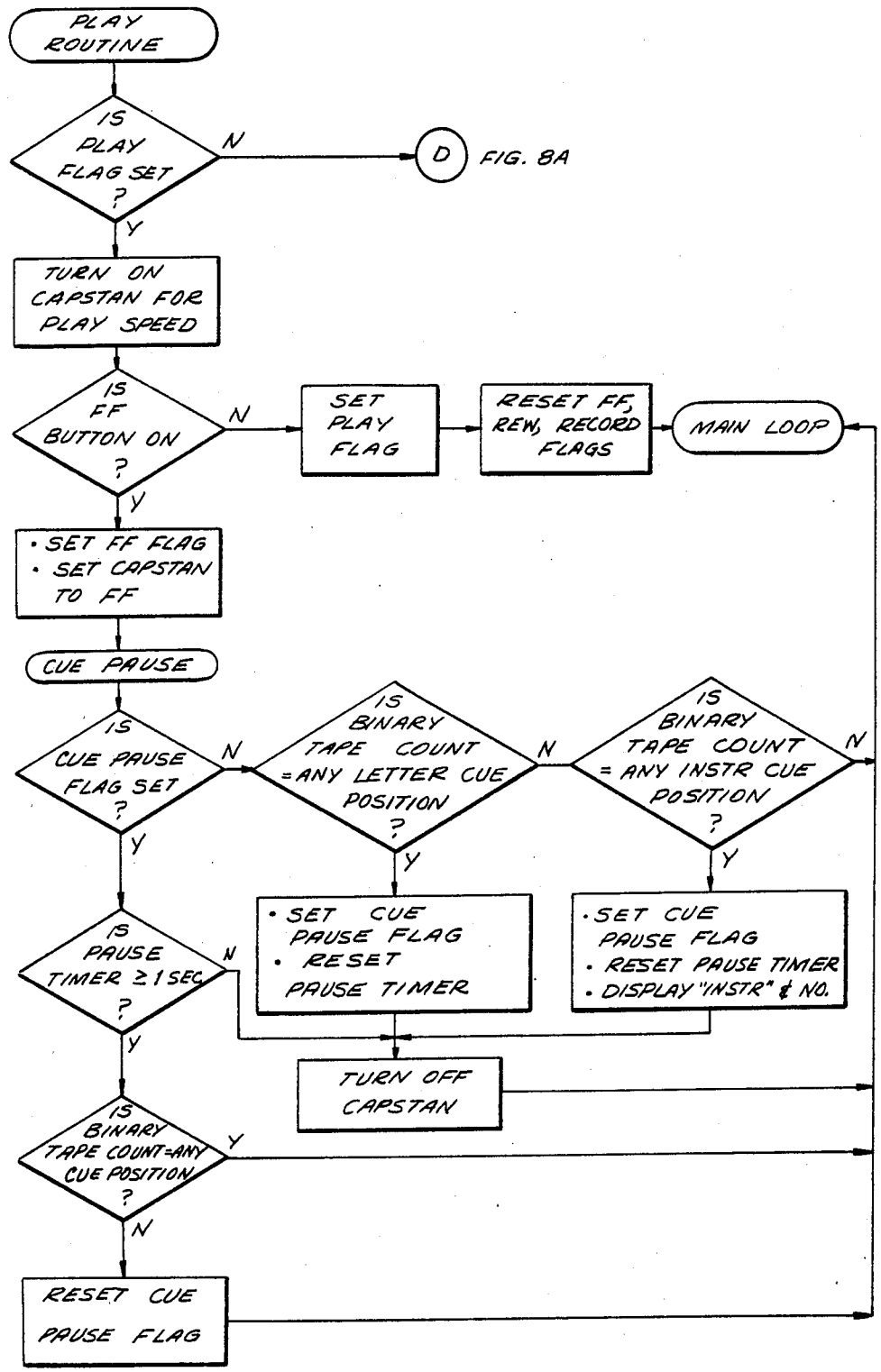

In accordance with the main loop represented by the flow chart shown in FIG. 3, if the stop flag is not set, and if the momentary record button is not being operated, and if the in conference flag is not set, and if the in erase flag is not set and if the rewind button is not being operated, and if the in play flag is set, then the input routine of FIG. 6 directs the microprocessor to jump to the play routine diagrammatically represented by the flow chart shown in FIG. 10. In carrying out the play routine, inquiry first is made as to whether the play flag is set. If not, the microprocessor jumps to point D of the routine, shown in FIG. 8A. The instructions which follow point D have been described above and will not now be further described. If, however, the play flag is set (as it may be by the routine shown at the bottom of FIG. 8A), the play routine (FIG. 10) proceeds to turn on the capstan motor and then to inquire whether the fast forward button is being operated. If the fast forward button is not on, the play flag remains set and the fast forward, rewind and record flags are reset. The microprocessor then returns to the beginning of the main loop.

However, if the fast forward button is on, that is, if the user operates fast forward button 34 while device 10 is disposed in its play mode, the fast forward flag is set and the capstan motor is energized to operate in the fast forward direction while engaged with the pinch roller. In one embodiment, the cue pause routine then is carried out.

As illustrated in FIG. 10, in the cue pause routine, inquiry is made as to whether the cue pause flag is set. If not, inquiry is made as to whether the binary tape count is equal to a letter cue position count stored in any letter cue memory location. If not, inquiry is made as to whether the binary tape count is equal to an instruction cue position count stored in any instruction cue memory location. If both of these inquiries are answered in the negative, the microprocessor returns to the beginning of the main loop. However, if the cue pause flag is not set but the binary tape count is equal to a stored letter cue position count, then the cue pause flag is set and the pause timer is reset. Likewise, if the binary tape count is equal to a stored instruction cue position count, the pause flag is set and the pause timer is reset and, additionally, the indication "INS" is displayed by display 48 and the number of this instruction cue signal (e. g. the instruction cue memory address) is displayed by display 42. It is recalled from FIG. 4 that the pause timer is incremented during the tone and timer update routine. After setting the cue pause flag and resetting the pause timer, the capstan motor is turned off. Hence, tape movement is temporarily interrupted; and the device "pauses" at the location at which a cue signal had been recorded. The microprocessor then returns to the beginning of the main loop.

If, however, the inquiry as to whether the cue pause flag is set is answered in the affirmative, inquiry next is made as to whether the count of the cue pause timer is greater than or equal to one second. If not, the capstan motor is turned off (or remains off); and the microprocessor returns to the beginning of the main loop. But, when the count of the pause timer reaches one second, inquiry next is made as to whether the binary tape count now is equal to any cue position count stored in the cue memory. If not, the cue pause flag is reset and the microprocessor returns to the beginning of the main loop. But, if the binary tape count is equal to a stored cue position count, the cue pause flag is not reset prior to returning to the beginning of the main loop.

Fast Forward Routine

Figure 11:
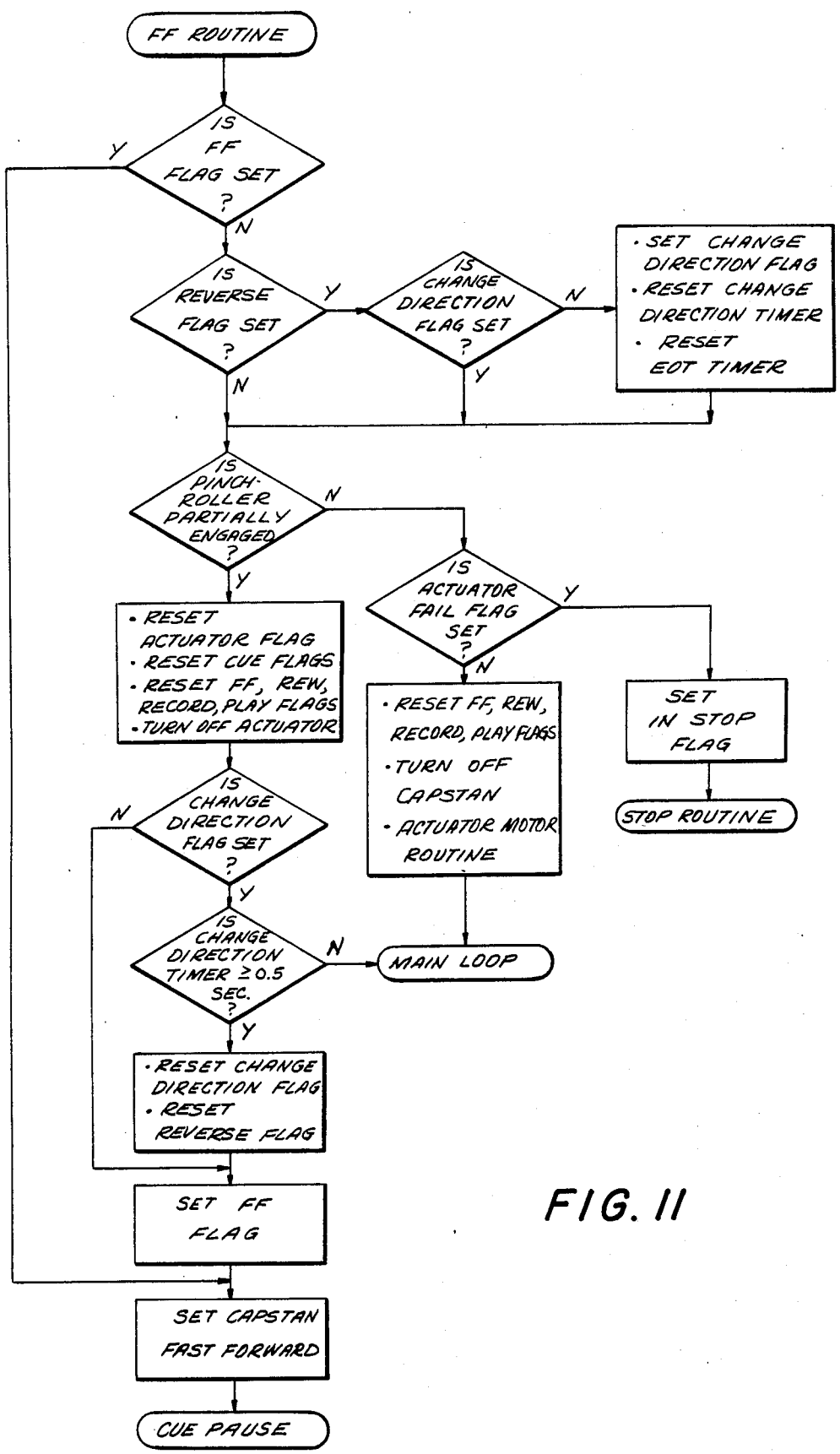

From the flow-chart shown in FIG. 3, and from the foregoing description, it is appreciated that the microprocessor jumps to the play routine if the stop flag is not set, the momentary record button is not operated, the conference record flag is not set, the in erase flag is not set and the rewind button is not on but the in play flag is set. If, however, the in play flag is not set, the microprocessor jumps to the fast forward routine which is schematically illustrated in FIG. 11. Initially, inquiry is made as to whether the fast forward flag is set. If it is, that is, if the fast forward mode had been initiated previously, the capstan motor is energized in the fast forward direction, and the microprocessor jumps to the cue pause routine, discussed above with respect to the flow chart shown in FIG. 10.

However, if the fast forward flag is not set, inquiry is made as to whether the reverse flag is set. From the discussion of the rewind routine, schematically illustrated in FIG. 9A, it is recalled that the reverse flag is set if device 10 had been disposed in its rewind mode. If this reverse flag is set, inquiry next is made as to whether the change direction flag is set. It is recalled that this flag is set if the immediately preceding active mode of the device included movement of the tape in a direction opposite to that in which tape movement now is commanded. If the change direction flag is not set, the fast forward routine advances to set this flag and to reset both the change direction timer and the EOT timer. Then, inquiry is made as to whether the pinch roller is partially engaged. This inquiry also is made in the event that the reverse flag is not set or in the event that the change direction flag is set.

Advantageously, the pinch roller assumes its partially engaged position during the fast forward routine. This permits the tape to be driven rapidly with minimal impedance from the capstan and pinch roller; while at the same time places the head in close proximity so as to reproduce unintelligible noises, or "monkey chatter", as the tape is being driven. If the pinch roller is not in its partially engaged position, inquiry is made if the actuator fail flag is set. If this flag is set, the routine advances to set the in stop flag and then jumps to the stop routine. Hence, the device is disposed in its inactive mode if the actuator fails to dispose the pinch roller in its partially engaged position. But, if the actuator fail flag is not set, the fast forward, rewind, record and play flags all are reset, the capstan motor is turned off and the actuator motor routine is executed. The microprocessor then advances to the beginning of the main loop and successively cycles through the main loop and the fast forward routine until the pinch roller is sensed as being in its partially engaged position. At that time, the inquiry as to whether the pinch roller is partially engaged is answered in the affirmative, and the actuator flag (set during the actuator motor routine), cue flags, fast forward, rewind, record and play flags all are reset, and the actuator motor is turned off.

Then, inquiry is made as to whether the change direction flag is set. If it is, inquiry next is made as to whether the count of the change direction timer is equal to or greater than 0.5 seconds. If the count is less than 0.5 seconds, the fast forward routine returns to the beginning of the main loop; and the microprocessor continues to cycle through the main loop and fast forward routine until the change direction timer is equal to 0.5 seconds. At that time, the change direction flag is reset and the reverse flag also is reset. Then, the fast forward flag is set. However, if the inquiry as to whether the change direction flag is set is answered in the negative, the next instruction is to set the fast forward flag. Once this fast forward flag is set, the capstan motor is energized to operate in the fast forward mode and the microprocessor advances to the cue pause routine, discussed above in FIG. 10.

Processor-Controlled Operations

It is believed that the manner in which the microprocessor functions in accordance with the aforedescribed routines to control device 10 will best be understood by brief descriptions of certain commanded operations. Initially, let it be assumed that the microprocessor and the device both are disposed in the dormant condition. When keyboard enable button 36 is operated (FIG. 2), the microprocessor leaves its dormant condition, carries out the power-up routine to distinguish between operation of the keyboard enable button and replacement of the battery, and then advances to the main loop. It will be appreciated that the dormant condition is not re-assumed unless the device remains in its inactive (or stop) mode for a predetermined time (e. g. five minutes), or unless the actuator fail flag is set or, in another embodiment, until the keyboard enable button is operated once again to trigger the dormant condition.

Figure 4:
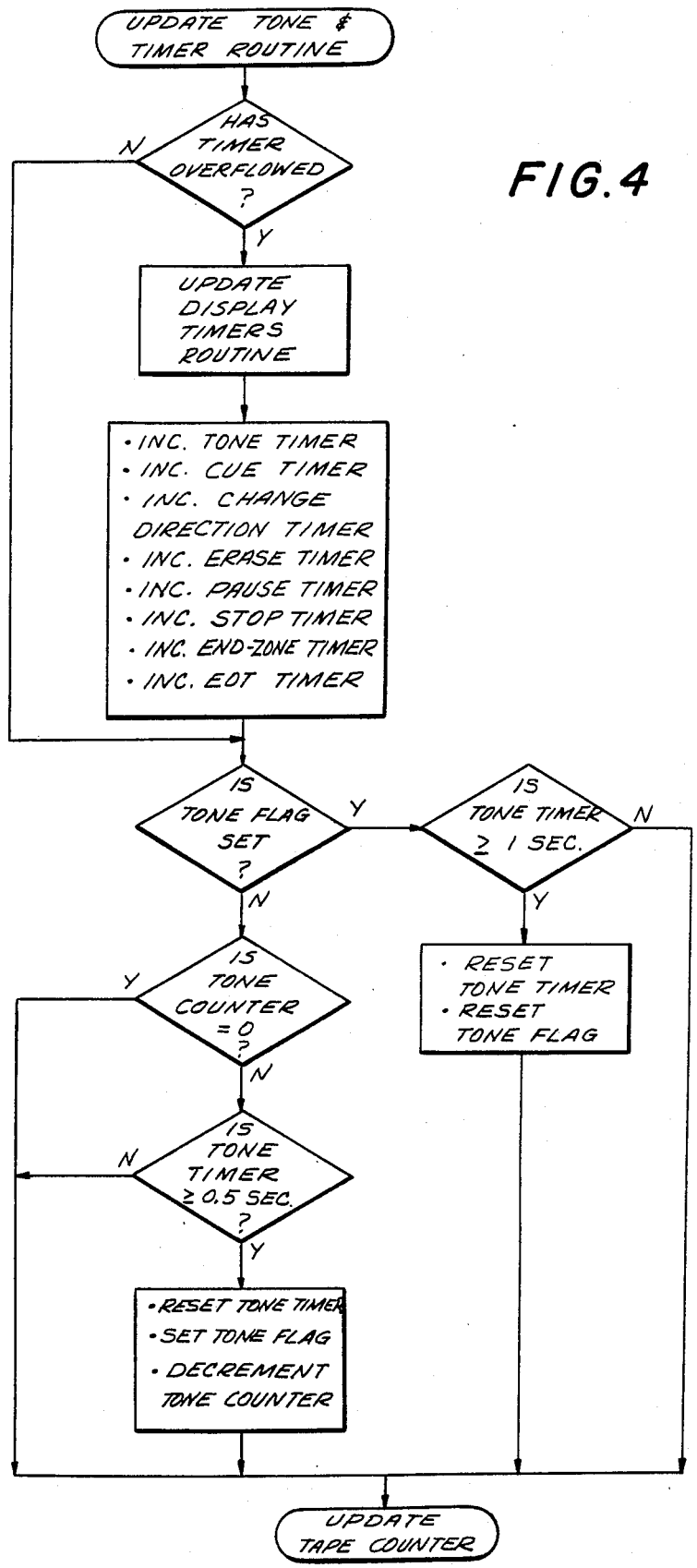

When in the main loop (FIG. 3), the tone and timer update routine is carried out, followed by the tape counter update routine. As shown in FIG. 4, the various timers are incremented each time that the primary timer overflows. In one operating embodiment of this invention, the respective timers are incremented once every 16 msec. If desired, however, these timers may be updated at a more frequent or less frequent rate. Continuing with the flow chart of FIG. 4, at the present time the tone flag is not set and the count of the tone counter is equal to zero. Hence, the tone flag remains reset and the tape counter update routine is carried out.

Turning to FIG. 5A, when tape is driven in the forward direction, the BCD and binary tape counters both are incremented in response to 1/0 chopper pulse transitions, and the binary tape counter is additionally incremented in response to 0/1 transitions. These counters are decremented in response to the foregoing transitions when the tape is driven in the reverse direction. Also, the bar graph display routine is carried out in response to 1/0 transistions.

It is seen that, if tape is not transported, as when device 10 is disposed in its inactive mode, chopper pulse transitions are not produced. Since the capstan is not operating in the inactive mode, the EOT timer remains reset during each cycle through the tape counter update routine. However, if the capstan is operating but tape is not being transported, no chopper pulse transitions are sensed and, ultimately, the EOT timer will be incremented (during the tone and timer update routine) to a count equal to or greater than 3.5 seconds. This indicates that the end of tape has been reached and, as shown in the flow chart of FIG. 5A, the capstan is deactivated, the EOT flag is set and the tone counter is preset to a count of 10. As will be described below, this presetting of the tone counter results in the generation of interrupted audible tones to apprise the operator that the end of tape has been reached.

If tape is being transported, as in the "record", "play", "fast forward" or "rewind" modes, chopper pulse transitions are generated and used to increment or decrement the binary tape counter. After the count of this tape counter is updated, the forward or reverse cue position routine is carried out. As mentioned above, the purpose of these routines is to sense when the tape has been transported past a previously recorded letter or instruction cue signal and, if so, to update the letter or instruction cue memory address to allow the cue memory location corresponding to that address to retain the cue position count stored therein (as when the tape is advanced past a previously recorded cue signal) or to allow the cue position count stored at that location to be "overwritten", as when the tape is reversed past that cue signal.

Thereafter, the remainder of the tape counter update routine, illustrated in the flow chart shown in FIG. 5A, is completed; and the microprocessor then turns to and continues through the main loop.

Returning to FIG. 3, it is assumed that reset/mode button 32 is not operated, and the display mode for display 40 is adapted to display tape counts. If the reset/mode button had been operated momentarily, display 40 would display the particular letter, or message, which is being recorded. That is, the letter cue memory address would be displayed. Also, in this mode, when an instruction cue signal is reached while moving the tape in the rewind or fast forward modes, the number of that instruction cue signal, e. g. the instruction cue memory address, would be displayed. In any event, after selecting the display mode by operation of the reset button routine, the display routine is carried out, as described in copending application Ser. No. 564,480 and then the input routine is executed.

When the main loop advances to the input routine (FIG. 6), the in stop flag first is reset and then is set because the device is not in its conference or play or erase modes (that is, neither the in conference, nor the in play, nor the in erase flag is set). Continuing with the input routine, if a fresh tape cassette is loaded into device 10, the cue memory is cleared, the cue counter and cue memory address are preset, the tape counters are reset and all other cue flags that might have been set are reset. Then, the microprocessor prepares for the inactive mode by resetting the in conference, in erase, and in play flags, setting the in stop flag (which already had been set) and setting the disengage pinch roller immediately flag before returning to the main loop. In the present example, it is assumed that a fresh cassette has not been loaded into the device. Since keyboard enable button 36 is the only operating button that has been pushed, negative answers are obtained for the inquiries of whether the stop button is on, whether two buttons are pushed concurrently, whether the momentary record button is on, whether the conference record button is on, whether the fast forward button is on, whether the rewind button is on, and whether the record flag is set. Hence, the result of the input routine merely is to set the in stop flag.

Returning to the main loop from the input routine, it is assumed that the battery is not low. Since the microprocessor has just been brought out of the dormant condition, neither the capstan motor nor the actuator motor is energized. Also, at this time, a warning tone is not generated.

Next, since the in stop flag is set, the microprocessor jumps to the stop routine shown in FIG. 7A. Here, a cue tone is not being generated and the tone flag, fast forward, rewind, record and play flags all are reset and the tone counter is reset. The EOT flag is not set nor is the actuator fail flag set. Since this is the first cycle through the stop routine, the stop timer is reset and the capstan motor remains off. It is appreciated that the stop timer will be incremented during the tone and timer update routine.

Let it be assumed that the disengage pinch roller immediately flag is not set. Accordingly, inquiry is made as to whether the count of the stop timer is equal to or greater than five minutes. Since the stop timer just has been reset, this inquiry is answered in the negative; and the microprocessor returns to the beginning of the main loop.

The microprocessor continues to cycle through the tone and timer update routine, whereby the stop timer is incremented, and through the tape counter update routine to account for chopper pulses that may be generated while the tape is "coasting" to a stop. Since the capstan motor remains off, the EOT timer merely is reset.

Also, each time that the microprocessor cycles through the input routine, the in stop flag is set; and as the microprocessor continues through the main loop, the stop routine is carried out. Thus, during each cycle of the main loop, the stop routine is executed. If device 10 remains in this stop mode for five minutes, the inquiry in the stop routine (FIG. 7A) as to whether the stop timer is greater than or equal to five minutes is answered in the affirmative and, since the pinch roller has remained disengaged, the microprocessor returns to its dormant condition.

Let it be assumed that, while the microprocessor cycles through the main loop to the stop routine, the user operates momentary record button 24. At the next cycle through the input routine, the in stop flag is set because none of the in conference, in play and in erase flags is set. The stop button is not on and it is assumed that two operating buttons have not been pushed. Since the momentary record button now is on, all of the "in" flags, are reset, as is the in stop flag. Thus, when the momentary record button is operated, the input routine merely serves to reset the in stop flag and to make sure that no other flags are set.

Returning to the main loop, it is assumed that the energy level of the battery is not low. The capstan and actuator motors remain deenergized at this time, and no warning tone is generated. Since the in stop flag is not set, the disengage pinch roller immediately flag, whether set or not, is reset. Furthermore, since the EOT flag is not set but the momentary record button is on, the microprocessor jumps to the momentary record routine illustrated in FIGS. 8A–8C.

Proceeding with the momentary record routine, a low record amplifier gain is set and the record circuitry is enabled. At this time, the record flag is not yet set. Furthermore, the reverse flag is not set nor is the pinch roller fully engaged. Accordingly, upon a negative answer to the inquiry of whether the pinch roller is fully engaged and a negative answer to the inquiry of whether the actuator fail flag is set, the actuator motor routine is initiated (FIG. 7B) to bring the pinch roller into full engagement. Thereafter, the microprocessor returns to the beginning of the main loop and continues to cycle through the main loop, the momentary record routine and the actuator motor routine until the pinch roller is sensed as being fully engaged. At that time, the actuator motor is turned off, the actuator flag (which had been set during the initial cycle through the actuator motor routine) is reset and, since the change direction flag is not set, the capstan motor is turned on. Hence, tape is driven in the forward direction to effect a record operation.

Continuing with the momentary record routine, since the device now is in its record routine, the record flag is set and the end zone flag is reset. The microprocessor then returns to the beginning of the main loop.

If, while cycling through the actuator motor routine, the pinch roller failed to fully engage the capstan, for example, if a fault was present in the actuator assembly, the count of the actuator timer (which is incremented during the tone and timer update routine) will reach a count that exceeds 2 seconds, thus setting the actuator fail flag. At the next cycle through the momentary record routine, the setting of the actuator fail flag will result in the setting of the in stop flag and the carrying out of the stop routine. Ultimately, if the device remains in its stop mode, the dormant condition will be assumed.

As the tone and timer update routine are executed repeatedly, the respective timers are incremented, as described above. The tone flag remains reset; and the microprocessor advances from the tone and timer update routine to the tape counter update routine (FIG. 5A).

Now that tape is advancing, chopper pulse transitions are detected. As mentioned above, the binary tape count is incremented in response to each 1/0 and each 0/1 transition. The BCD tape counter, however, is incremented only in response to the 1/0 transitions. Nevertheless, the count of the BCD tape counter is sufficient to provide a somewhat accurate representation of the location of tape; and this count may be displayed by numerical display 42.

After the tape counters are updated, the EOT timer is reset and the tape counter update routine then exits and the main loop is continued.

Once again the input routine is carried out to sense if the momentary record button remains operated and, if so, to reset the in stop flag and to prevent other flags from being set. Returning to the main loop from the input routine, the capstan motor remains energized and, since the in stop flag is not set and the EOT flag is not set, the operation of the momentary record button results in executing the momentary record routine once again.

It is recalled that, in the first cycle of the momentary record routine, the record flag had not been set but, once the pinch roller became fully engaged, the record flag was set during the next cycle of that routine. Now, in subsequent cycles through the momentary record routine, the inquiry of whether the record flag is set will be answered in the affirmative.

Proceeding to point A of FIG. 8B, and assuming that neither the "letter" nor the "instruction" cue flags are set and that the cue button is not on, the cue stop flag is set and then a comparison is made between the binary tape count and the cue position count stored in the addressed location of the letter cue memory. At this time, however, it may be assumed that the letter cue memory address has been preset to a "not present" address or, alternatively, the binary tape count is not equal to whatever cue position count may be stored in the letter cue memory location now being addressed. Hence, the inquiry of whether the binary tape count is equal to a cue position count stored in the addressed cue memory is answered in the negative. At this time it is further assumed that the binary tape count is not equal to any stored letter or instruction cue position count.

Accordingly, inquiry next is made as to whether the last element of bar graph 44 is energized. This inquiry normally will be answered in the negative until most of the tape has been consumed. At that time, the tape will have been advanced to its so-called end zone region.

Let it now be assumed that, during the recording operation, the tape has been sufficiently advanced so as to reach its end zone region. When the microprocessor next cycles through the record routine, the inquiry of whether the last element of the bar graph display is energized now will be answered in the affirmative. The next following inquiry of whether the count of the end zone timer is greater than or equal to fifteen seconds also will be answered in the affirmative. It is recalled that this timer is incremented when the microprocessor cycles through the the tone and timer update routine and, in all probability, will be incremented well beyond a count of fifteen seconds at the time that the tape reaches its end zone region. Now, both the end zone timer and the tone timer are reset and the tone flag is set.

When the main loop reaches the instruction to supply output signals to the capstan and actuator motors and to the warning tone generator, the tone flag results in the generation of the warning tone.

As the microprocessor continues to cycle from the main loop through the record routine, inquiry is made, at each cycle therethrough, as to whether the end zone timer is equal to or greater than fifteen seconds. At the present time, since the end zone timer had just been reset, this inquiry is answered in the negative. Also, during each cycle of the microprocessor through the tone and timer update routine, inquiry is made as to whether the tone flag is set and, if so, whether the tone timer has been incremented to a count equal to or greater than one second. When the count of the tone timer is equal to one second, the tone timer is reset and the tone flag also is reset. As a result of this resetting of the tone flag, the warning tone generator is deenergized when the main loop arrives at the instruction to supply output signals to the warning tone generator. Hence, when the end zone region is reached, a warning tone duration of approximately one second is generated.

At subsequent cycles of the microprocessor through the momentary record routine, now that the last element of the bar graph display is energized, inquiry again is made as to whether the count of the end zone timer is equal to or greater than fifteen seconds. Ultimately, of course, if the last element of the bar graph remains energized, the end zone timer will be so incremented and, when this occurs, the end zone timer and tone timer once again are reset and the tone flag again is set. Hence, when the main loop next supplies output signals to the warning tone generator, the generator is turned on once again. Thus, it is seen that, when the tape is transported to its end zone region, the warning tone generator is controlled by the tone and timer update routine to generate warning tones of one second duration, these warning tones recurring at a rate of one warning tone pulse every fifteen seconds.

Let it be assumed that, while in the record mode, the tape is transported to its end. When this occurs, the supply reel no longer rotates and, therefore, chopper pulse transitions no longer are produced. When the main loop periodically carries out the tape counter update routine, the inquiries as to whether a 1/0 or 0/1 chopper pulse transition is present both will be answered in the negative, the inquiry as to whether the EOT flag is set will be answered in the negative and the inquiry as to whether the capstan motor is on will be answered in the affirmative. The following inquiry of whether the count of the EOT timer is equal to or greater than 3.5 seconds will be answered in the negative during successive cycles through the tape counter update routine until, ultimately, the EOT timer is sufficiently incremented during the tone and timer update routine such that this inquiry ultimately is answered in the affirmative. Thus, 3.5 seconds after the supply reel stops, the capstan motor will be turned off, the EOT flag will be set and the tone counter will be set to a count of ten. Now, when the main loop next cycles to the tone and timer update routine, since the count of the tone counter no longer is equal to zero, the count of the tone timer is monitored to sense when it becomes equal to or greater than 0.5 seconds. It is expected that the count of the tone timer will be greater than 0.5 seconds at the time that the count of the EOT timer exceeds 3.5 seconds. Hence, during this cycle through the tone and timer update routine, the tone timer is reset, the tone flag is set and the tone counter now is decremented from its count of ten to a count of nine.

Assuming that momentary record button 24 remains operated, after the main loop carries out the input routine, the in stop flag will be reset; and then the main loop will continue in accordance with the flow chart shown in FIG. 3. When an output signal is provided to the warning tone generator, this generator is turned on in response to the tone flag which had been set during the previous cycle through the tone and timer update routine. The main loop continues its programmed set of instructions until inquiry is made as to whether the EOT flag is set. This inquiry is answered in the affirmative and, since the count of the tone counter is not equal to zero, the main loop returns to its beginning so as to cycle once again through the tone and timer update routine. At the next cycle of this routine, since the tone flag now is set, inquiry is made as to whether the count of the tone timer is equal to or greater than one second. Since the tone timer has just been reset, this inquiry is answered in the negative. Hence, the warning tone is generated for a duration of one second, at which time the count of the tone timer is equal to one second and the tone and timer update routine then proceeds to reset the tone timer and to reset the tone flag. The warning tone now is terminated.

Assuming that the momentary record button still remains operated, at the next cycle through the tone and timer update routine, the inquiry of whether the tone flag now is set is answered in the negative and, since the count of the tone counter now is equal to nine, the inquiry of whether the count of the tone counter is equal to zero also is answered in the negative. The tone timer has just been reset and, therefore, the inquiry of whether the count of the tone timer is equal to or greater than 0.5 seconds also is answered in the negative. Thus, the warning tone remains turned off for 0.5 seconds. At that time, the inquiry of whether the count of the tone timer is equal to or greater than 0.5 seconds is answered in the affirmative, and the tone timer is reset once again, the tone flag now is set and the count of the tone counter is decremented to a count of eight. Then, when the main loop reaches the instruction to supply an output signal to the warning tone generator, the generator is turned on.

Thus, when the end of tape is reached, for as long as the momentary record button remains operated, a pulsating warning tone is produced having an on duration of about one second and an off duration of about 0.5 seconds. A total of ten warning tone pulses are produced, if the momentary record button remains operated.

At any time that the momentary record button is released, even if the tape has been advanced into its end zone region or even if the end of tape has been reached, the in stop flag will be set by the input routine, and when the main loop reaches the instruction of inquiring whether the in stop flag is set, this inquiry will be answered in the affirmative and the microprocessor then will jump to the stop routine which has been described above. When in this stop routine, the tone counter, if set to a count other than zero, will be reset and the EOT flag, if set, will be reset. Hence, if the end of tape has been reached, when the momentary record button is released, the generation of warning tone signals will terminate.

Now, let it be assumed that, while in the record routine, the user wishes to record a "letter" cue signal. As shown by the flow chart of FIGS. 8A and 8B, since the record flag is set, inquiry is made as to whether any cue flag is set. This inquiry is answered in the negative; and if cue button 30 is operated, inquiry of whether the cue button is on is answered in the affirmative. Inquiry now is made as to whether the cue stop flag is set. It is recalled that, when the momentary record routine is carried out, the cue stop flag normally is set if the cue button is not operated. Hence, the inquiry of whether the cue stop flag is set will be answered in the affirmative. This cue stop flag then is reset and, proceeding to point C of FIG. 8C, since neither the "instruction" nor the "letter" cue flags are set, the microprocessor advances to inquire if the letter cue memory address is equal to "9". It is assumed herein that the letter cue memory address has been preset to, for example, "0" and that the letter cue counter has been preset to the same (or corresponding) count. Since the letter cue count is not greater than the letter cue memory address, the routine shown in FIG. 8C advances to increment the letter cue memory address (from "0" to "1") and to set the increment flag. Next, since the letter cue counter is not equal to "9", it is incremented (from "0" to "1") and then the tone flag is set, the tone timer is reset and the letter cue flag is set. The microprocessor then returns to point B of the flow chart in FIG. 8B.

From point B, inquiry is made as to whether a cue signal is being recorded. Since it is, the cue generate routine is carried out. Then, inquiry is made if the binary tape count is equal to a cue position count now stored in the letter cue memory location which is addressed by the letter cue memory address generator (e.g. address "1"). This addressed location has been assumed to be empty, and the answer to this inquiry is in the negative. It is further assumed that the binary tape count is not equal to any stored letter cue position count or any stored instruction cue position count, and that the last element of the bar graph display is not energized. Consequently, the microprocessor returns to the beginning of the main loop.

On cycling through the tone and timer update routine, both the tone and cue timers are incremented (when, of course, the primary timer has overflowed) and since the tone flag had been set in the momentary record routine (FIG. 8C), the inquiry of whether this flag is set now is answered in the affirmative. Since the count of the tone timer is less than one second, the tone flag is not reset, and the microprocessor advances to the tape counter update routine to increment both the BCD and binary tape counters as tape is advanced. It is appreciated that, because of this setting of the tone flag, when the main loop next reaches the instruction to supply an output signal to the warning tone generator, this generator will be turned on to apprise the user, by way of the warning tone, that a cue signal is being recorded.

After exiting the update routines, the main loop ultimately advances to its input routine. In generating the cue tone, the momentary record button is operated and, therefore, the input routine serves to reset the in stop flag. Hence, the main loop now may continue and, after proceeding from the input routine, may jump to the momentary record routine.

Following the flow chart shown in FIGS. 8A and 8B, the record flag is set and inquiry of whether any cue flag is set is answered in the affirmative. The cue timer will be reset upon initiating the cue generate routine, and inquiry of whether the count of the cue timer is equal to or greater than one second is answered in the negative. Assuming that the cue button still is on, since the cue stop flag now is reset, and since a cue signal is being recorded, the routine advances to the cue generate routine. The microprocessor then advances to inquire whether the binary tape count is equal to a cue position count stored in the addressed cue memory. This inquiry is answered in the negative (it is assumed that no count has been stored in cue memory location "1") and the inquiry of whether the binary tape count is equal to any stored letter cue position count also is answered in the negative. Hence, the routine advances to inquire if the binary tape count is equal to any stored instruction cue position count. This too is answered in the negative, and the microprocessor returns to the beginning of the main loop.

The microprocessor continues to cycle through the tone and timer and tape counter update routines, the input routine and the momentary record routine described above. Eventually, the count of the cue timer is incremented during the tone and timer update routines to arrive at a count equal to one second. Then, during the next cycle through the momentary record routine the inquiry proceeding from point A (FIG. 8B) of whether any cue flag is set and whether the count of the cue timer is equal to or greater than one second are both answered in the affirmative. Hence, the increment flag (which had been set during the initial cycle through the flow chart of FIG. 8C) is reset and, since the letter cue memory address is not full (it now is set to the address "1"), and since the shift flag is not set, the binary tape count is loaded into the addressed letter cue memory location (i. e. location "1"). Although the shift flag is not set, it nevertheless is reset. Since the letter cue flag had been set, it now is reset and, since the instruction cue flag is not set, the cue timer is reset.

The microprocessor then advances, as shown in FIG. 8B, to answer in the negative the inquiry of whether a cue signal now is being recorded (the letter cue flag has been reset), and the inquiry of whether the binary tape count is equal to the cue position count stored in the addressed location (location "1") of the cue memory is answered in the affirmative. Accordingly, the microprocessor returns to the beginning of the main loop.

During the preceding operation, when the microprocessor cycles through the update tone and timer routine, inquiry of whether the tone flag is set is answered in the affirmative and, once the count of the tone timer reaches one second the tone timer will be reset and the tone flag will be reset. Hence, the warning tone terminates.

Thereafter, if the momentary record button remains on, when the microprocessor next cycles through the momentary record routine, the record flag still will be set but now the inquiry of whether any cue flag is set will be answered in the negative. Assuming that the cue button is not operated once again, the cue stop flag is set. The momentary record routine continues to proceed in the manner described above.

Let it now be assumed that, during the record operation, the user wishes to record an "instruction" cue signal. As mentioned above, this is achieved by the repeated operation of cue button 30 within a brief period of time, that is, a period of about one second. Upon the first operation of the cue button, when the main loop jumps to the momentary record routine, the inquiry of whether the record flag is set is answered in the affirmative and, proceeding to point A of FIG. 8B, the inquiry of whether any cue flag is set is answered in the negative and the inquiry of whether the cue button is on is answered in the affirmative. Accordingly, the inquiry of whether the cue stop flag is set is answered in the affirmative and, after resetting this cue stop flag, the routine advances to point C of FIG. 8C and the inquiry of whether the "instruction" cue flag is set is answered in the negative. Since the "letter" cue flag is not set at this time, the microprocessor proceeds to inquire if the letter cue memory address is set at "9", indicating that all of the letter cue memory locations are filled. This inquiry is answered in the negative and, since the letter cue count is equal to the letter cue memory address, the letter cue memory address is incremented and the increment flag is set. Assuming that, until the letter cue memory was just incremented, the letter cue count and the letter cue memory address were equal, the next inquiry of whether the letter cue count is set at "9" is answered in the negative and this cue count is incremented. Then, the tone flag and letter cue flag are set and the tone timer is reset. The momentary record routine then advances to point B (FIG. 8B) and the remainder of this routine is carried out in the manner described above.

On the next cycle through the main loop, since the tone flag has just been set a warning tone is generated. The tone flag remains set for a duration of about one second. At that time, when the microprocessor cycles through the tone and timer update routine, the tone flag is reset and the warning tone is terminated.

As before, the binary tape count is updated when the microprocessor cycles through the tape counter update routine. Thus, as the tape is transported and the cue signal is recorded, the binary tape counter is incremented.

After cycling through the input routine (which merely resets the in stop flag when the record routine is carried out), the main loop continues to follow the flow chart shown in FIG. 3 and, since the momentary record button remains on, jumps to the momentary record routine. Now, since the record flag is set and the "letter" cue flag is set, the momentary record routine advances to inquire if the count of the cue timer, which had just been reset during the cue generate routine, is greater than one second. This inquiry is answered in the negative and, since the cue button still is on, and the cue stop flag still is reset, the momentary record routine continues through the remainder of the flow chart shown in FIG. 8B.

The foregoing cycling through the momentary record routine continues until the count of the cue timer reaches one second. Let it be assumed that, at any time before the cue timer count reaches one second, the cue button is released. When the cue button is released the cue stop flag is set. At subsequent cycles through the momentary record routine, the inquiry of whether the record flag is set is answered in the affirmative, the inquiry of whether any cue flag is set also is answered in the affirmative, the inquiry of whether the count of the cue timer is greater than one second is answered in the negative, and the inquiry of whether the cue button is on also is answered in the negative. Hence, the cue stop flag remains set; and the momentary record routine advances through the illustrated instructions to the beginning of the main loop.

Let it now be assumed that, prior to the time that the count of the cue timer reaches one second, the cue button is operated once again. When the momentary record routine next reaches the inquiry of whether the cue button is on (FIG. 8B), this inquiry is answered in the affirmative and the inquiry of whether the cue stop flag is set also is answered in the affirmative. Hence, the cue stop flag now is reset and, proceeding to point C of FIG. 8C, since the "instruction" cue flag is not yet set, inquiry is made as to whether the "letter" cue flag is set. This inquiry is answered in the affirmative and, since the increment flag had been set during the preceding cycle through the flow chart of FIG. 8C, the cue memory address and cue count which had been incremented in preparation for registering the recording of a letter cue signal now are decremented to their preceding counts because a letter cue signal is not recorded. The increment flag then is reset and the inquiry of whether the instruction cue memory address is set to "9" is answered in the negative because, it is assumed, that all available instruction cue memory locations have not yet been filled. Then, since the instruction cue count is not greater than the instruction cue memory address (because the tape has not been reversed past a previously recorded instruction signal), the instruction cue memory address is incremented to the next successive location. The instruction cue count is not set at "9" (which would indicate that the storage capacity of the instruction cue memory has been reached) and so it too is incremented, and the cue memory address is changed over from the letter cue memory address to the instruction cue memory address. Next, the instruction cue flag is set and the tone counter is preset to a count of one. Returning next to point B of FIG. 8B, the remaining instructions are carried out in the manner described above. It will be appreciated that, at this time, the binary tape count is not equal to the count stored in the location of the instruction cue memory now being addressed, nor is that tape count equal to any stored letter or instruction cue position count. Hence, since the last element of the bar graph is not energized, the microprocessor returns to the beginning of the main loop.

When the microprocessor next cycles through the tone and timer update routine, if the tone flag is reset (it is reset when the count of the tone timer reaches one second), the inquiry of whether the count of the tone counter is equal to zero is answered in the negative (it was set to a count of one in the preceding cycle through FIG. 8C), and, since the tone timer recently was reset (when the tone flag was reset), the warning tone is interrupted. The main loop continues to cycle through the tone and timer update routine until the count of the tone timer reaches one-half second. At that time, the tone and timer update routine functions to reset the tone timer, to set the tone flag and to decrement the tone counter. The warning tone thus is repeated for another one second interval, and then is terminated.

During succeeding cycles of the main loop, after the instruction cue flag has been set, when the microprocessor jumps to the momentary record routine, the inquiry of whether the count of the cue timer is equal to or greater than one second (FIG. 8B) will be answered in the negative (it is reset by the cue generate routine) until the cue timer times out. While this inquiry is answered in the negative, the instructions shown in the flow chart of FIG. 8B are carried out as described above. Once the cue timer reaches a count of one second, the momentary record routine advances to inquire if the instruction cue address is full (that is, if the last available location in the instruction cue memory already has been addressed). It is assumed that this inquiry is answered in the negative and, since the shift flag is not set, the binary tape count is loaded from the binary tape counter into the instruction cue memory location that now is being addressed. Then, since the letter cue flag still is set, it now is reset and all of the cue flags, including the instruction cue flag, are reset. This completes the cue recording operation and, proceeding with the flow chart of FIG. 8B, since the count of the binary tape counter now is equal to the count just loaded into the instruction cue memory, the microprocessor returns to the beginning of the main loop.

When the cue button is operated repeatedly, two warning tones, each of one second duration and separated by a silent period of one-half second, are generated. The first operation of the cue button causes the tone flag to set, resulting in the generation of the first warning tone until the tone timer times out (i. e. reaches the count of one second). The second operation of the cue button (before the cue timer times out) sets the count of the tone counter to a count of one and then, when the tone timer (which had been reset when the first warning tone terminated) reaches the count of one-half second, the tone counter is decremented and another one second warning tone is generated. Thus, when the "instruction" cue signal is recorded, the user is apprised thereof by two successive warning tone signals, each of approximately one second duration, the two signals being spaced apart by about one-half second.

If, after recording the "instruction" cue signal in the foregoing manner, further information is to be recorded on the tape, the microprocessor cycles through the main loop in the manner described above, including a jump to the momentary record routine. Here, since the record flag is set but none of the cue flags are set, the cue signal indicating operation is not repeated until the next detection of the operation of cue button 30. So long as this button is not on, the cue stop flag remains set, inquiry is made as to whether the binary tape count is equal to the cue position count stored in the location which remains addressed by the cue memory address generator and, if not, whether any cue position counts stored in other cue memory locations are equal to the binary tape count. Then, if the tape has not yet been transported to its end zone region (i. e. if the last element of the bar graph is not energized), the momentary record routine returns to the beginning of the main loop.

The foregoing description relates to the execution of the momentary record routine. It will be readily appreciated that the conference record routine is carried out in substantially the same way and, in the interest of brevity, this description is not repeated. Of course, when the conference record routine is carried out, the record amplifier gain is set at a higher level than when the momentary record routine is executed. Another difference between the conference record and momentary record routines is found in the input routine. When the microprocessor advances through the input routine, the in conference flag is set upon detecting the operation of the conference record button. Then, when the microprocessor returns to the main loop, it jumps to the conference record routine upon sensing that the in conference flag has been set. Thereafter, when the microprocessor cycles through the input routine, the in stop flag is reset and, since the in conference mode has been established, the in stop flag is not set. Then, after the input routine is completed, the remainder of the main loop is followed.

Let it be assumed that, while in the momentary record mode, the user releases the momentary record button. When the microprocessor advances to the input routine, the in stop flag first is reset and then, since the device is not disposed in its conference, play or erase modes, the in stop flag is set. Continuing with the instructions of the input routine, the tape is not removed from the device, the stop button is not on, two operating buttons are not pushed concurrently, the momentary record button is not on, the conference record button is not on, the fast forward button is not on, the rewind button is not on, the record flag is set (from FIG. 8A) but the cue button is not on. Thus, the in stop flag remains set.

Returning to the main loop, the capstan continues to be driven, the actuator is not turned on and the warning tone generator is not turned on. Then, the inquiry of whether the in stop flag is set is answered in the affirmative; and the microprocessor jumps to the stop routine. As described above, this stop routine turns off the capstan motor. Thus, the tape is stopped. If none of the conference record, momentary record, fast forward and rewind/play buttons is operated within about five minutes, the actuator motor is energized to disengage the pinch roller from the capstan and the device then changes over from its stop mode to its dormant condition, as mentioned above.

As described previously, the microprocessor cycles periodically through the conference record routine if the conference button first has been pushed and then subsequently is released. This is because the operation of the conference record button sets the in conference flag, as shown in the input routine (FIG. 6), and since the in conference flag is set, the in stop flag remains reset in subsequent cycles through the input routine. Then, in the main loop, the microprocessor jumps to the conference record routine if the in conference flag is set. To terminate this record routine, the stop button should be operated.

Let it be assumed that, while the in conference flag is set (and the conference record mode is carried out), the stop button is operated. When the main loop next cycles through the input routine, the operation of this stop button is detected and, as a result thereof, all of the "in" flags, including the in conference flag, are reset. Then, the in stop flag is set and the disengage pinch roller immediately flag also is set.

Then, the microprocessor exits from the input routine and, when the main loop arrives at the inquiry of whether the in stop flag is set, the microprocessor jumps to the stop routine. Hence, the record mode is terminated and the device is disposed in its stop mode awaiting the actuation of another control button. If this does not occur within about five minutes, or if the pinch roller is not disengaged before the actuator timer reaches a count of two seconds (FIG. 7B), the device is changed over to its dormant condition.

Let it now be assumed that the user wishes to review some of the information which he had just recorded. If the device had been disposed in its momentary record mode, the user first releases the momentary record button, thus disposing the device in its stop mode, as just described, and then rewind/play button 28 is operated. Alternatively, if the device had been operating in its conference record mode, the user may first operate the stop button to dispose the device in its stop mode, and then he may operate the rewind/play button.

The operation of rewind/play button 28 is detected when the microprocessor advances through its input routine. Upon sensing that the rewind/play button is on, inquiry is made as to whether the erase button is on. It is assumed herein that cue/erase button 30 has not been operated and, therefore, this inquiry is answered in the negative. Accordingly, the in play flag is set and all other "in" flags are reset. Then, the in stop flag is reset and the microprocessor exits from the input routine and continues in the main loop.

When the main loop reaches the instruction of supplying output signals to the capstan and actuator motors and to the warning tone generator, the capstan motor remains off and it is assumed that the actuator motor had been turned off when, during the stop routine, the pinch roller had been disengaged. At this time, no warning tone is generated.

Then, since the in stop flag had been reset, the inquiry in the main loop as to whether the in stop flag is set is answered in the negative. The disengage pinch roller immediately flag then is reset and, since the EOT flag is not set, the momentary record button is not on, the in conference flag is not set and the in erase flag is not set, the play electronics are enabled and the record electronics are disabled. Then, the inquiry of whether the rewind button is on is answered in the affirmative, and the microprocessor now jumps to the rewind routine, shown in FIG. 9A.

On entering the rewind routine, the rewind, reverse and change direction flags all are not set at this time. Accordingly, the change direction flag now is set, the change direction timer is reset and the EOT timer also is reset. Then, inquiry is made as to whether the pinch roller is partially engaged. If it is not, and if the actuator fail flag is not set, the fast forward, rewind, record and play flags all are reset, the capstan motor remains off and the actuator motor routine is carried out. The rewind routine then exits to the beginning of the main loop.

During the tone and timer update routine executed periodically by the main loop, the change direction timer is incremented and the tape counters now are not changed because the tape remains stationary (the capstan motor had been turned off).

When the microprocessor advances to the input routine, the continued operation of the rewind button is detected, and the in play flag remains set. All of the other "in" flags (e. g. the in stop, in conference and in erase flags) remain reset. Once again, the microprocessor resets the in stop flag, and the main loop then is re-entered.

When the main loop arrives at the output signal instruction, the capstan motor remains off and the actuator motor now is turned on (as commanded by the actuator motor routine). Then, continuing with the instructions shown in FIG. 3, the microprocessor ultimately jumps to the rewind routine.

Returning to FIG. 9A, both the rewind and reverse flags still have not been set; but the change direction flag is set. If the pinch roller still has not reached its partially engaged position but the actuator timer has not timed out to set the actuator fail flag, the fast forward, rewind, record and play flags remain reset, the capstan remains off and the actuator remains on. The microprocessor then returns to the main loop and the foregoing cycle of instructions is repeated.

Eventually, assuming proper operation of the actuator mechanism, when the microprocessor cycles to the rewind routine, the inquiry of whether the pinch roller is partially engaged is answered in the affirmative. Then, all cue flags are reset, the fast forward, rewind, record and play flags also are reset, the actuator motor is turned off and the actuator flag is reset (not shown). It is appreciated that, in the present example, the resetting of the aforementioned cue, fast forward, rewind, record and play flags is a redundant operation.

Next, the inquiry of whether the change direction flag is set now is answered in the affirmative. But, since the change direction timer had been recently reset, the inquiry of whether the count of this timer is equal to or greater than 0.5 seconds is answered in the negative. Consequently, the rewind routine exits to the beginning of the main loop.

The microprocessor continues to cycle through the rewind routine, as described above, until the count of the change direction timer reaches 0.5 seconds. At that time, the change direction flag is reset, the reverse and rewind flags both are set, a capstan reverse signal is set and the underflow counter is reset. Thus, device 10 now is conditioned for a rewind operation.

On returning to the beginning of the main loop, the microprocessor executes the tone and timer update routine and also the tape counter routine. It is appreciated that the capstan is not driven until the main loop arrives at the output signal instruction, whereupon the capstan motor is energized for high speed reverse movement.

When the input routine next is carried out, since the rewind button is on but the erase button is not, the in play flag remains set and the in stop flag remains reset. The microprocessor then returns to the main loop and, after following the instructions shown in FIG. 3 and described above, jumps to the rewind routine. From FIG. 9A it is seen that, since the rewind flag now is set, the capstan reverse signal remains set and, since the in erase flag is not set, the microprocessor advances to the cue pause routine. This routine is shown in FIG. 10 and will be described below. Briefly, it should be pointed out that the purpose of the cue pause routine is to detect when the tape has been advanced to a location at which a cue signal had been recorded, whereupon further movement of the tape is temporarily interrupted. That is, the tape "pauses" at this location. If the tape has not reached a location at which a cue signal has been recorded, the cue pause routine exits to the beginning of the main loop.

During subsequent cycles of the microprocessor through the rewind routine, the tape continues to be driven reversely for so long as the rewind flag is set. As the tape is so driven, the BCD and binary tape counters are decremented during the tape counter update routines; and the underflow counter is incremented. As mentioned above, if the tape should break during the rewind operation, the underflow counter eventually will be incremented beyond a threshold value; and this is sensed by the tape counter update routine to turn off the capstan, set the EOT flag and set the tone counter to a count of ten. The user is apprised accordingly.

Let it now be assumed that the rewind/play button is released. Upon the next cycle through the input routine, the in stop flag remains reset because the inquiry of whether the in play flag is set is answered in the affirmative. Proceeding with the input routine, the tape has not been removed, the stop button is not on, two operating buttons are not pushed concurrently, the momentary record button is not on, the conference record button is not on, the fast forward button is not on, the rewind button is not on and the record flag is not set. The microprocessor then returns to the main loop with the in stop flag reset.

Proceeding with the main loop shown in FIG. 3, output signals are supplied to the capstan and actuator motors and to the warning tone generators. The capstan motor remains energized in the reverse direction, the actuator motor remains off and the warning tone generator also remains off. Then, since the in stop flag is not set, the EOT flag is not set, the momentary record button is not on, the in conference flag is not set, the in erase flag is not set and the rewind button has been released, inquiry is made as to whether the in play flag is set. This inquiry is answered in the affirmative and, therefore, the microprocessor jumps to the play routine shown diagrammatically in FIG. 10.

On entering the play routine, inquiry is made as to whether the play flag is set. Although the in play flag is set, the play flag is not. Thus, the play routine advances to point D of the record routine shown in FIG. 8A. At this time, the reverse flag is set but the change direction flag had been reset in the rewind routine after the count of the change direction timer reached 0.5 seconds. Since the change direction flag is not set, the next step is to set this flag and to reset both the change direction timer and the EOT timer. Then, inquiry is made as to whether the pinch roller is fully engaged. Since the preceding operating mode of the device had been the rewind mode wherein the pinch roller was only partially engaged, this inquiry is answered in the negative. Accordingly, assuming the actuator fail flag is not set, the actuator motor routine now is carried out, the play, fast forward, rewind, record and in erase flags are reset and the capstan motor is turned off. The microprocessor then returns to the beginning of the main loop.

The main loop and input routines are executed again in the manner described above; and when the main loop reaches the inquiry of whether the in play flag is set, this inquiry once again is answered in the affirmative. Hence, the microprocessor jumps once again to the play routine (FIG. 10) but, since the play flag still has not yet been set, the play routine advances to point D of the record routine (FIG. 8A).

The foregoing cycle of the microprocessor from the main loop to the rewind routine and then to point D of the record routine continues until the pinch roller is fully engaged (or until the actuator fail flag is set). At that time, when the play routine advances to point D of the record routine, since the reverse flag is set, the change direction flag is set and the pinch roller is fully engaged, the actuator motor is turned off and the actuator fail flag is reset. Then, inquiry of whether the change direction flag is set is answered in the affirmative but, since the change direction timer had been recently reset, the inquiry of whether the count of this timer is equal to or greater than 0.5 seconds is answered in the negative. Hence, the microprocessor returns to the beginning of the main loop.

The foregoing cycle of instructions is repeated until the count of the change direction counter reaches 0.5 seconds. At that time, the change direction flag is reset and the reverse flag also is reset. Then, the capstan is turned on and all cue flags are reset. This latter instruction is redundant in the present operation. Next, since the device is not disposed in its record routine, the play flag is set and the fast forward, rewind and record flags all are reset. The microprocessor then returns to the main loop.

Upon the next cycle of the microprocessor through the main loop to the play routine, the inquiry of whether the play flag is set is answered in the affirmative. Accordingly, the capstan motor remains on. If the fast forward button is not operated at this time, the play flag remains set and the fast forward, rewind and record flags all remain reset. The play routine then returns to the beginning of the main loop; and the foregoing cycle of instructions is repeated.

Thus, it is seen, upon release of the rewind/play button, a pause routine having a duration of about 0.5 seconds is carried out, and then the device is disposed in its playback mode. The purpose of the pause routine is to avoid a sudden reversal in the energization of the capstan motor which could damage that motor and could break the tape and also insures the registration of chopper pulse transitions in the proper direction that may be generated as the tape is brought to a stop.

The play routine continues until the stop button, fast forward button, rewind button, momentary record button or conference button is operated. Let it be assumed that, while in the playback mode, the fast forward button is operated. The operation of the fast forward button is sensed when the microprocessor executes its input routine (FIG. 6), in which the in stop flag is reset (which, in this mode, is a redundant operation), the inquiry of whether the in play flag is set is answered in the affirmative, and the inquiries of whether tape has been removed, whether the stop button is on, whether two operating buttons are pushed concurrently, whether the momentary record button or the conference button are on all are answered in the negative. Since the fast forward button is on, the in conference and in erase flags are reset, the in stop flag remains reset and the input routine returns to the main loop. If the energy level of the battery is not low, the capstan motor continues to be energized, the actuator motor remains off and the warning tone generator also remains off. The main loop continues through the remaining instructions and the inquiry of whether the in play flag is set is answered in the affirmative. It is seen that, even though the fast forward button is on, the in play flag has not been reset. Accordingly, the main loop jumps to the play routine (FIG. 10).

Since the play flag is set, the capstan motor remains on and the inquiry of whether the fast forward button is on now is answered in the affirmative. Accordingly, the fast forward flag is set and a fast forward signal is conditioned to be supplied to the capstan motor to override the play speed signal. Thereafter, the microprocessor advances to the cue pause routine.

The cue pause routine will be described in detail below. Suffice it to say that if the location of a cue signal has not been reached, the microprocessor returns to the beginning of the main loop. Then, after the tone and timer update routine and the tape counter update routine, the input routine is carried out once again. The input routine advances to the inquiry of whether the fast forward button is on. This inquiry is answered in the affirmative, thus resetting the in stop flag, and the input routine exits to continue with the main loop. Thus, the play, the in play and the fast forward flags will remain set.

The microprocessor continues to cycle through the aforedescribed instructions, resulting in the fast forward operation for so long as the fast forward button remains operated. When this button is released, the fast forward flag is reset during the next cycle through the play routine (FIG. 10).

If, while in the playback mode, the user wishes to review previously recorded material once again, the rewind button is operated. The operation of the rewind button is sensed during the next cycle through the input routine, resulting in the play and in play flags remaining set.

When the microprocessor returns to continue with the main loop, the inquiry of whether the rewind button is on ultimately is reached, and this inquiry is answered in the affirmative, whereupon the microprocessor jumps to the rewind routine.

The flow chart illustrated in FIG. 9A is followed once again. At this time, the rewind, reverse and change direction flags all are reset. Hence, as described above, first the capstan motor is turned off, then the actuator motor routine is initiated to dispose the pinch roller in its partially engaged position. Then, while the pinch roller is being brought into proper position, a pause operation is carried out until the change direction timer is incremented from a reset count to a count equal to 0.5 seconds, and then the capstan motor is reversely energized and the rewind and reverse flags are set so as to dispose the device in its rewind mode.

Let it be assumed that device 10 has been disposed in its stop mode and then fast forward button 34 is operated. It is recalled that, when the stop routine is executed in response to the operation of the stop button, all of the "in" flags, including the in play, in conference and in erase flags, are reset. Now, operation of the fast forward button is sensed during the next cycle of the microprocessor through the input routine. As a result of the operation of this button, the in stop flag is reset and the input routine returns to the main loop.

Proceeding with the instructions shown in FIG. 3, if the energy level of the battery is not low, output signals are supplied to the capstan motor (to keep it off), the actuator motor (to keep it off) and the warning tone generator (also to keep it off). Then, since the in stop flag is not set, the EOT flag is not set, the momentary record button is not on, the in conference flag is not set, the in erase flag is not set, the rewind button is not on and the in play flag is not set, the main loop jumps to the fast forward routine shown in FIG. 11.

Here, it is assumed that the fast forward flag is not yet set. If the reverse flag had been set, as when the user operates the rewind button and thereafter operates the fast forward button, a pause routine is carried out so as to temporarily stop the capstan motor and then, after a delay of about 0.5 seconds, the reverse flag is reset and the fast forward flag is set. This is shown schematically in FIG. 11. For the purpose of the present description, it is assumed that the reverse flag is not set and that the pinch roller is not partially engaged. It is recognized that, when the device had been disposed in its stop mode, the pinch roller had been fully disengaged.

Accordingly, since the pinch roller is not partially engaged (and the actuator fail flag is assumed not to be set), the fast forward, rewind, record and play flags all are reset, the capstan motor is turned off (in this instance it is kept off) and the actuator motor routine is initiated. The fast forward routine then exits to the beginning of the main loop.

The microprocessor cycles from the main loop through the input routine and then through the fast forward routine until the pinch roller is sensed as being partially engaged. At that time, and as shown in FIG. 11, the actuator flag is reset (to turn off the actuator motor), the cue flags all are reset, the fast forward, rewind, record and play flags remain reset and the actuator motor now is turned off. Then, if the change direction flag is not set, that is, if the aforementioned pause routine is not necessary, the fast forward flag is set. An output signal then is conditioned to be supplied to the capstan motor to drive it in the fast forward mode. Thereafter, the fast forward routine proceeds to the cue pause routine shown in FIG. 10. As mentioned above, and as will be described below, the cue pause routine functions to sense when the tape has been transported to the location at which a cue signal is recorded and, if so, to pause temporarily thereat. After the cue pause routine is carried out, the microprocessor returns to the beginning of the main loop.

It is appreciated that the microprocessor continues to cycle through the main loop, including the tone and timer update routine and the tape counter update routine, through the input routine and then through the fast forward routine. Hence, for so long as the fast forward button remains operated, the tape is driven in the fast forward direction.

From the description of FIGS. 10 and 11, it is seen that if the fast forward button is operated while device 10 is disposed in its play mode the pinch roller remains engaged with the capstan which is accelerated to drive the tape at a faster-than-play speed. But, if the device had been disposed in its inactive, or stop mode, for example, prior to the operation of the fast forward button, the pinch roller merely partially engages the capstan to enable the tape to be driven at a higher speed.

Let it now be assumed that, while the device is operated in its rewind or fast forward mode, the tape is transported to the location at which a cue signal is recorded. The cue pause routine shown in FIG. 10 then is carried out. It is appreciated that the rewind routine shown in FIG. 9A advances to the cue pause routine if the rewind flag is set but the in erase flag is not, that the play routine (FIG. 10) advances to the cue pause routine if the play flag is set and the fast forward button is operated, and that the fast forward routine (FIG. 11) advances to the cue pause routine after the signal to set the capstan motor in its fast forward mode is produced.

Turning to FIG. 10, the cue pause routine is executed when the fast forward or rewind flags are set (the latter also being accompanied by the in erase flag being reset). In this cue pause routine, inquiry first is made as to whether the cue pause flag is set. If not, inquiry next is made as to whether the count of the binary tape counter is equal to any letter cue position count that is stored in the "letter" section of the cue memory. If not, inquiry is made as to whether the count of the binary tape counter is equal to any instruction cue position count that is stored in the "instruction" section of the cue memory. If this inquiry also is answered in the negative, the microprocessor returns to the beginning of the main loop.

The microprocessor cycles through this portion of the cue pause routine during rewind and fast forward modes until the count of the binary tape counter is equal to a cue position count stored in the "letter" or "instruction" sections of the cue memory. This coincidence occurs when the tape is transported to the location at which the "letter" or "instruction" cue signal had been recorded during the record mode, described above. When the binary tape count is equal to a stored cue position count, the cue pause flag is set and a pause timer is reset. If the stored cue position count happens to be an instruction cue position count, the indication INSTR is displayed and, additionally, the number of that instruction (e.g. the instruction cue memory address) also is displayed by numerical display 42. Then, the capstan motor is turned off.

Upon returning to the main loop, the pause timer is incremented during the tone and timer update routine. When the main loop advances to the input routine, the in stop flag remains reset if the fast forward or rewind button is operated. Then, when the main loop continues through its set of instructions shown in FIG. 3 and then jumps either to the rewind or fast forward routines, the cue pause routine is carried out thereafter, as shown by the flow charts of FIGS. 9A and 11.

Now, in the cue pause routine, since the cue pause flag is set, inquiry is made as to whether the count of the pause timer is equal to or greater than one second. If not, the capstan motor remains off and the microprocessor continues to recycle through the main loop, the rewind or fast forward routine and then the cue pause routine, until the count of the pause timer reaches one second. At that time, inquiry is made as to whether the count of the binary tape counter is equal to a stored cue position count. If it is, the cue pause flag remains set and the microprocessor continues to recycle through the aforedescribed routines. It should be appreciated that, prior to the time that the count of the pause timer reaches one second, the capstan motor is turned off during the cue pause routine even though, prior to entering the cue pause routine, the capstan motor had been set either in its reverse mode (as in the rewind routine of FIG. 9A) or the fast forward mode (as in the fast forward routine of FIG. 11). Although the capstan motor is preliminarily conditioned to operate in its reverse or fast forward modes by the appropriate instructions found in the rewind and fast forward routines, respectively, these instructions are overridden and the capstan motor is turned off by the cue pause routine. However, once the count of the pause timer reaches one second, the preliminary conditioning of the capstan motor to operate in the rewind or fast forward modes is not overridden. Hence, if the count of the pause timer is equal to or greater than one second, the main loop eventually supplies to the capstan motor either the reverse signal or the fast forward signal (if the fast forward or rewind button remains operated) so as to move the tape. Then, during subsequent cycles through the cue pause routine, the inquiry of whether the binary tape count is equal to a stored cue position count will be answered in the negative (until the next cue signal location is reached); and the cue pause flag will be reset.

From the preceding description, it is seen that, during a fast forward or rewind mode, whenever the tape has been transported to the location at which a cue signal had been recorded, that is, whenever the binary tape counter reaches a count that is equal to a stored letter or instruction cue position count, the capstan motor is turned off for a brief duration on the order of about one second. This apprises the user that the tape has reached a "letter" or "instruction" signal.

Now let it be assumed that the user wishes to erase information which he has previously recorded on the tape. This is achieved by operating rewind/play button 28 concurrently with cue/erase button 30. This may be done by operating the rewind/play button first and then, at a later time, operating the cue/erase button (referred to in the following description as the erase button), or by operating both buttons simultaneously.

The operation of the rewind button is sensed when the microprocessor executes its input routine, and the main loop eventually jumps to the rewind routine regardless of whether the erase button is operated. The rewind routine is diagrammatically represented in FIG. 9A and, as described above, a pause having a duration on the order of about 0.5 seconds is instituted upon the operation of the rewind button. As described above, when the rewind routine first is executed, the change direction flag is set and the change direction timer is reset. The capstan motor is turned off until the pinch roller is properly positioned and the count of the change direction timer reaches 0.5 seconds. At that time, the reverse and rewind flags are set and the capstan reverse drive signal is produced. When the main loop reaches the instruction at which the output signal is supplied to the capstan motor, this capstan reverse signal is supplied thereto. Thus, a delay of about 0.5 seconds is imparted upon the operation of the rewind button until the tape actually is driven in the reverse direction.

When the erase button is operated, the input routine senses this to set the in erase flag and reset all of the other "in" flags. It is recalled that the in play flag is set when the rewind button is operated; and this flag now is reset when the erase button is operated.

After the input routine is carried out, the main loop proceeds in accordance with the instructions shown in FIG. 3. The inquiry of whether the in erase flag is set is answered in the affirmative and the main loop jumps to the rewind routine.

As shown in FIG. 9A, since the rewind and in erase flags now are both set, the DC erase circuitry is enabled. This disposes such circuitry in condition to erase the information on the magnetic tape.

Next, the cue erase routine represented by the flow chart of FIG. 9B is carried out, wherein inquiry is made as to whether the count of the binary tape counter is equal to any stored letter cue position count. If this inquiry is answered in the affirmative, the cue erase routine advances to inquire if the count of the letter cue counter is greater than the letter cue memory address then being generated plus one (+1). From the reverse cue position routine represented by the flow chart of FIG. 5C, it is seen that, although the letter cue count normally corresponds with (e.g. is equal to) the letter cue memory address, when the tape is reversed the letter cue memory address is decremented whenever a previously recorded letter cue signal is reached. Hence, it is expected that during a rewind operation, when that previously recorded letter cue signal is encountered, the letter cue memory address will be decremented to be one less than the letter cue count. Therefore, when the binary tape count becomes equal to a stored letter cue position count, the letter cue count normally will be equal to the present letter cue memory address +1, and this inquiry will be answered in the negative. Then, the last (or highest occupied) letter cue location of the cue memory is cleared and the letter cue counter is decremented to a count that corresponds with (e.g. is equal to) the letter cue memory address. This effectively erases the last-recorded letter cue signal information (that is, the position count of that last-recorded letter cue signal) from the cue memory.

However, if a letter cue signal had been inserted between two previously-recorded letter cue signals, as when a previously-recorded letter is modified, whereby it is completed sooner than its original completion, the count of the letter cue counter may register, for example, "7" but, because of the revision to the previously-recorded letter, the letter cue memory address may be set to, for example, "5". This is described in detail below. In any event, if the tape is in the process of being erased before it had been sufficiently advanced to the position by which the letter cue count and the letter cue memory address are equal, the inquiry of whether the count of the letter cue count (e.g. "7") is greater than the letter cue memory address (e.g. "5") +1 will be answered in the affirmative. At that time, the cue erase routine advances to shift the position counts in those locations of the letter cue memory that are greater than the letter cue memory address +1 (that is, the position counts stored at letter cue memory locations "7" and above) down by one location. Then the position count stored in the highest-occupied location is cleared and the letter cue counter is decremented.

After the foregoing operation is completed, or if the binary tape count is not equal to any position count stored in the letter cue memory, inquiry is made to determine if the binary tape count is equal to any cue position stored in the instruction cue memory. The steps following this inquiry are quite similar to those described above with respect to the erasing of letter cue position counts and, in the interest of brevity, such steps are not described again.

Thus, as the tape is rewound, the binary tape count is continually compared to the stored letter and instruction cue position counts and the latter are erased when a positive comparison obtains. The microprocessor then returns to the rewind routine and inquires whether the count of the erase timer is equal to or greater than four seconds. Since the erase timer is incremented during the tone and timer update routine, it is expected that, normally, this inquiry will be answered in the affirmative. Accordingly, the erase timer and tone timer both are reset and the tone flag is set. The rewind routine then returns to the beginning of the main loop.

When the microprocessor proceeds to the tone and timer update routine, since the tone flag now is set and the tone timer is not equal to one second, the warning tone is generated for a one second duration. This tone actually is produced when the main loop reaches the instruction to supply an output signal to the warning tone generator.

The microprocessor continues to cycle through the input routine, the remaining instructions illustrated in FIG. 3 of the main loop and then through the rewind routine. Since the in erase flag remains set, the DC erase operation continues and the cue memory is cleared of those letter and instruction cue position counts which are equal to the present binary tape count.

From the tone and timer update routine, it is appreciated that the warning tone is generated until the count of the tone timer reaches one second, whereupon the tone timer is reset, as is the tone flag.

The main loop continues through the input routine, the various instructions illustrated in FIG. 3 and then jumps to the rewind routine of FIG. 9A. This recycling of the microprocessor continues until, during the rewind routine, the count of the erase timer reaches four seconds. At that time, the erase timer is reset once again, the tone timer also is reset and the tone flag is set. Hence, another tone of one second duration is generated.

From the foregoing, it is seen that, for so long as the in erase flag is set, successive warning tone pulses are generated, each pulse having a duration of about one second with successive pulses being spaced apart by about three seconds.

It will be seen from the input routine of FIG. 6 that the erase operation is carried out even if the erase button or the rewind button is released. This is because, after the in stop flag is reset, the inquiry of whether the in conference or in play or in erase flags are set is answered in the affirmative, and the inquiries of whether the tape has been removed, whether the stop button is on, whether two operating buttons are pushed concurrently, whether the momentary record button is on, whether the conference record button is on, whether the fast forward button is on, whether the rewind button is on and whether the record flag is set all are answered in the negative. Hence, the in stop flag remains reset. When the input routine returns to the main loop, the inquiry of whether the in stop flag is set is answered in the negative and, since the EOT flag is not set, the momentary record button is not on and the in conference flag is not set, inquiry is made as to whether the in erase flag is set. This inquiry is answered in the affirmative and the microprocessor jumps to the rewind routine. Thus, to terminate the erase operation, stop button 26 should be operated.

Let it now be assumed that, after recording a number of messages, or letters, some of which have specific instructions recorded therein as indicated by the recording of instruction cue signals, the user wishes to revise the information that he had recorded. Let it be further assumed that, as a numerical example, seven letters have been recorded and three instructions also have been recorded. Hence, seven letter cue signals and three instruction cue signals are recorded, and the present count of the letter cue counter is equal to "7", the present letter cue memory address is set to "7", the present count of the instruction cue counter is equal to "3" and the present instruction cue memory address also is set to "3". The user interrupts his dictation of the next message, or letter (i.e. the eighth letter), by operating rewind/play button 28. Accordingly, the rewind mode is established in the manner described in detail hereinabove, and the tape now is rewound.

With the rewinding of the tape, as the microprocessor cycles through the tape counter update routine, both the BCD and binary tape counters are decremented in response to each 1/0 chopper pulse transition, and the binary tape counter is additionally decremented in response to each 0/1 chopper pulse transition. After decrementing the binary tape counter (FIG. 5A), the reverse cue position routine (FIG. 5C) is carried out. When the tape is sufficiently rewound such that the count of the binary tape counter is equal to the letter cue position count stored in letter cue memory location "7" (i.e. the end of the seventh letter, or message, is reached), the inquiry of whether the binary tape count is equal to any stored letter cue position count will be answered in the affirmative. Hence, the letter cue memory address is decremented from "7" to "6". The next following inquiry of whether the binary tape count is equal to any stored instruction cue position count is assumed to be answered in the negative. Hence, the reverse cue position routine exits to complete the remaining instructions of the tape counter update routine which, upon its completion, returns to the main loop.

It is recalled, from the foregoing discussion of the rewind routine, that the tape continues to be driven in the reverse direction for so long as the rewind button remains operated. Let it be assumed that, prior to reaching the next preceding letter cue signal (stored in location "6"), the rewind button is released, thus disposing device 10 in its playback mode, as discussed above. Let it be further assumed that, after reviewing a portion of this previously recorded message (the seventh letter), the user now wishes to modify that letter. Accordingly, momentary record button 24 (or conference record button 22) may be operated to dispose the device in its record mode. After the record flag is set in accordance with the flow chart shown in FIG. 8A, the next cycle of the microprocessor through the record routine results in carrying out the instructions represented by the flow chart shown in FIG. 8B. Commencing from point A in this flow chart, the inquiry of whether the cue flag is set is answered in the negative, the inquiry of whether the cue button is on also is answered in the negative, the inquiry of whether any cue signals are being recorded likewise is answered in the negative and the inquiry of whether the binary tape count is equal to the count stored in the letter cue memory now being addressed (e.g. address "6") also is answered in the negative. At this time, it is assumed that the user is revising letter "7" and, thus, the inquiry of whether the binary tape count is equal to any stored letter cue position count is answered in the negative. The next inquiry of whether the binary tape count is equal to any stored instruction cue position count also is answered in the negative and, since the tenth element of the bar graph is not energized, the microprocessor returns to the beginning of the main loop.

The foregoing cycle is repeated until, ultimately, the location on the tape at which the end of letter "7" had been recorded is reached. At that time, when the tape counter update routine cycles through the forward cue position routine (FIG. 5B), the inquiry of whether the binary tape count is equal to the stored letter cue position count is answered in the affirmative. That is, the binary tape count now is equal to the cue position count stored at letter cue memory location "7". Hence, the letter cue memory address is incremented from its count of "6" to the count of "7". Assuming that the binary tape count is not equal to any stored instruction cue position count, the forward cue position routine exits and the tape counter update routine is completed. The main loop continues, through the input routine and through the remaining steps illustrated in FIG. 3, to carry out the record routine. When the flow chart shown in FIG. 8B is executed, the inquiry of whether the binary tape count is equal to any stored letter cue position count ultimately will be made, and this inquiry now will be answered in the affirmative. Since the letter cue memory address had been incremented to the count of "7", the inquiry of whether the letter cue counter is greater than the letter cue memory address now is answered in the negative (it is recalled that the letter cue counter had been assumed to be set to a count of "7"). Hence, the last, or highest occupied, letter cue memory location is cleared, thus clearing the position count from letter cue memory location "7", and both the letter cue counter and letter cue memory address are decremented to the count of "6". This effectively erases the seventh letter cue signal information from the letter cue memory as is proper because new information has been recorded over this previously recorded letter cue signal.

It is assumed that the binary tape count is not equal to any stored instruction cue position count and, thus, the flow chart ultimately returns to the beginning of the main loop.

In the foregoing example, it had been assumed that letter "7" had been revised. Let it now be assumed that the user reverses the tape still further such that the letter cue memory address is decremented further to a count of "5" and then still further is decremented to a count of "4" by operation of the reverse cue position routine. Let it be further assumed that the instruction cue memory address is decremented, by the reverse cue position routine, from its count of "3" to a count of "2" and then to a count of "1". This means that the user now is revising letter "5". Here again, it is assumed that rewind/play button 28 is released and momentary record button 24 is operated. In the manner described above, the record routine is carried out and the record mode is initiated. Accordingly, the tape counter update routine, including the forward cue position routine, is carried out, and the record routine shown in FIGS. 8A and 8B also is carried out.

If the user records over the location at which the second instruction cue signal had been recorded, the forward cue position routine increments the instruction cue memory address to the count of "2", and the flow chart shown in FIG. 8B, commencing with point A, is carried out. Since no cue flag is set, the cue button is not on, cue signals are not being recorded, the binary tape count is not equal to the count stored in the location now addressed in the cue memory, and the binary tape count is not equal to any stored letter cue position count, the microprocessor advances to inquire if the binary tape count is equal to any stored instruction cue position count. It is assumed, at this time, that the second instruction cue signal has been reached and, thus, the binary tape count now is equal to the instruction cue position count stored at instruction cue memory location "2". Hence, this inquiry is answered in the affirmative. The next inquiry of whether the instruction cue counter is greater than the instruction cue memory address also is answered in the affirmative, because it is assumed that the instruction cue count is equal to a count of 3. Hence, all instruction cue position counts that are stored in instruction cue memory locations which are greater than the present instruction cue memory address, that is, all instruction cue position counts stored at locations "3" and higher, are shifted down in the instruction cue memory by one location. That is, the cue position count stored in instruction cue memory location "3" is shifted into instruction cue memory location "2", thus replacing the instruction cue position count that had been stored at location "2". Then, the instruction cue position count stored in the last, or highest instruction cue memory location, that is, the position count stored at location "3" is cleared. Thereafter, the instruction cue counter is decremented from its count of "3" to the count of "2", and the instruction cue memory address is decremented from its count of "2" to the count of "1". Subsequently, the record routine returns to the beginning of the main loop.

As the user continues to record new information, that is, as the fifth letter continues to be revised, the location on the tape at which the fifth letter cue signal had been recorded is reached. At that time, the forward cue position routine (FIG. 5B) increments the letter cue memory address from its count of "4" to the count of "5". Assuming that no instruction cue signal had been recorded at this location, inquiry of whether the binary tape count is equal to any stored instruction cue position count is answered in the negative. The forward cue position routine thus exits and the tape counter update routine continues to be carried out.

When the record routine next is carried out, the microprocessor cycles through the flow chart shown in FIG. 8B. Ultimately, inquiry is made as to whether the binary tape count is equal to any stored letter cue position count. Since it is assumed that the binary tape has been advanced to the position at which the fifth letter cue position count had been recorded, this inquiry is answered in the affirmative. The next inquiry of whether the cue counter (set to the count of "7") is greater than the letter cue memory address (now set to the count of "5") also is answered in the affirmative. Hence, all cue position counts that are stored in letter cue memory locations greater than or equal to the present letter cue memory address, that is, those position counts stored at locations "7", "6" and "5" are shifted down one location, and the position count that had been stored at location "5" is discarded. Hence, the cue position counts stored at locations "7" and "6" are shifted into locations "6" and "5", respectively. Then, the position count stored in the last, or highest cue memory location, that is, the position count stored in location "7", is cleared. The cue counter then is decremented from its count of "7" to the count of "6", and the cue memory address is decremented from its count of "5" to the count of "4".

The foregoing operation is repeated each time that the tape advances to the location of a letter cue signal or the location of an instruction cue signal over which additional information is being recorded by the user. Hence, the cue memory is cleared of information relating to previously recorded letter and instruction cue signals when those signals are effectively erased by new information recorded thereover.

Let it now be assumed, consistent with the foregoing numerical example, that after seven letters and three instructions had been recorded, a modification is made to, for example, letter "5" such that this letter is shortened. This means that a letter cue signal (indicating the end of the fifth letter) is recorded before the previously recorded fifth letter cue signal is reached, and thus is inserted between the previously-recorded fifth letter cue signal and the previously-recorded fourth letter cue signal.

As described above, when the tape is rewound, the reverse cue position routine (FIG. 5C) operates to decrement the letter cue memory address and the instruction cue memory address each time a letter or instruction cue signal, respectively, is encountered. This has been discussed in detail hereinabove and, in the interest of brevity, is not repeated here. Thus, consistent with the previously described example, assuming that the tape has been rewound to enable the user to revise letter "5", the count of the letter cue memory address now is set to "4", the count of the letter cue counter remains set at "7", the count of the instruction cue memory address is set at "1" and the count of the instruction cue counter is set at "3".

After the user has modified letter "5" to his satisfaction, and prior to reaching the location of the previously recorded fifth letter cue signal, it is assumed that the user now operates cue/erase button 30 to record a letter cue signal indicating the end of revised letter "5". When the microprocessor next cycles through the record routines (FIGS. 8A and 8B), the inquiry (FIG. 8B) of whether the cue button is on now is answered in the affirmative. Since the cue stop flag had been set, the record routine advances to reset this flag and then proceeds to point C (FIG. 8C) where the inquiry of whether the instruction cue flag is set is answered in the negative. It is assumed that the letter cue flag is not set and, since the letter cue memory address now is equal to the count of "4", the next-following inquiry of whether this address is equal to nine is answered in the negative. However, the next inquiry of whether the count of the cue counter exceeds the count of the letter cue memory address is answered in the affirmative. Hence, the shift flag is set.

Proceeding with the flow chart shown in FIG. 8C, since the present count of the letter cue counter is equal to seven, the inquiry of whether this count is equal to nine is answered in the negative. Thus, the cue counter is incremented now to the count of eight. Then, the tone flag is set, the tone timer is reset and the letter cue flag is set. It is recalled that the setting of the tone flag and the resetting of the tone timer effectuates the generation of a warning tone for a one second duration to indicate the recording of the letter cue signal. The record routine then advanceIs to point B in FIG. 8B.

Commencing at point B, since a cue signal now is being recorded, the cue generate routine is executed. It is recalled that, during this routine, the cue timer is reset. Then, the inquiry of whether the binary tape count is equal to the position count stored in that location of the letter cue memory which presently is being addressed (i.e. location "4") is answered in the negative. The next inquiry of whether the binary tape count is equal to any stored letter cue position count also is answered in the negative. Proceeding with the flow chart of FIG. 8B, it is assumed that the binary tape count is not equal to any stored instruction cue position count and, since the tenth element of the bar graph display is not energized, the record routine exits to the beginning of the main loop.

As the letter cue signal is being recorded, the microprocessor continues to cycle through the aforedescribed portion of the flow chart shown in FIG. 8B until, ultimately, the cue timer times out, that is, until the count of the cue timer reaches the count corresponding to one second. At that time, when the record routine advances to point A of the flow chart shown in FIG. 8B, the inquiry of whether any cue flag is set is answered in the affirmative and, likewise, the inquiry of whether the count of the cue timer is equal to or greater than one second also is answered in the affirmative.

Then, the increment flag, which had not been set by the flow chart shown in FIG. 8C because the count of the cue counter exceeds the count of the letter cue memory address, is nevertheless reset, and the inquiry of whether the cue address is full (that is, whether the count of the letter cue address is equal to "9") is answered in the negative. Then, since the shift flag is set (it had been set by the operation of the flow chart of FIG. 8C), the next instruction is carried out to shift upward, by one location, all letter cue position counts that are stored at those locations which exceed the location now being addressed by the letter cue memory address. In accordance with the presently described numerical example, the letter cue position counts stored at locations "5", "6" and "7" now are shifted upward into locations "6", "7" and "8", respectively. Then, the letter cue memory address is incremented from its present count of "4" to the count of "5"; and the binary tape count is loaded into addressed letter cue memory location "5".

Once the count representing the location of this letter cue signal is stored in the letter cue memory, the shift flag is reset and, since the letter cue flag had been set, this flag now is reset too. The inquiry of whether the instruction cue flag is set is answered in the negative, and the cue timer is reset. The microprocessor then advances to point B of the flow chart, and the remainder of this flow chart is executed in the manner described above.

Thus, it is seen that, when a previously recorded letter is shortened, the position count of the new letter cue signal is inserted into the letter cue memory at a location occupied by the position count corresponding to the previously-recorded letter cue signal, and that position count, together with all position counts at higher letter cue memory locations are shifted upward. Stated otherwise, the new position count is inserted into the storage location vacated by the previously-recorded position count which is shifted upward by one location in the letter cue memory.

It will be appreciated that a similar shifting operation is carried out in the event that letter "5" is lengthened beyond its previous length. That is, as the revision of letter "5" continues, when the location of the fifth letter cue signal is reached, the position count stored in location "5" of the letter cue memory is discarded, and the position counts stored at locations "6" and "7" are shifted down into locations "5" and "6", respectively, as has been described above. Then, when a letter cue signal is recorded to indicate the end of the revised letter "5", the position counts now stored at locations "5" and "6" are shifted upward into locations "6" and "7", respectively, and the binary tape count present at the time that the cue timer times out is shifted into vacated location "5", in the manner described above.

If, prior to reaching the second instruction cue signal recorded on the tape, the user operates cue/erase button 30 to record another instruction cue signal, a similar shifting operation is carried out in the instruction cue memory. Assuming that the microprocessor cycles through the record routine, and that the record flag is set, this routine advances to point "A" (FIG. 8B) and the inquiry of whether a cue flag is set is answered in the negative. Since an instruction cue signal is in the process of being recorded, the inquiry of whether the cue button is on now is answered in the affirmative. The cue stop flag had been set and, proceeding with the flow chart, this flag now is reset and the record routine advances to point C of FIG. 8C.

The inquiry of whether the instruction cue flag is set is answered in the negative and, similarly, the inquiry of whether the letter cue flag is set also is answered in the negative. It is assumed that the cue memory address is less than "9", and it is further assumed that the count of the cue counter exceeds the count of the cue memory address. Hence, the shift flag is set and, assuming that the count of the cue counter is less than "9", this count is incremented. Accordingly, and as described above, the tone flag is set, the tone timer is reset and the letter cue flag is set. The record routine then advances to point B (FIG. 8B).

The inquiry of whether a cue signal is being recorded is answered in the affirmative and the microprocessor advances to the cue generate routine. Assuming that the binary tape count is not equal to the position count stored in the addressed location of the cue memory, and that this binary tape count is not equal to any stored letter or instruction cue position signal, the record routine merely continues and returns to the beginning of the main loop.

On succeeding cycles of the microprocessor through the record routine, the flow chart shown in FIG. 8B is carried out, commencing with point A, by which the inquiry of whether any cue flag is set is answered in the affirmative, the inquiry of whether the cue timer has timed out is answered in the negative, the inquiry of whether the cue button is on is answered in the affirmative and the inquiry of whether the cue stop flag is set is answered in the negative. The record routine thus arrives at point B, and the remainder of the flow chart shown in FIG. 8B is repeated in the manner described above.

It is recalled that, in order to record an instruction cue signal, the cue/erase button must be released prior to the time that the cue timer times out, and then this cue button must be re-operated. When the microprocessor next cycles through the record routine, let it be assumed that the cue button has been released. Hence, as shown in FIG. 8B, the inquiry of whether the cue button is on is answered in the negative, and the cue stop flag now is set. When the cue button is re-operated, the next cycle of the record routine following that re-operation answers the inquiry of whether a cue flag is set in the affirmative, whether the cue timer has timed out in the negative, whether the cue button is on in the affirmative and whether the cue stop flag is set in the affirmative. Hence, the cue stop flag is reset and the record routine advances to point C (FIG. 8C). Since the instruction cue flag is not set but the letter cue flag is, inquiry is made as to whether the increment flag is set. From the preceding discussion, it is recalled that this flag is not set and, thus, the shift flag is reset, and the record routine advances to inquire if the instruction cue memory address is equal to "9". In accordance with the present example, this inquiry is answered in the negative. The next-following inquiry of whether the instruction counter exceeds the count of the instruction cue memory address is answered in the affirmative because it has been assumed that the present count of the instruction cue memory address is equal to "1" and the present count of the instruction cue counter is equal to "3". Thus, all position counts at locations in the instruction cue memory which exceed the location now being addressed are shifted upward by one location. That is, the position counts stored in locations "2" and "3" in the instruction cue memory are shifted upward into locations "3" and "4", respectively, thus vacating location "2". Then, the instruction cue memory address is incremented to the count of "2" and, since the count of the instruction cue counter has been assumed to be less than "9", it is incremented from its count of "3" to the count of "4". Next, the cue memory address is set equal to the instruction cue memory address, the instruction cue flag is set and the tone counter is set to the count of one. It is recalled that this, in turn, allows a second warning tone signal to be produced thus indicating the recording of an instruction cue signal.

Next, the record routine returns to point B of FIG. 8B, and the remainder of this flow chart is repeated in the manner discussed above. Until the cue timer times out, the flow chart shown in FIG. 8B is executed each time the microprocessor cycles through the record routine. Ultimately, when this flow chart is carried out, the inquiry of whether the cue timer has timed out is answered in the affirmative. At that time the increment flag, although not set, is reset, and the inquiry of whether the cue memory address is full is answered in the negative. The next inquiry of whether the shift flag is set also is answered in the negative (it had been reset during the last cycle through the flow chart shown in FIG. 8C) and the record routine advances to load the binary tape count into location "2" of the instruction cue memory, which location now is being addressed by the instruction cue memory address. Then, the shift flag is reset (it had not been set) and, since the letter cue flag still is set, it now is reset. The inquiry of whether the instruction cue flag is set is answered in the affirmative and, thus, all cue flags (including this instruction cue flag) are reset. The remainder of the flow chart shown in FIG. 8B then is executed in the manner that has been described previously.

Thus, it is seen that, when a letter or instruction cue signal is inserted between two previously recorded letter or instruction cue signals, the position count corresponding to the inserted cue signal is similarly inserted into the proper position of the cue memory. If the previously recorded cue signal is not "overwritten" by new information, the position counts of those previously recorded cue signals are retained in the cue memory for display and for controlling the rewind and fast forward movement of the tape, as during the cue pause routine discussed above.

In the numerical examples described above, it will be appreciated that the position counts of up to nine letter cue signals and the position counts of up to nine instruction cue signals may be stored in the letter and instruction cue memories, respectively. Of course, a greater number of cue signals may be recorded, but the position counts of such additional cue signals are not stored. If desired, any greater or lesser number of position counts may be stored in the cue memory.

While the present invention has been particularly shown and described with reference to a preferred embodiment, it will be readily appreciated by those of ordinary skill in the art that various changes and modifications in form and details may be made without departing from the spirit and scope of the invention. For example, in the tone and timer update routine, the primary timer may be omitted and the respective timers may be incremented during each cycle of the microprocessor through this routine. Also, although particular numerical examples have been described above, such as the duration of the respective tones which are generated, the duration during which the cue button should be operated repeatedly in order to record an "instruction" signal, the duration of a pause, the capacities of the cue memory for storing position counts, the number of letter and instruction cue counts that may be accumulated, and the like, other suitable time durations and quantities can be used. Furthermore, the foregoing description has provided specific examples of only some of the operations which may be controlled and initiated by the user of the device. It will be seen from the accompanying flow charts that other operations may be controlled, such as when the user operates the fast forward button and then, subsequently, operates the rewind/play button while releasing the fast forward button. The foregoing description has assumed typical use of the device. Also, it will be recognized that the sequence of instructions in the respective routines may be altered, as desired. Still further, although the device, in its preferred form, operates as a record/playback device, such as a dictate machine, it also may be used merely as a playback device and, therefore, the record buttons may be omitted.

It is intended that the appended claims be interpreted as including the foregoing as well as other various changes.

What is claimed is:

1. In a record/playback device for recording information on and playing information back from a movable record medium, counting means responsive to signals produced when said record medium moves to provide a count representing the relative position of said record medium; cue switch means selectively operable to generate a cue indication; cue memory means having plural storage locations for storing in the next available one of said storage locations the count provided by said counting means at the time that said cue indication is generated; means for bidirectionally moving said record medium; means for comparing the count provided by said counting means to the counts stored in said cue memory means; means for stopping said record medium when said count provided by said counting means is substantially equal to a count stored in a storage location; and processor apparatus operable in accordance with a cyclical programmed set of instruments including a routine for sensing when said cue switch means is operated, presetting a cue timer when the operation of said cue switch means is sensed, incrementing said cue timer, and loading the count provided by said counting means into said next available storage location when said cue timer is incremented to a predetermined value, said processor apparatus also including means for producing signals as said record medium moves.

2. The invention of claim 1 wherein said cue switch means is selectively operable to generate a "letter" cue indication upon a single operation thereof and to generate an "instruction" cue indication upon repeated operation thereof prior to the time that said cue timer is incremented to said predetermined value; and wherein said routine further operates to set a "letter" cue flag when an initial operation of said cue switch is sensed, to sense if said cue switch is operated a second time before said cue timer is incremented to said predetermined value, and to set an "instruction" cue flag when said cue switch is operated said second time.

3. The invention of claim 2 further including means for generating a warning tone including a tone timer that is incremented periodically and that is reset when at least one of said cue flags is set, and a tone signal generator that is energized when said tone timer is reset and is de-energized when said tone timer is incremented to a pre-established value.

4. The invention of claim 1, wherein said processor apparatus is operable in accordance with a cyclical programmed set of instructions including a routine for sensing when said record medium is reversed, detecting when information is recorded over a location on said record medium at which a cue indication was previously generated, and shifting at least a portion of the contents of said cue memory means in response to the detection of said information being recorded over said location to delete from said memory means the count that was provided at the time that said cue indication was previously generated, thereby to make available another storage location of said cue memory means.

5. The invention of claim 4 wherein the counts provided by said counting means are stored in successive storage locations of said cue memory means; and further including cue counting means for counting each generated cue indication; and cue memory address means for addressing the next successive storage location of said cue memory means when a cue indication is generated to enable the count provided by said counting means to be stored in said addressed storage location, said cue memory address means and said cue counting means normally being incremented in synchronism; and wherein said routine is operative to decrement the cue memory address when said record medium is reversed and the count of said counting means corresponds to a count stored in said cue memory means.

6. The invention of claim 5 further comprising means for initiating a recording operation to record information on said record medium; and wherein said routine is operative to detect when information is recorded over a location on said record medium at which a cue indication was previously generated by detecting during a recording operation the correspondence of the count of said counting means with a count stored in said cue memory means.

7. The invention of claim 6 wherein said routine is operative to shift at least a portion of the contents of said cue memory means by determining a non-correspondence between the count of said cue counting means and said cue memory address; and shifting the counts stored in those storage locations which exceed said cue memory address from their present respective locations to the next lower location in said cue memory means.

8. The invention of claim 1 wherein said processor apparatus is operable in accordance with a cyclical programmed set of instructions including a routine for sensing when said record medium is reversed, detecting when an additional cue indication is generated at a location of said record medium intermediate two locations at which cue indications were previously generated, shifting into different storage locations of said cue memory means those stored counts that exceed the count now provided by said counting means when said additional cue indication is generated, and inserting said count now provided by said counting means into a storage location vacated by a shifted count.

9. The invention of claim 8 wherein the counts provided by said counting means are stored in successive addressable locations of said cue memory means; and further including cue counting means for counting each generated cue indication, and cue memory address means for addressing the next successive locations of said cue memory means when a cue indication is generated, said cue memory address means and said cue counting means normally being incremented in synchronism; and wherein said routine is operative to decrement the cue memory address each time that the count of said counting means corresponds to a count stored in said cue memory means while said record medium is reversed, to determine a non-correspondence between the count of said cue counting means and the address provided by said cue memory address means when said additional cue indication is generated, and to shift the counts stored at locations having higher addresses than the address provided by said cue memory address means in response to said determination.

10. The invention of claim 1 wherein said device includes means operative when said record medium is removed therefrom for clearing the counts stored in said cue memory means.

11. The invention of claim 10 wherein said device further includes erase means for erasing the information recorded on said record medium and for concurrently clearing the counts stored in said cue memory means.

12. The invention of claim 11 wherein said means for bidirectionally moving said record medium includes a "rewind" element manually operable to cause said record medium to move in the reverse direction and a "forward" element manually operable to cause said record medium to move in the forward direction, and said erase means includes a manually operable "erase" element; and wherein said processor apparatus is operable in accordance with a cyclical programmed set of instructions including a routine for sensing the concurrent operation of said "rewind" and "erase" elements and for clearing a count stored in a storage location of said cue memory means when the count provided by said counting means is substantially equal to said stored count.

13. The invention of claim 12 wherein said routine is further operative to set an "erase" flag when the concurrent operation of said "rewind" and "erase" elements is sensed and to prevent interruption of the movement of said record medium when said count provided by said counting means is substantially equal to a stored count if said "erase" flag is set.

14. The invention of claim 13 wherein said "erase" flag remains set even when said "rewind" and "erase" elements are released; and wherein said instructions further include a routine for sensing the operation of said "rewind" element, setting a "rewind" flag when said "rewind" element is operated, resetting said "rewind" flag when said "rewind" element is released, and preventing said "rewind" flag from being reset when said "erase" flag is set; and wherein said record medium is caused to move in the reverse direction when said "rewind" flag is set,.

15. The invention of claim 14 wherein said device further includes a "stop" element manually operable to stop the movement of said record medium; and wherein the last-mentioned routine is operative to sense the operation of said "stop" element and to reset said "erase" flag in response thereto.

16. The invention of claim 11 wherein said means for bidirectionally moving said record medium includes a "rewind" element manually operable to cause said record medium to move in the reverse direction and a "forward" element manually operable to cause said record medium to move in the forward direction; and wherein said processor apparatus is operable in accordance with a cyclical programmed set of instructions including a routine that is executed in response to the operation of either said "rewind" element or said "forward" element and operates to reset a timer when said count provided by said counting means is substantially equal to a count stored in a storage location and to stop the movement of said record medium, to increment said timer periodically, to sense when said timer has been incremented to a predetermined value, and to resume movement of said record medium if said "rewind" element or said "forward" element remains operated.

17. The invention of claim 16 wherein said record medium is a magnetic tape extending between supply and take-up reels and wherein said means for bidirectionally moving said record medium further includes means for driving said supply reel at a relatively rapid rate in response to the operation of said "rewind" element, means for driving said take-up reel at a relatively rapid rate in response to the operation of said "forward" element, a capstan, and a pinch roller selectively engageable with said capstan to move said magnetic tape for the recording and playing back of information thereon, said pinch roller being mounted on a selectively actuable movable member; and wherein the last-mentioned routine is further operative when said "rewind" or "forward" element is operated to sense if said pinch roller is engaged with said capstan and, if so, to actuate said movable member until said pinch roller is sensed as being disengaged from said capstan.

18. The invention claim 17 further comprising a selectively energizable motor for driving said capstan and said supply and take-up reels; and wherein said last-mentioned routine is additionally operative when said "rewind" or "forward" element is operated to de-energize said motor if said pinch roller is sensed as being engaged with said capstan and to energize said motor for operation at a relatively high speed when said pinch roller is sensed as being disengaged from said capstan.

* * * * *